United States Patent
Cho et al.

(10) Patent No.: US 10,778,697 B2
(45) Date of Patent: Sep. 15, 2020

(54) METHOD FOR TRANSMITTING/RECEIVING DATA IN WIRELESS COMMUNICATION SYSTEM, AND DEVICE FOR SAME

(71) Applicant: LG ELECTRONICS INC., Seoul (KR)

(72) Inventors: Heejeong Cho, Seoul (KR); Jiwon Kang, Seoul (KR); Genebeck Hahn, Seoul (KR); Eunjong Lee, Seoul (KR); Ilmu Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 231 days.

(21) Appl. No.: 15/739,549

(22) PCT Filed: Jun. 22, 2016

(86) PCT No.: PCT/KR2016/006595
§ 371 (c)(1),
(2) Date: Dec. 22, 2017

(87) PCT Pub. No.: WO2016/208950
PCT Pub. Date: Dec. 29, 2016

(65) Prior Publication Data
US 2018/0316690 A1    Nov. 1, 2018

Related U.S. Application Data

(60) Provisional application No. 62/183,684, filed on Jun. 23, 2015.

(51) Int. Cl.
*H04L 29/06* (2006.01)
*H04W 12/10* (2009.01)
(Continued)

(52) U.S. Cl.
CPC .......... *H04L 63/126* (2013.01); *H04L 9/0866* (2013.01); *H04L 9/3242* (2013.01);
(Continued)

(58) Field of Classification Search
CPC ... H04L 63/126; H04L 9/0866; H04L 9/3242; H04W 76/20; H04W 4/06; H04W 12/10; H04W 28/06; H04W 68/005; H04W 8/22
(Continued)

(56) References Cited

U.S. PATENT DOCUMENTS 9,980,282 B2 * 5/2018 Martin ................. H04W 4/70
2002/0174332 A1 * 11/2002 Vialen ................. H04L 9/3242
713/152

(Continued)

FOREIGN PATENT DOCUMENTS

WO    2011055999    5/2011
WO    2012141480    10/2012
(Continued)

*Primary Examiner* — Shahriar Zarrineh
(74) *Attorney, Agent, or Firm* — Dentons US LLP

(57) ABSTRACT

With regard to a method for transmitting and receiving data in a wireless communication system in the present specification, a method implemented by a first network node is characterized by comprising: transmitting a control message, including information pertaining to terminal context retention properties, to a terminal; receiving a first message including a first information block from the terminal; carrying out a verification process on the terminal on the basis of the received first message; and transmitting a second message to the terminal according to the results of the verification of the terminal, wherein the terminal context retention properties represent at least one of whether terminal context is retained or whether terminal context can be changed.

6 Claims, 44 Drawing Sheets

(51) Int. Cl.

| | | |
|---|---|---|
| *H04L 9/32* | (2006.01) | |
| *H04W 28/06* | (2009.01) | |
| *H04W 76/20* | (2018.01) | |
| *H04L 9/08* | (2006.01) | |
| *H04W 4/06* | (2009.01) | |
| *H04W 68/00* | (2009.01) | |
| *H04W 8/22* | (2009.01) | |

(52) U.S. Cl.
CPC ............. *H04W 4/06* (2013.01); *H04W 12/10* (2013.01); *H04W 28/06* (2013.01); *H04W 68/005* (2013.01); *H04W 76/20* (2018.02); *H04W 8/22* (2013.01)

(58) Field of Classification Search
USPC .......................................................... 713/176
See application file for complete search history.

(56) References Cited

U.S. PATENT DOCUMENTS

| | | | | |
|---|---|---|---|---|
| 2008/0076392 | A1* | 3/2008 | Khetawat | H04W 12/1006 455/411 |
| 2011/0092236 | A1* | 4/2011 | Iwamura | H04L 63/123 455/507 |
| 2011/0188408 | A1* | 8/2011 | Yi | H04W 12/1006 370/254 |
| 2012/0039471 | A1* | 2/2012 | Kim | H04W 12/02 380/270 |
| 2012/0269055 | A1* | 10/2012 | Yi | H04L 1/0061 370/216 |
| 2012/0276913 | A1* | 11/2012 | Lim | H04W 12/08 455/450 |
| 2012/0315878 | A1* | 12/2012 | Deng | H04W 12/10 455/411 |
| 2013/0051338 | A1* | 2/2013 | Ryu | H04W 4/70 370/329 |
| 2013/0329653 | A1* | 12/2013 | Russell, Jr. | H04W 8/20 370/329 |
| 2014/0036685 | A1* | 2/2014 | Kim | H04W 48/20 370/236 |
| 2014/0269253 | A1* | 9/2014 | Cho | H04W 8/24 370/217 |
| 2015/0296425 | A1* | 10/2015 | Uchino | H04J 11/00 370/331 |
| 2016/0374005 | A1* | 12/2016 | Cho | H04W 48/06 |
| 2018/0316690 | A1* | 11/2018 | Cho | H04W 4/06 |

FOREIGN PATENT DOCUMENTS

| | | |
|---|---|---|
| WO | 2013055067 | 4/2013 |
| WO | 2013066091 | 5/2013 |
| WO | 2014209088 | 12/2014 |

\* cited by examiner

【Figure 1】
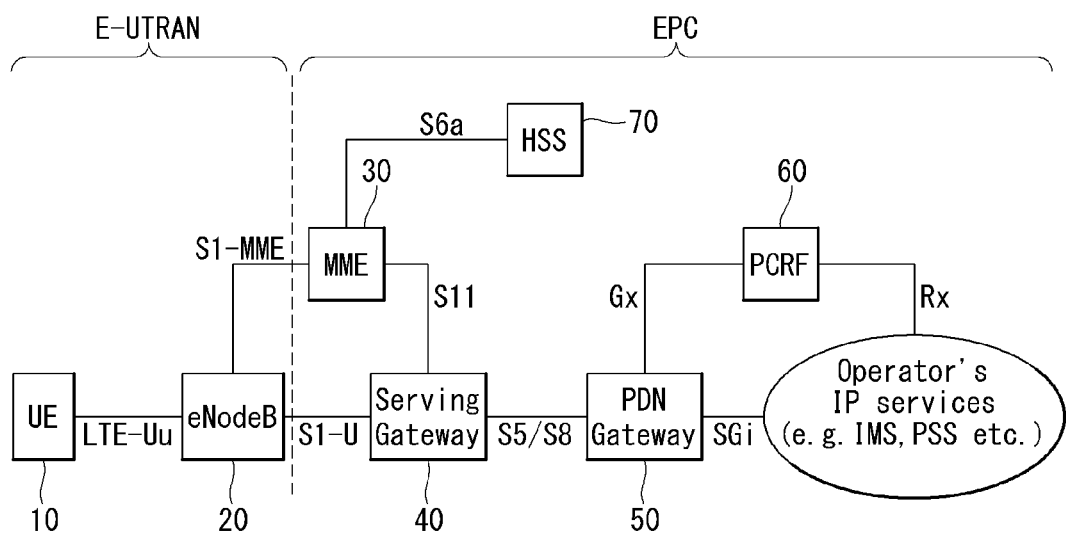

[Figure 2]
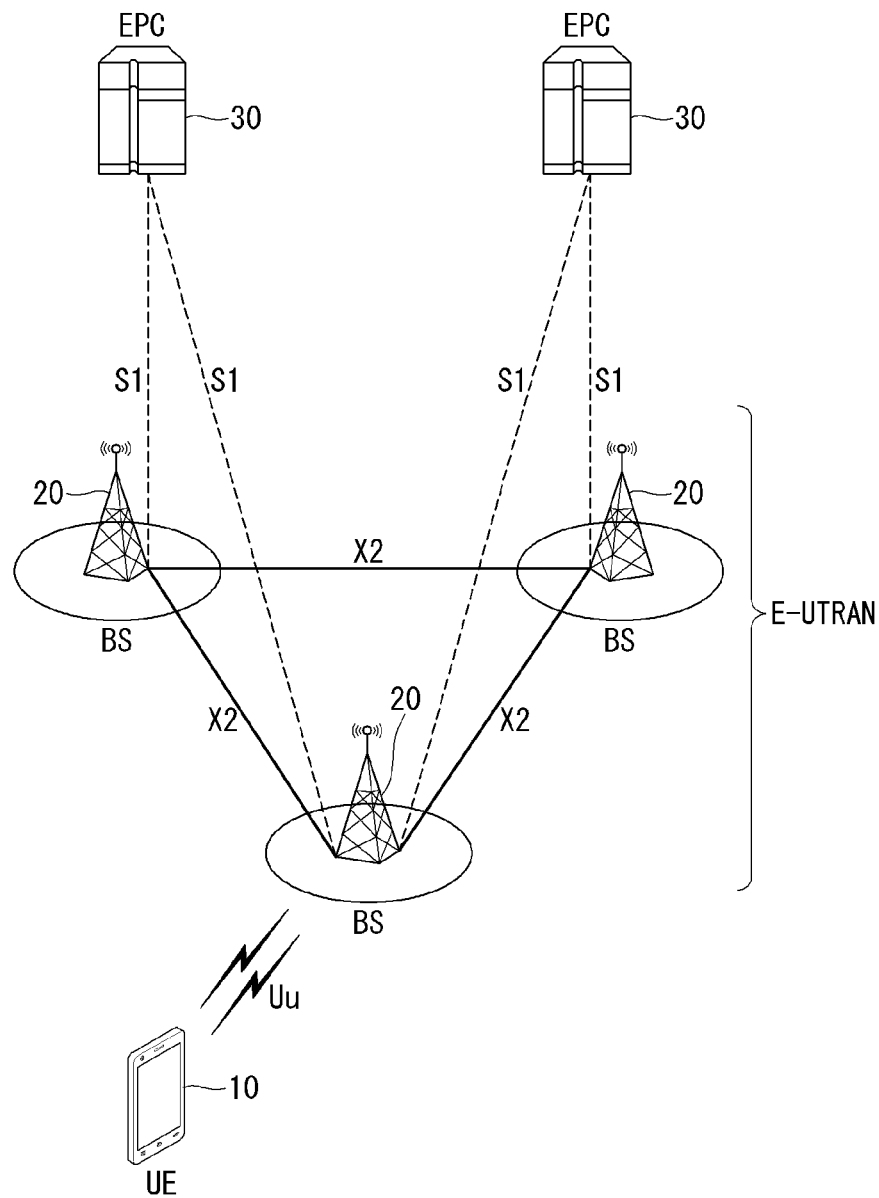

【Figure 3】
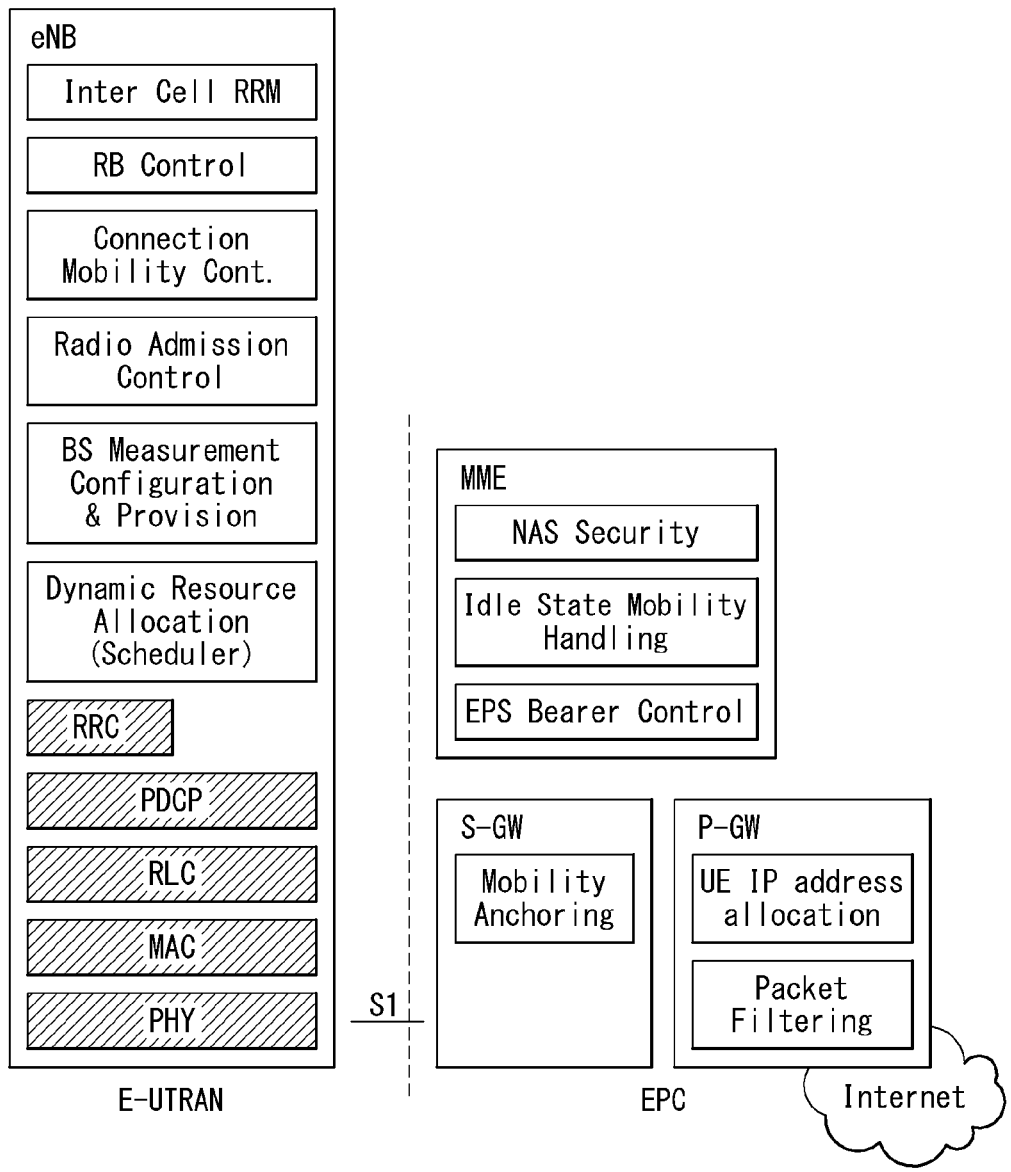

【Figure 4】
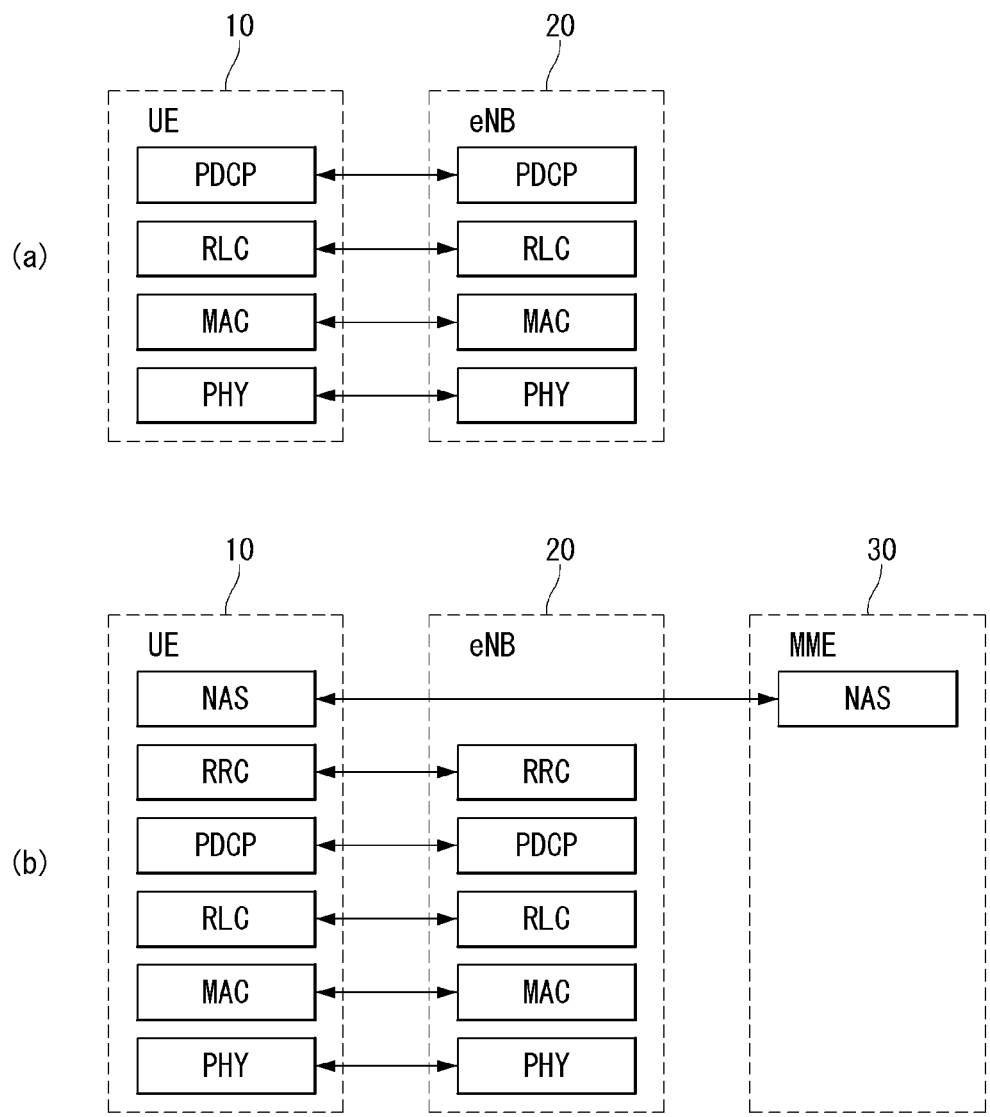

【Figure 5】
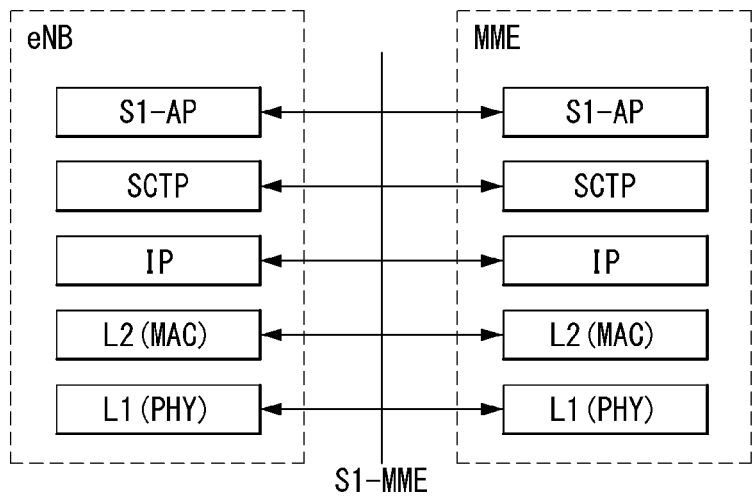
(a) control-plane protocol stack
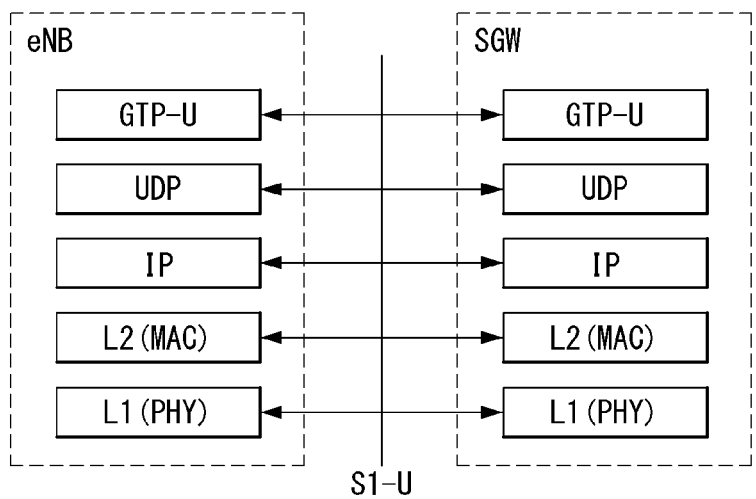
(b) user-plane protocol stack
【Figure 6】
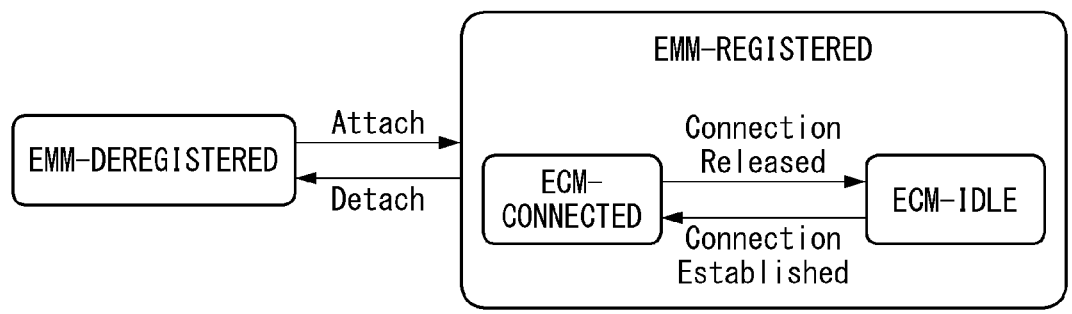

[Figure 7]
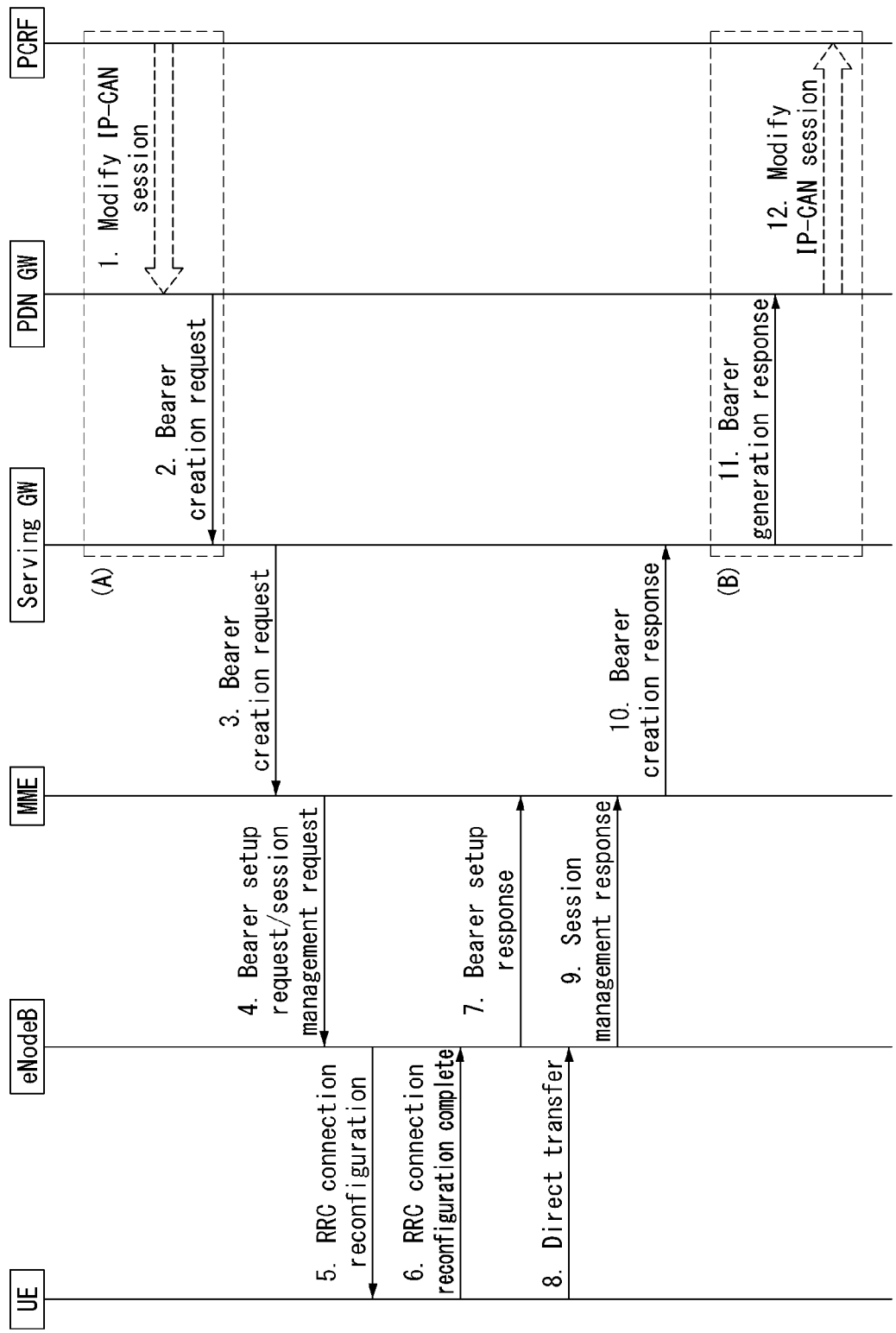

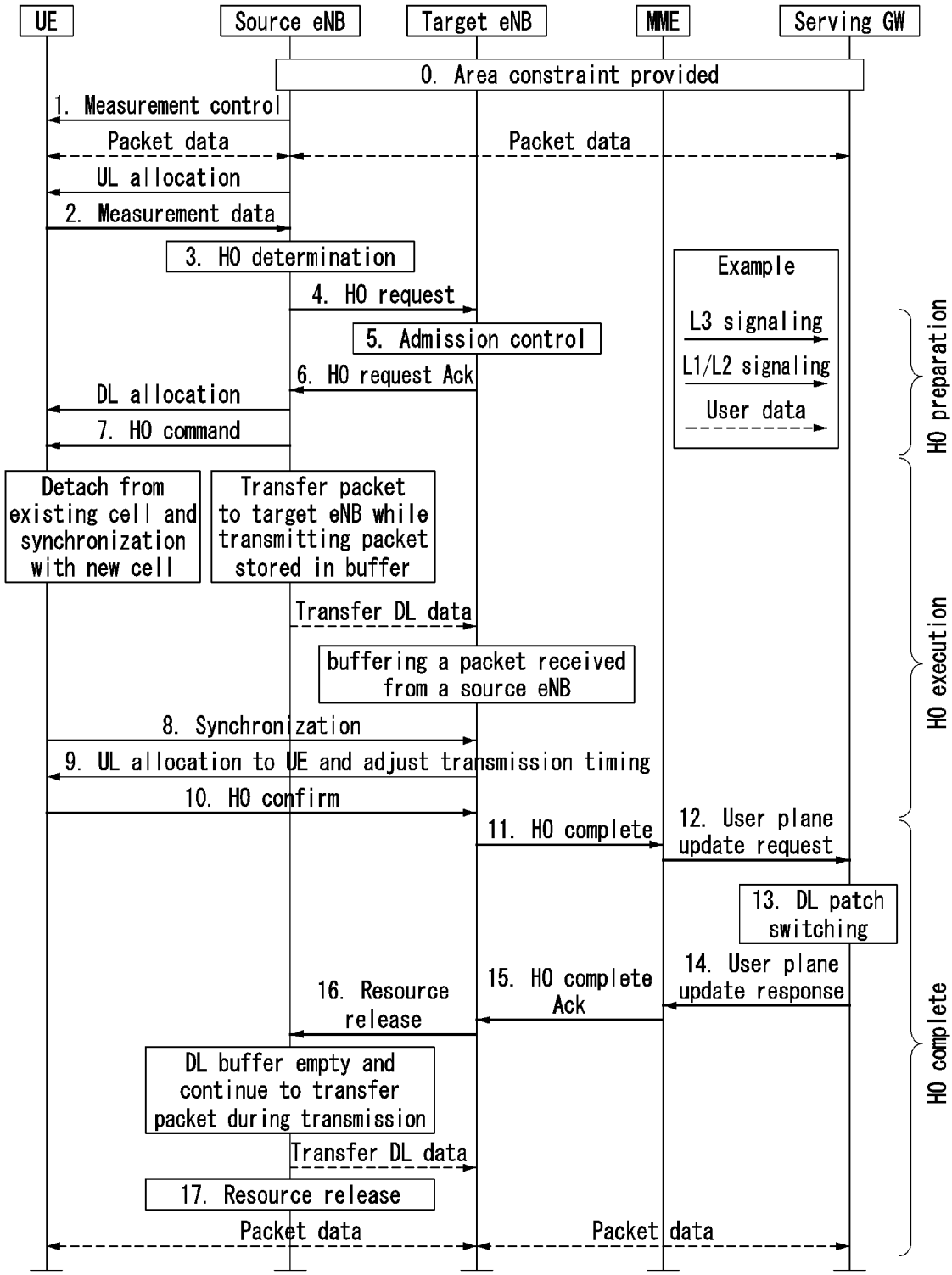
[Figure 8]

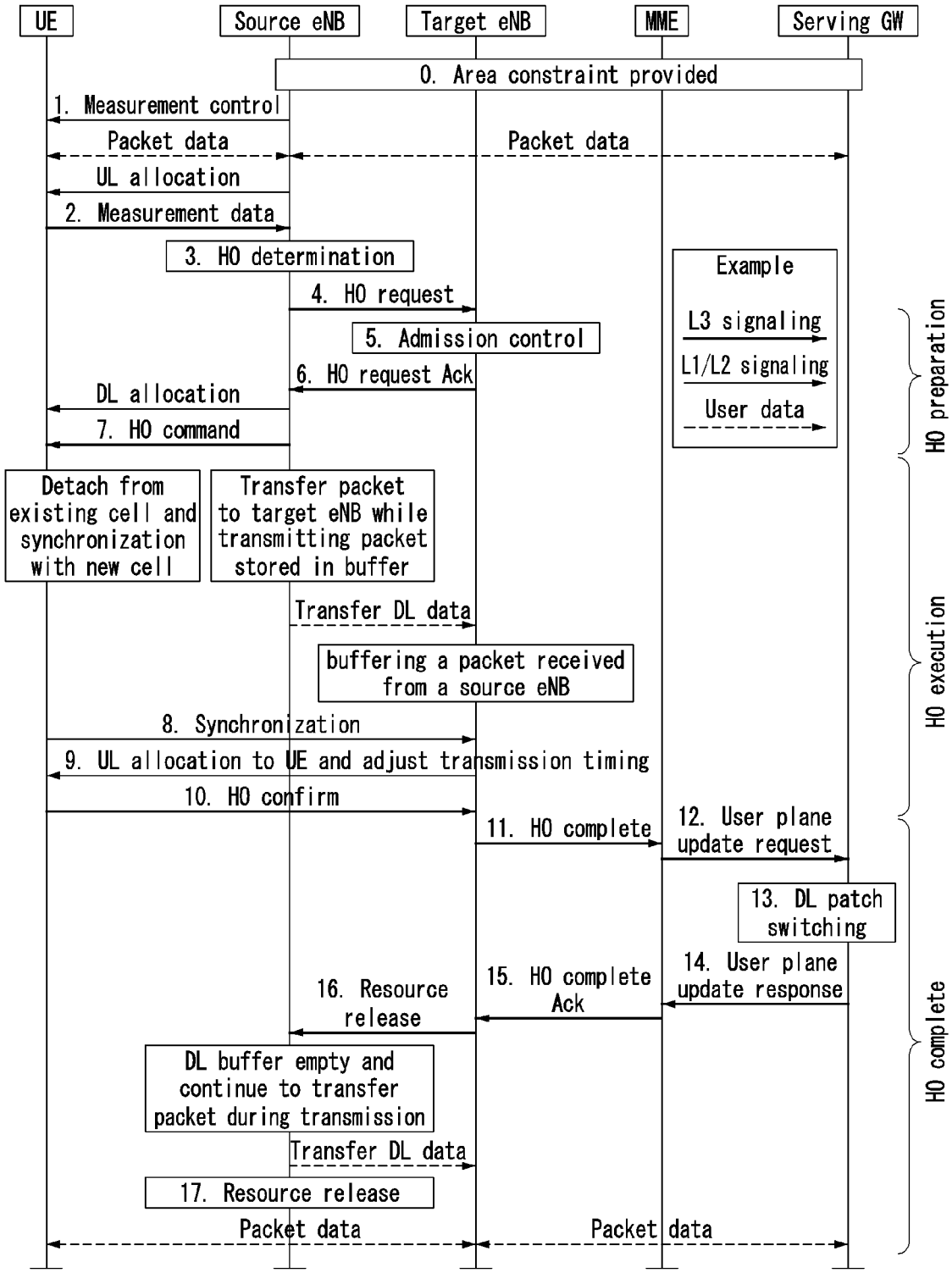

[Figure 10]
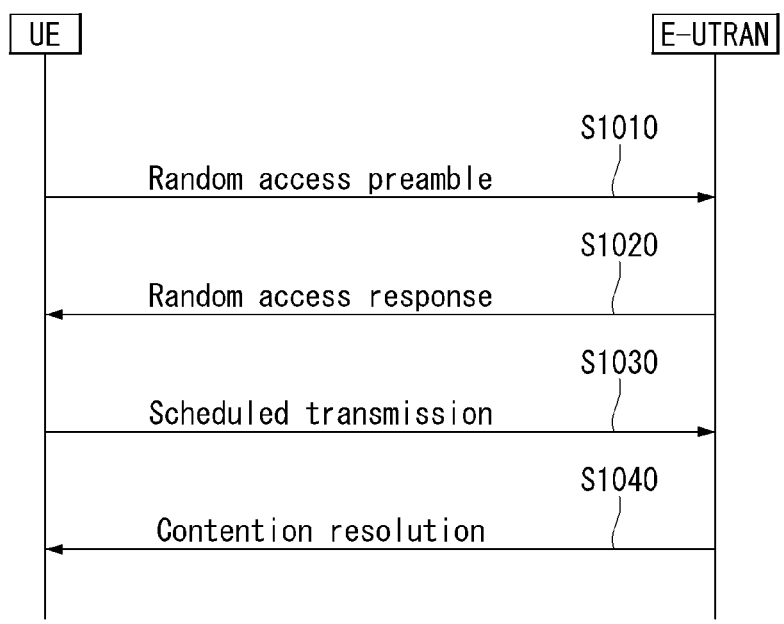

[Figure 11]
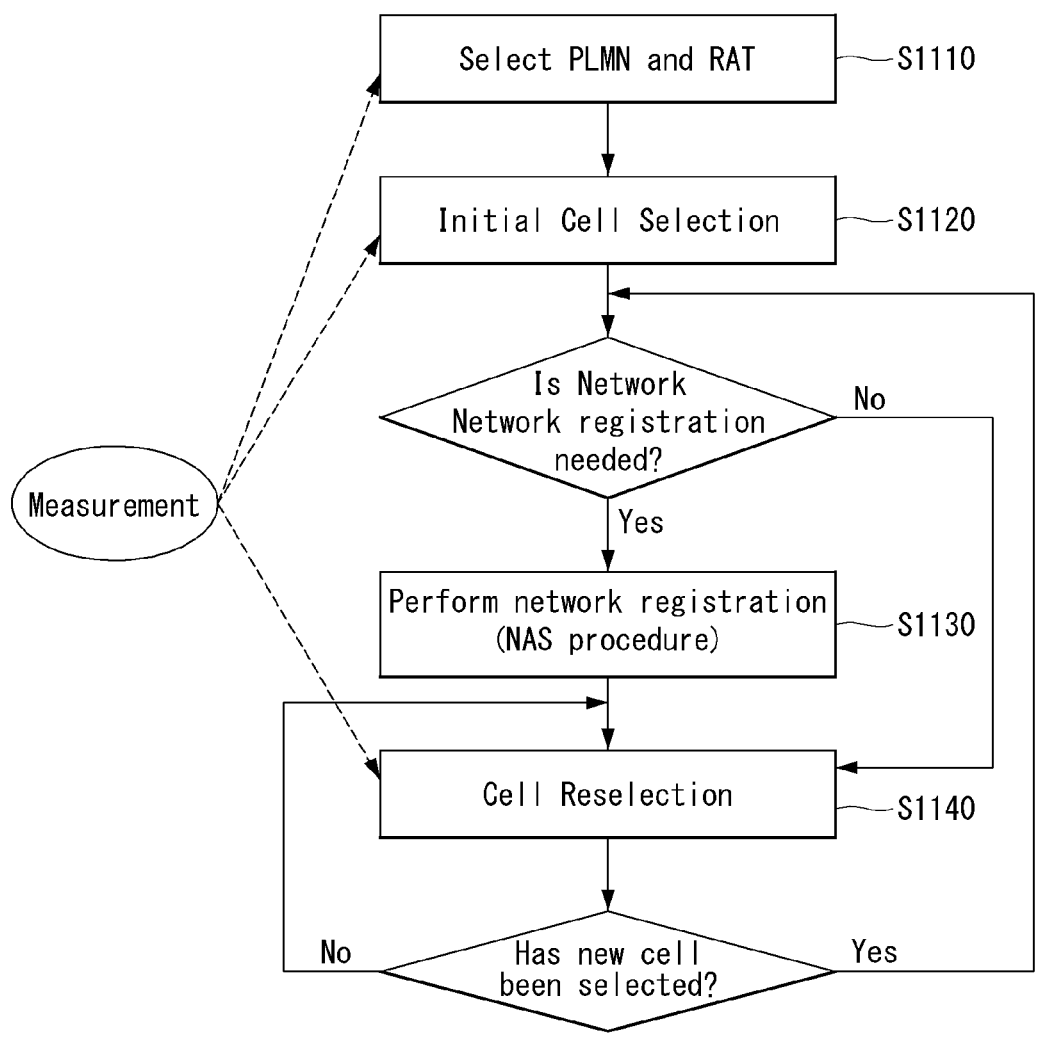

[Figure 12]
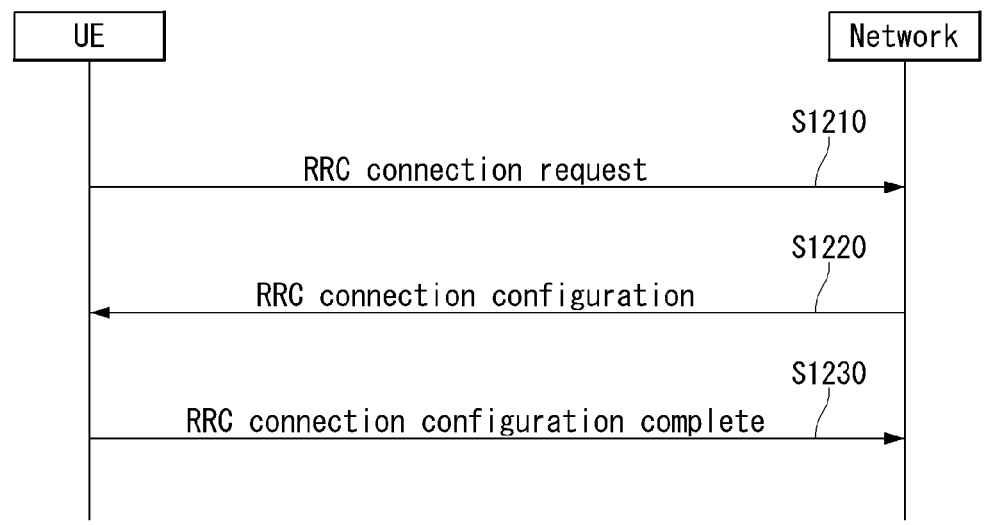
[Figure 13]
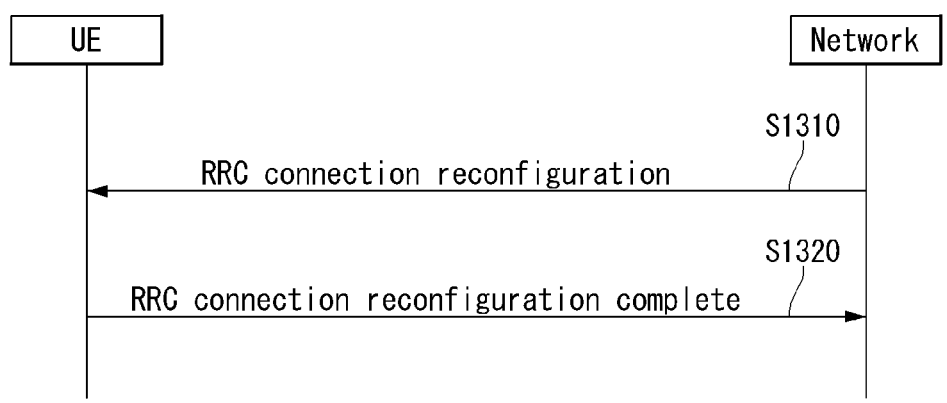

[Figure 14]
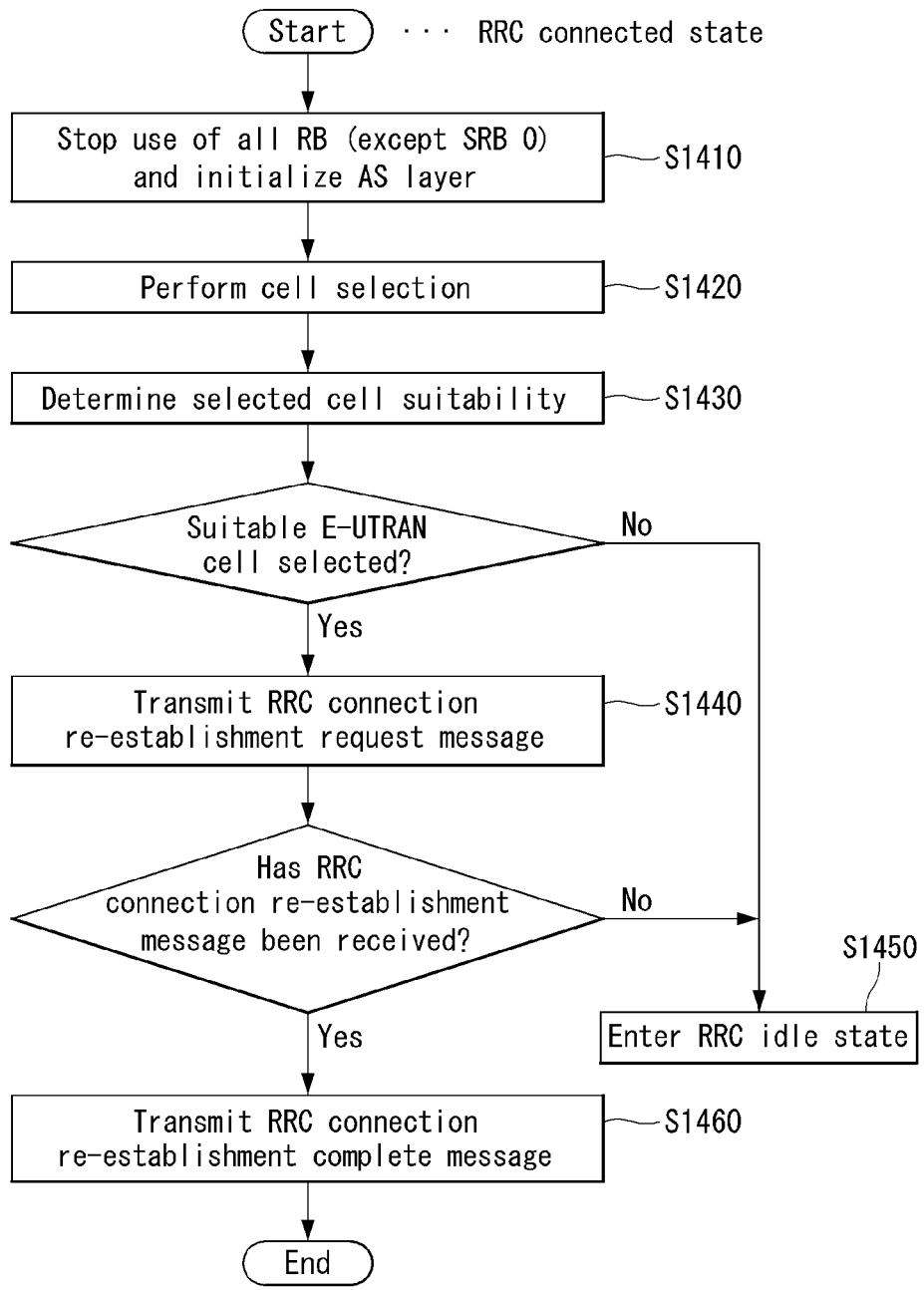

【Figure 15】
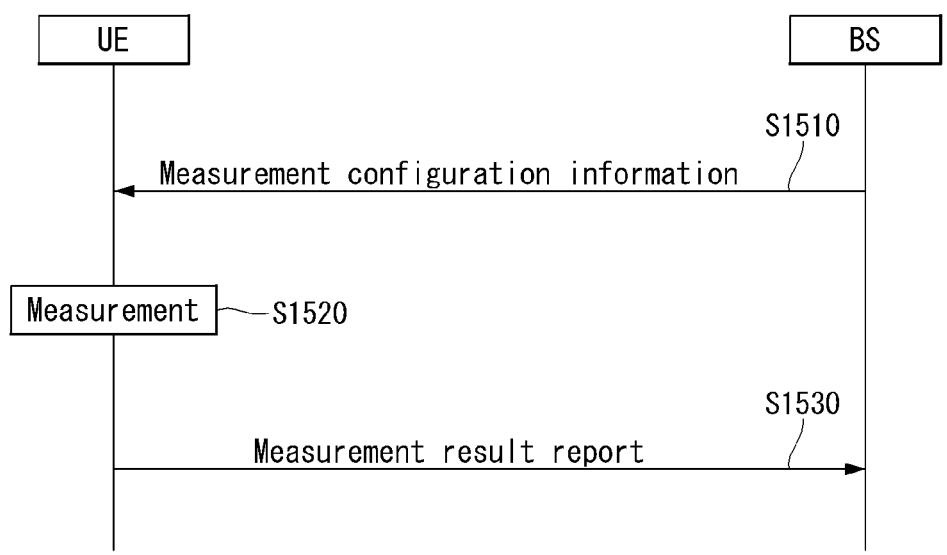

【Figure 16a】
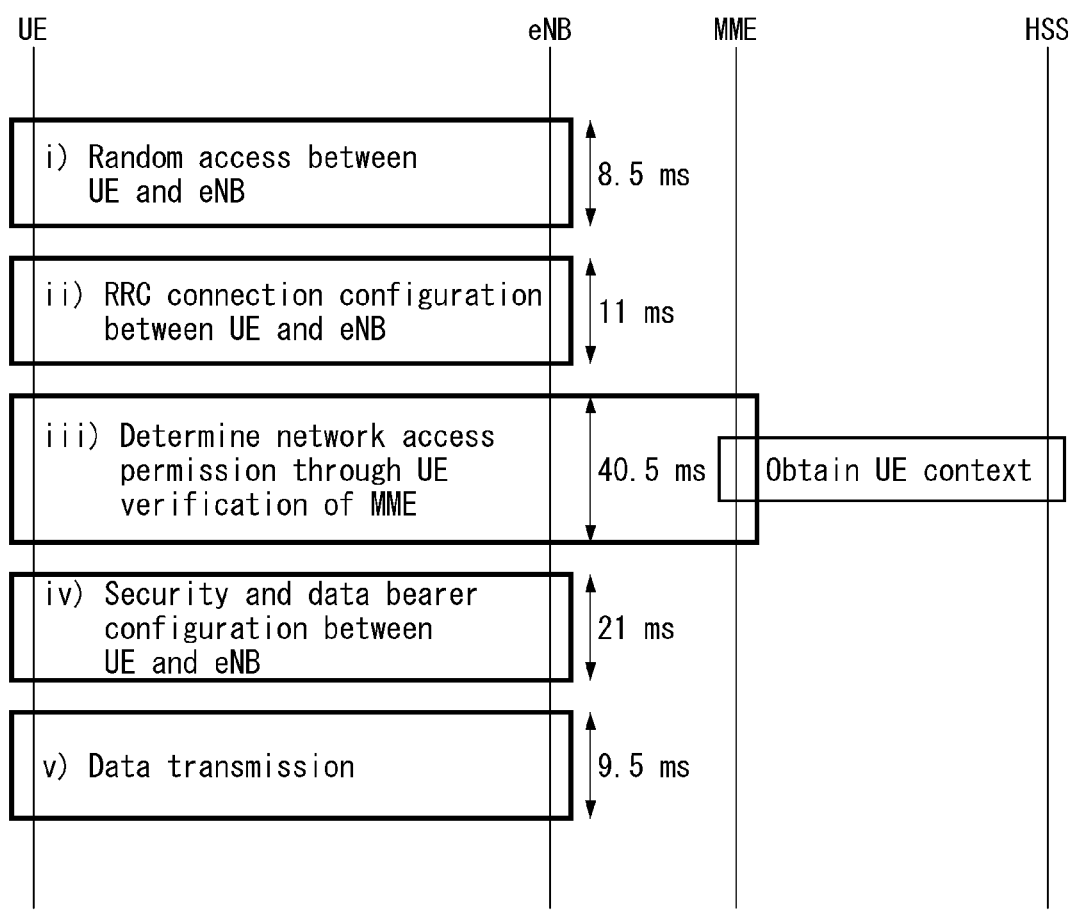

【Figure 16b】
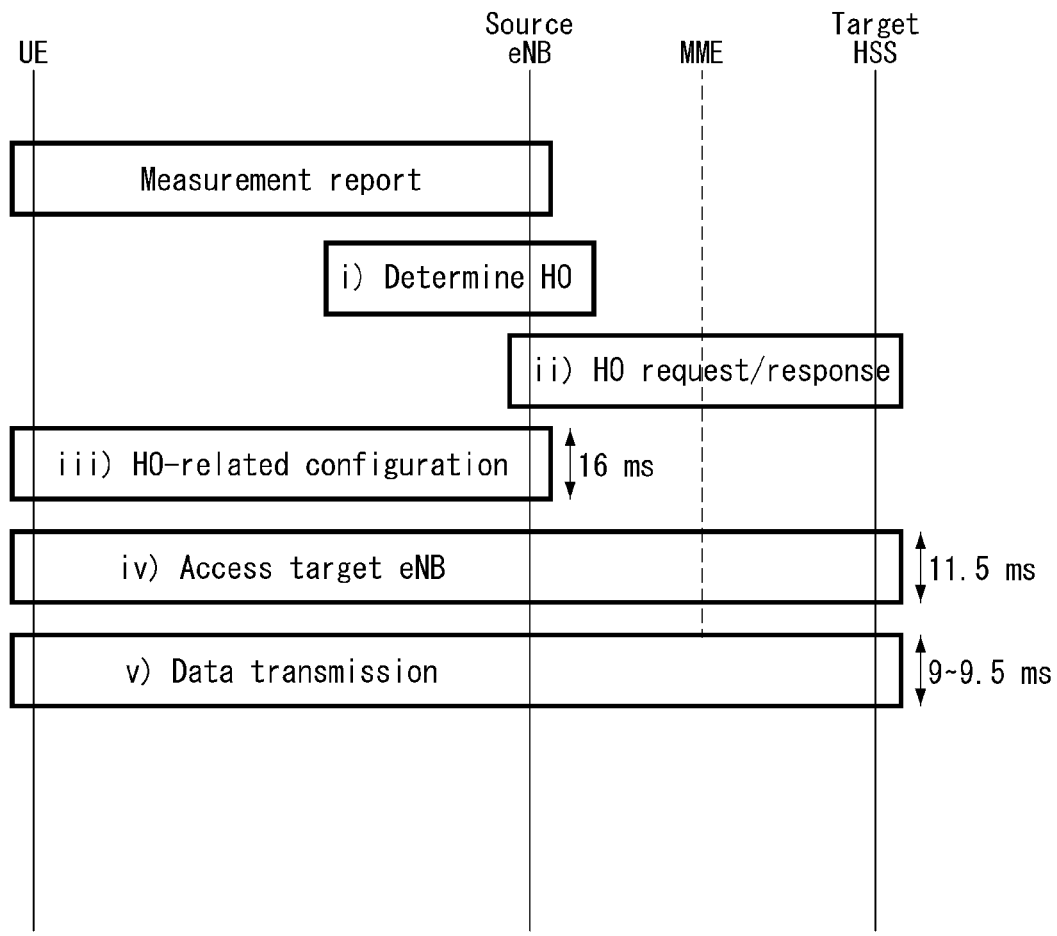
【Figure 16c】
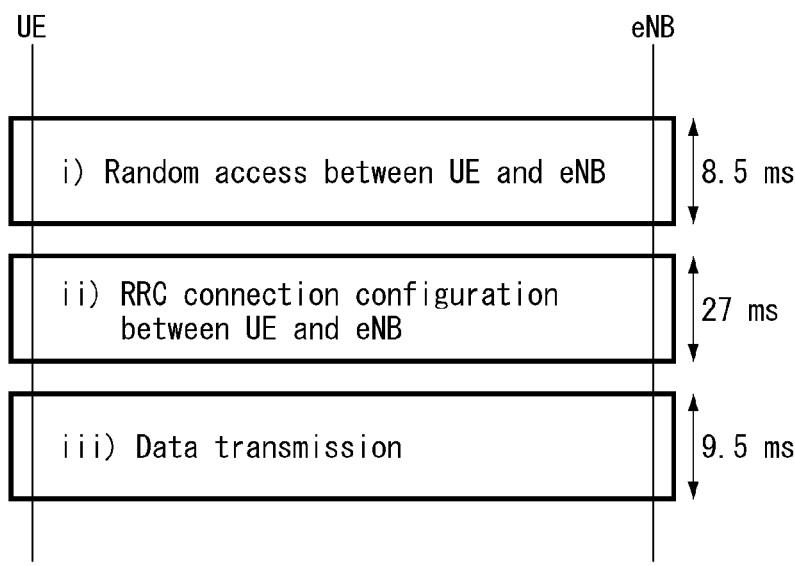

【Figure 17】
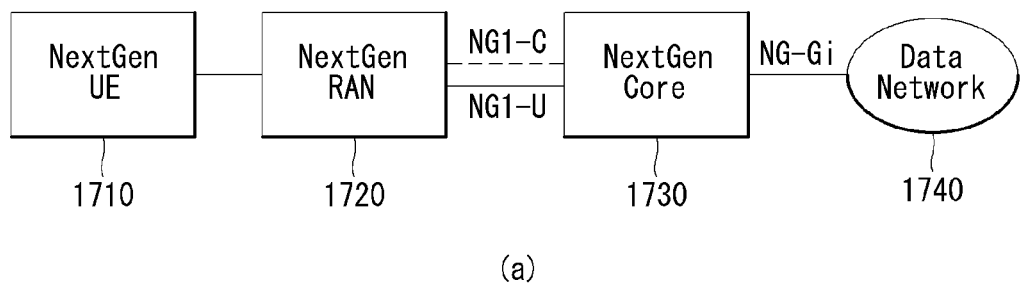
(a)
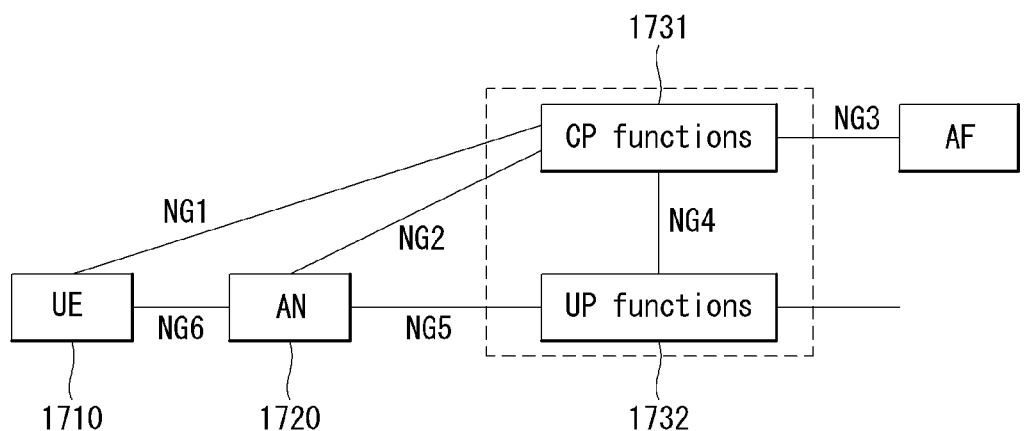
(b)

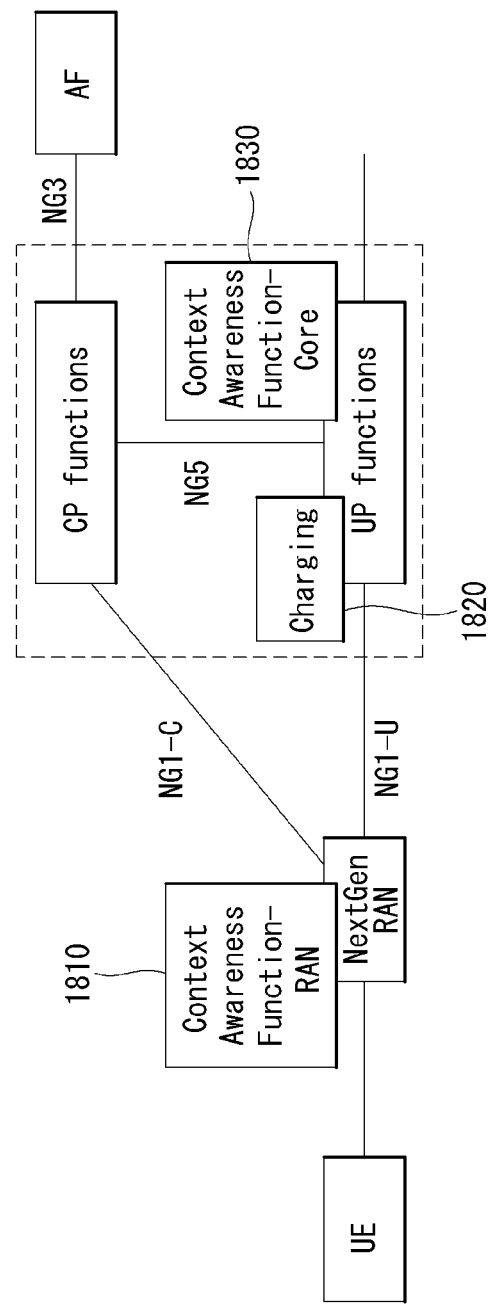
[Figure 18]

【Figure 19】
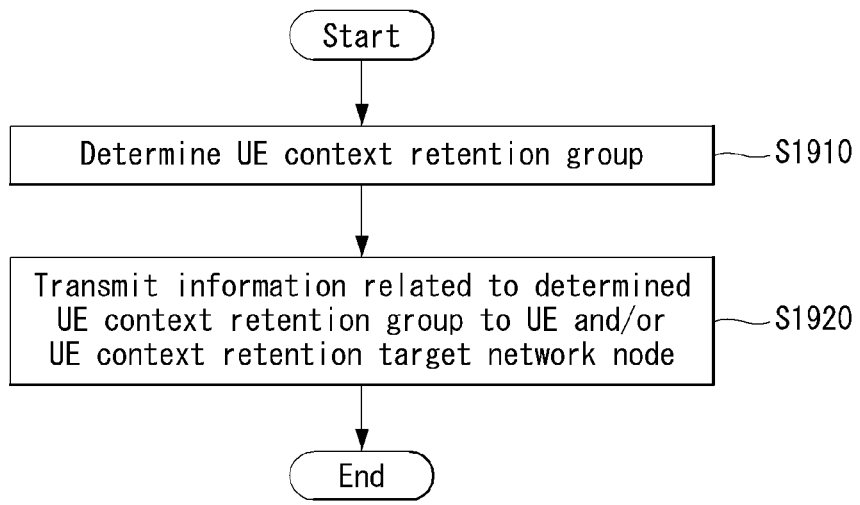
【Figure 20】
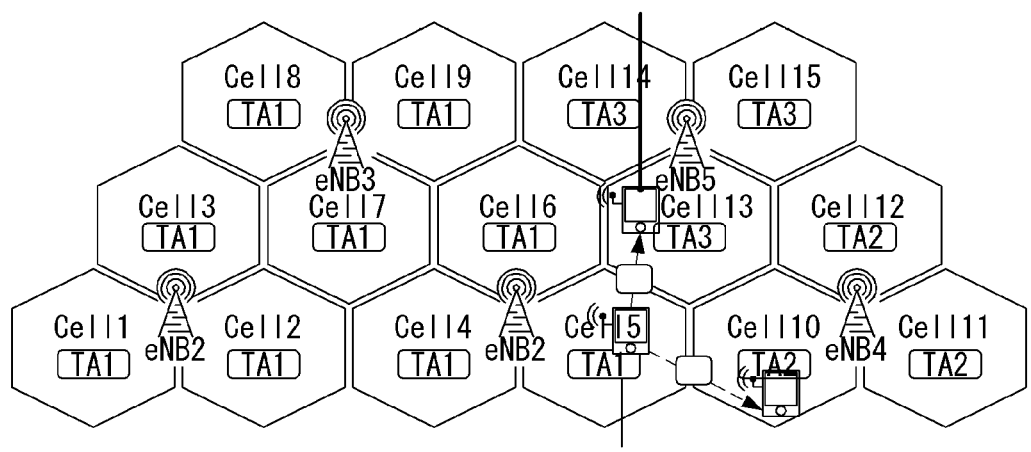

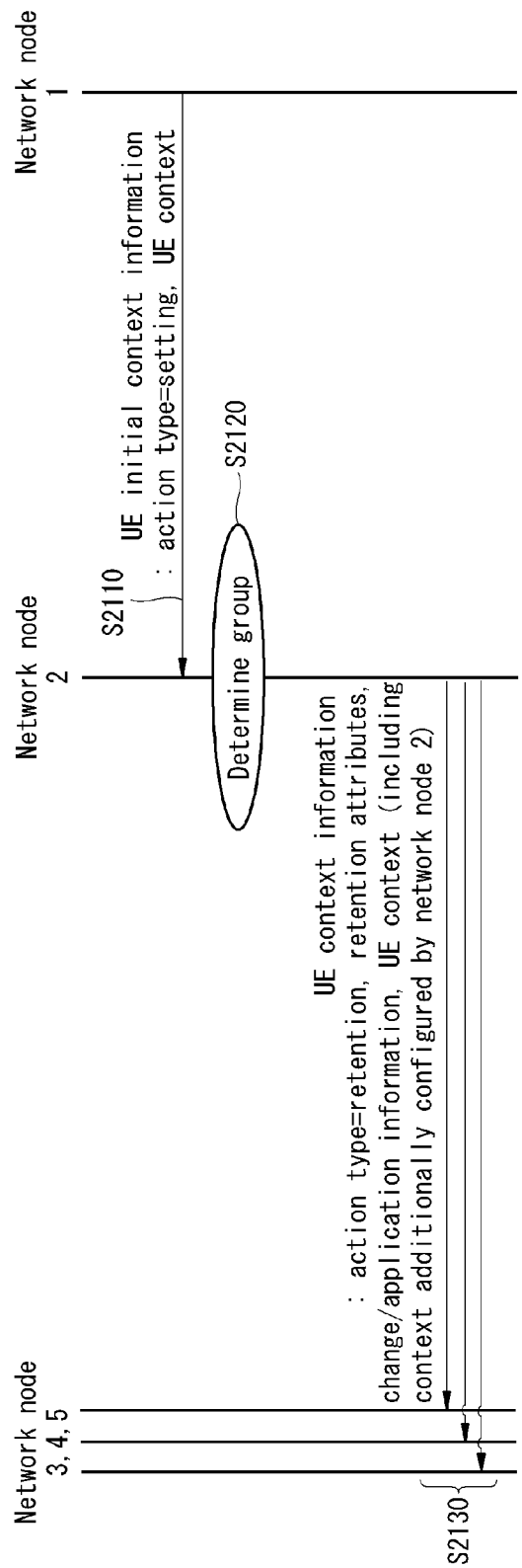
[Figure 21]

【Figure 22】
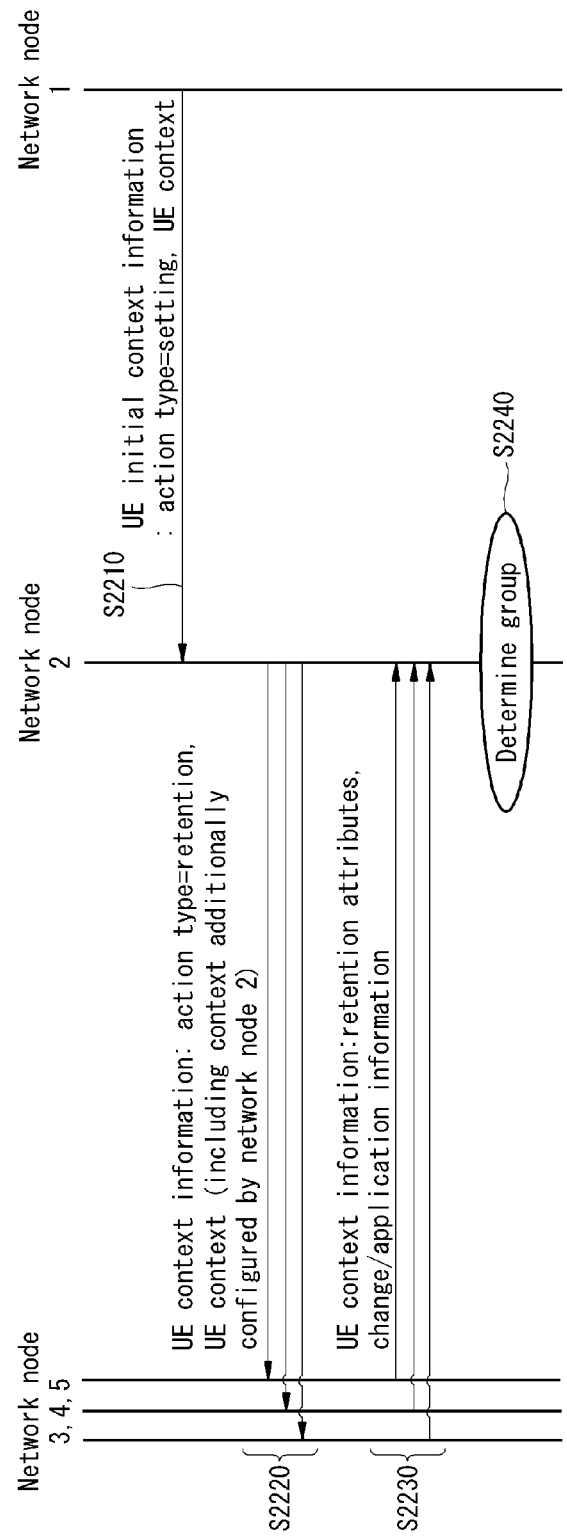

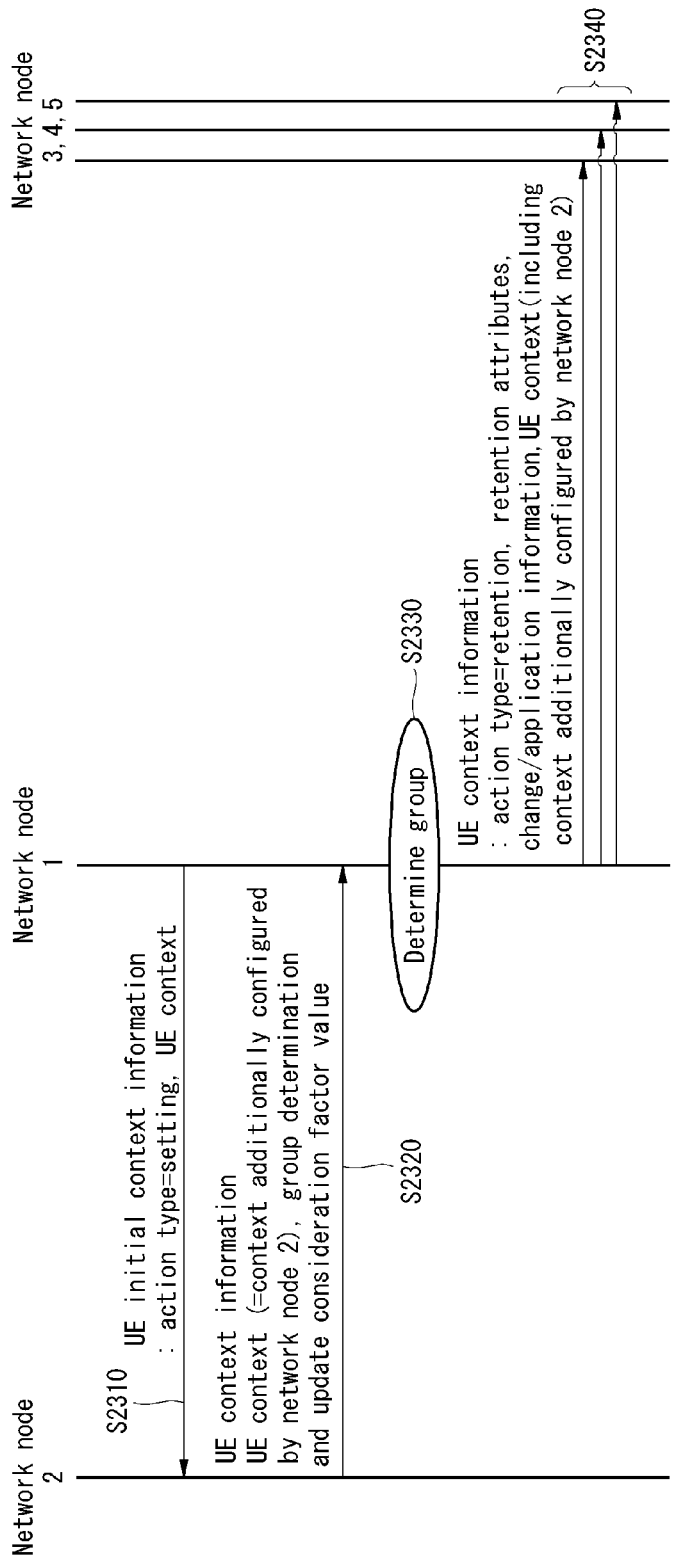
[Figure 23]

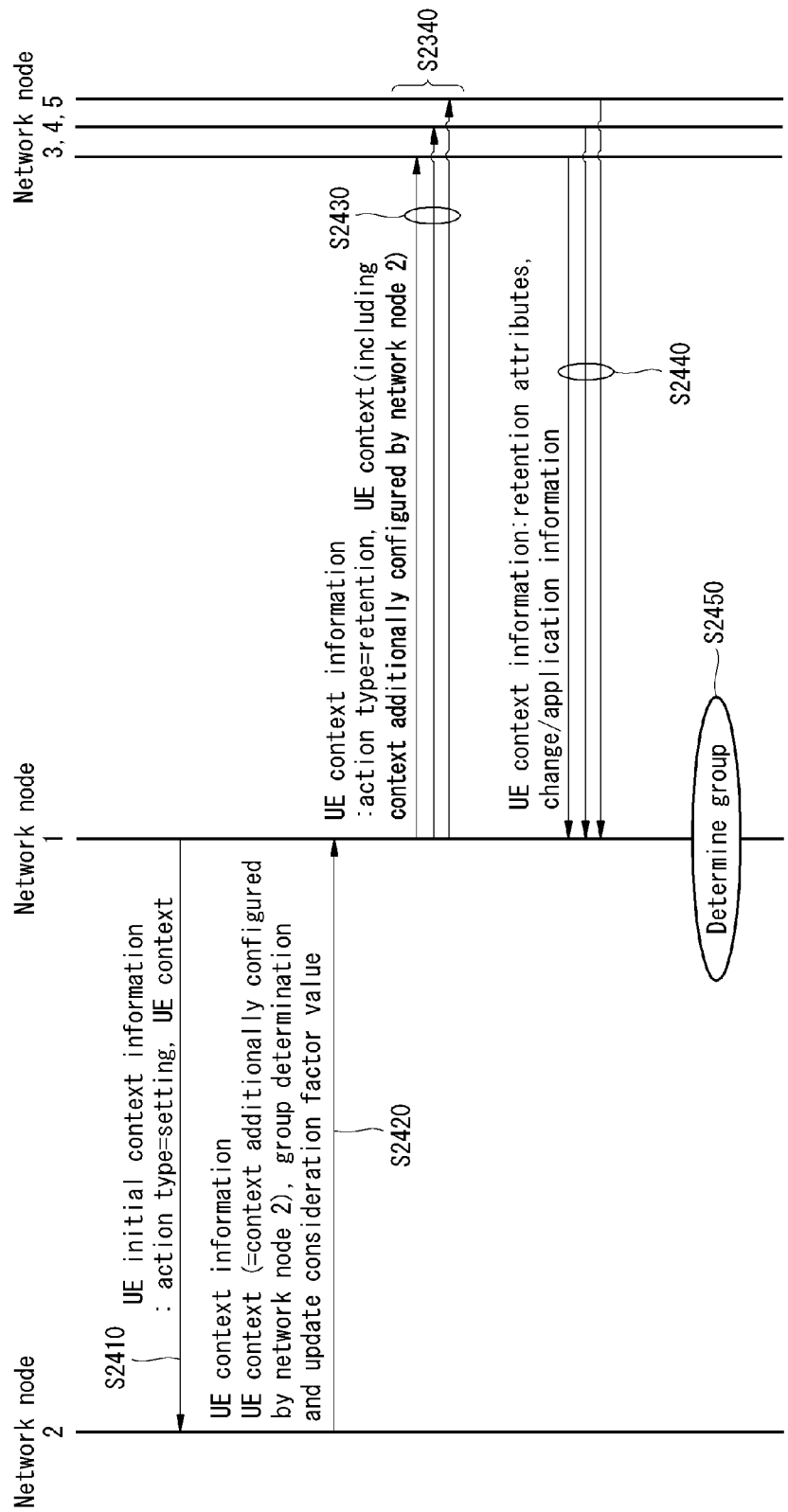
[Figure 24]

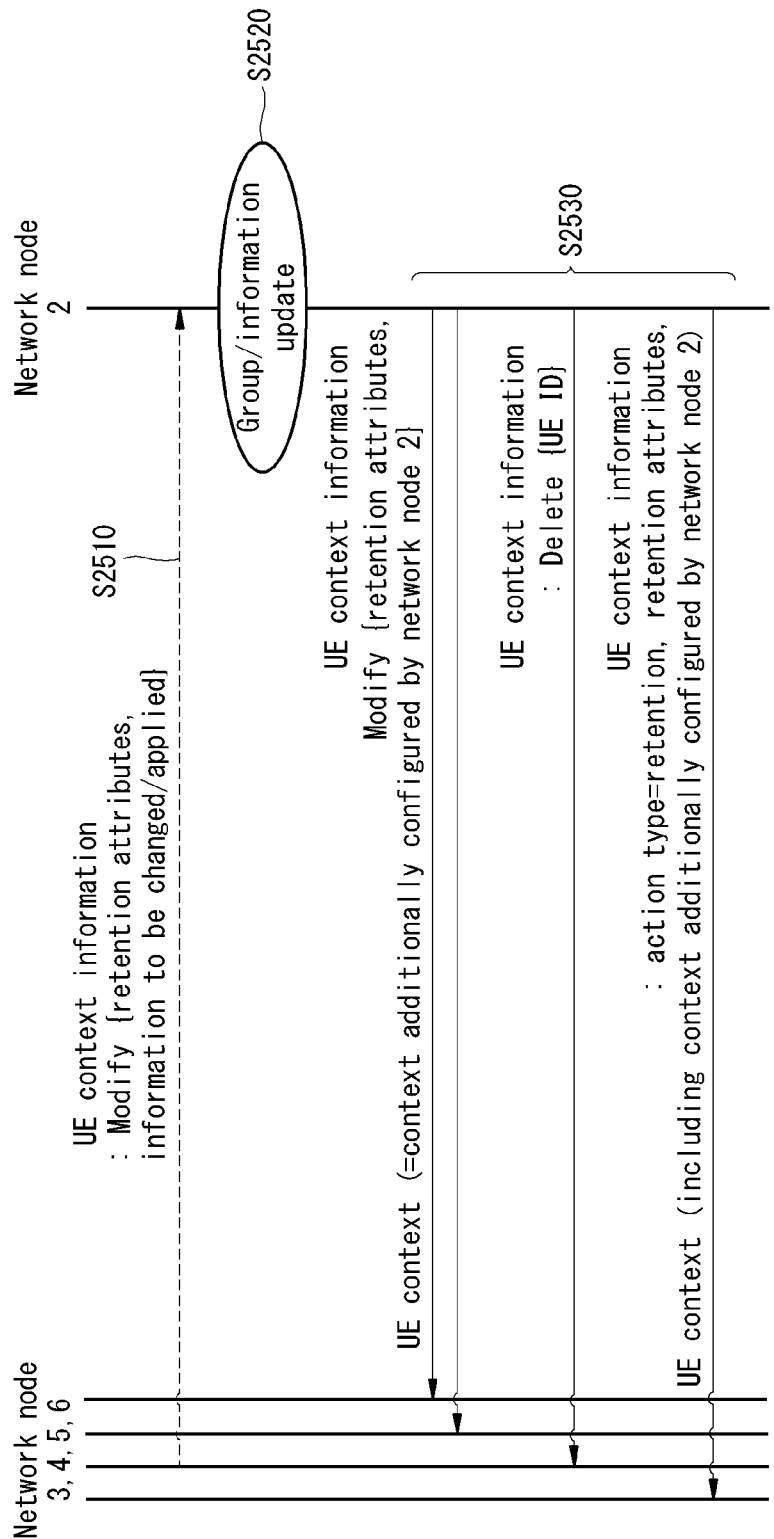
[Figure 25]

[Figure 26]
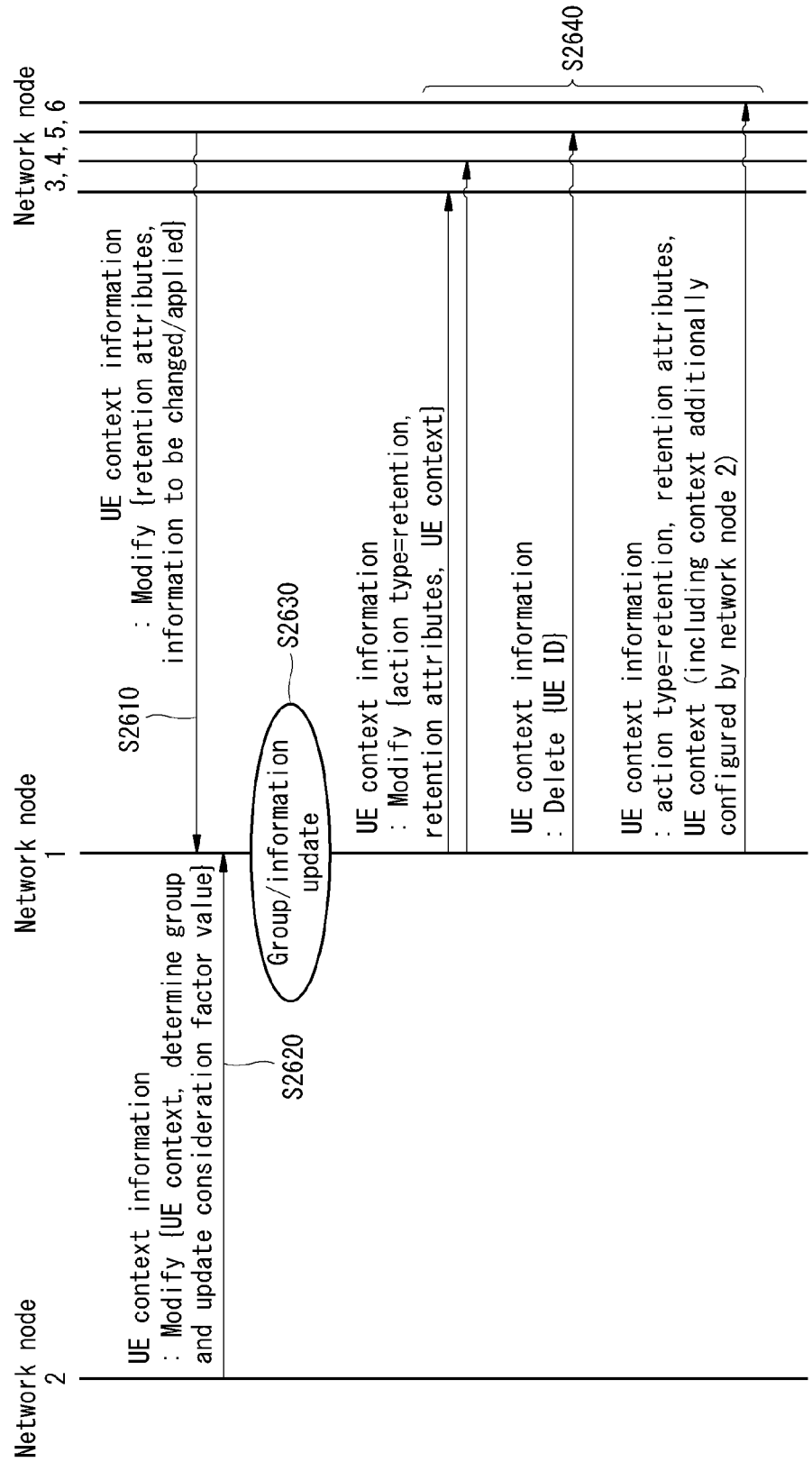

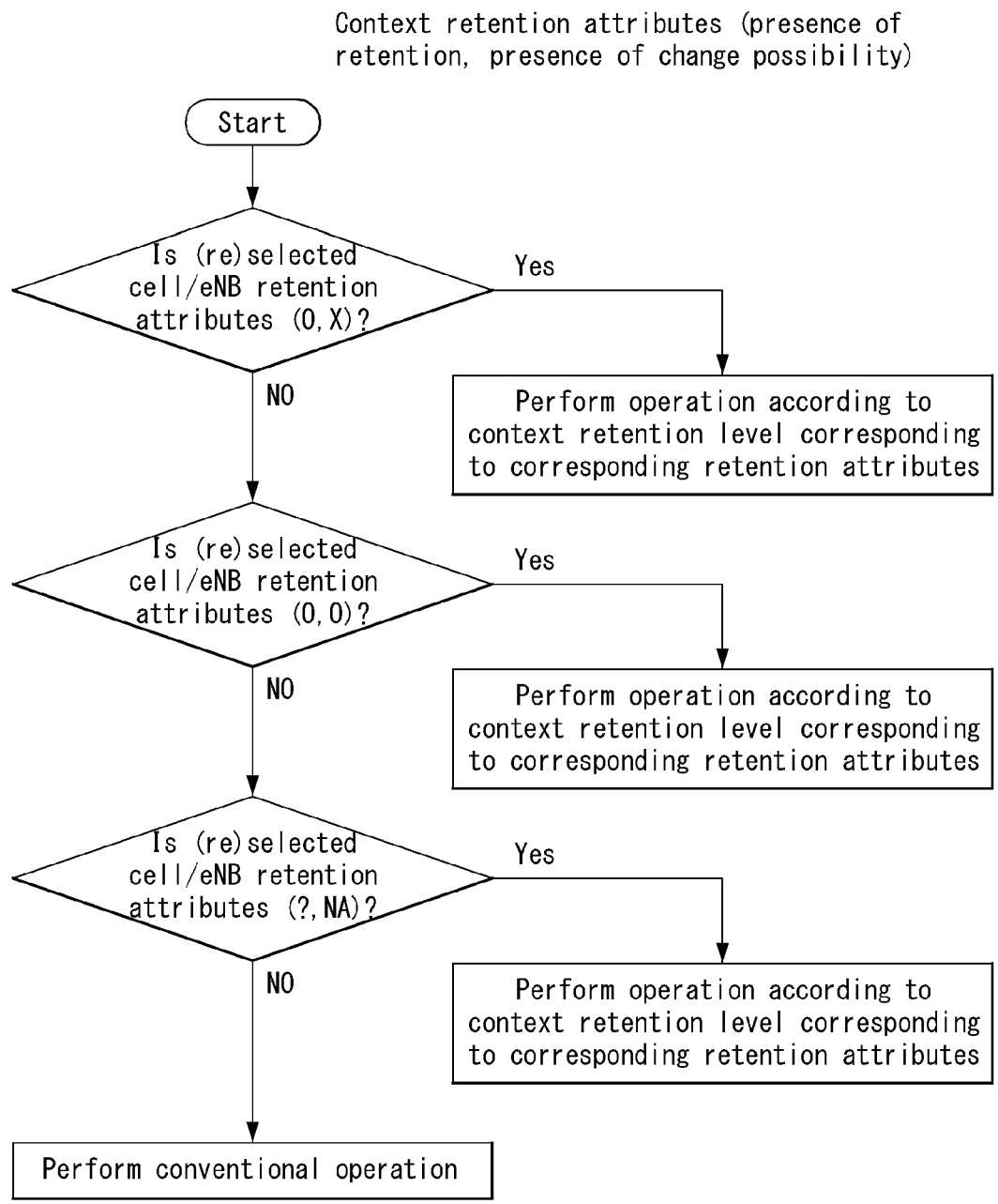
[Figure 27]

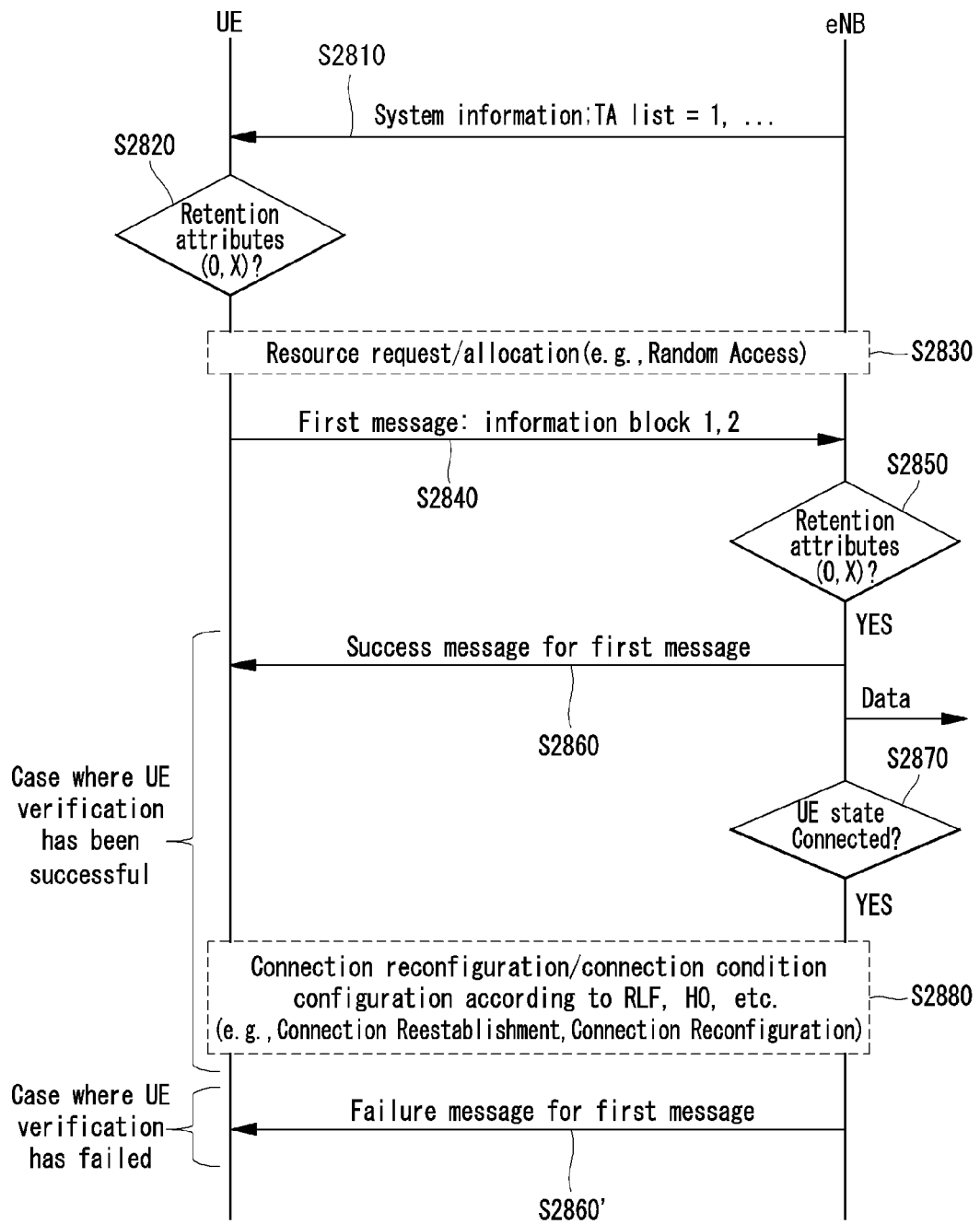
[Figure 28]

[Figure 29]
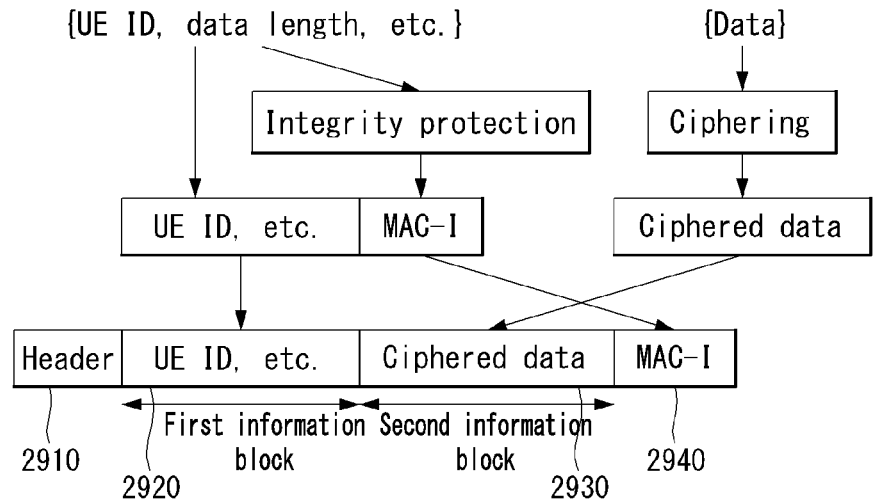
[Figure 30]
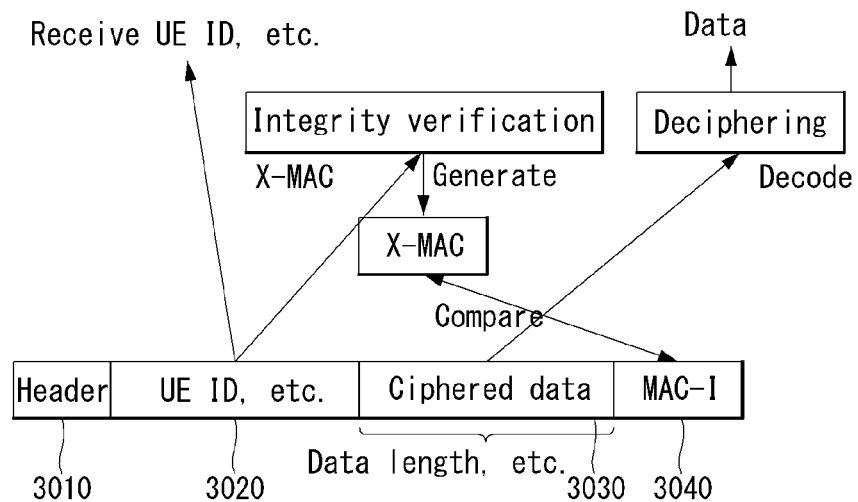

【Figure 31】
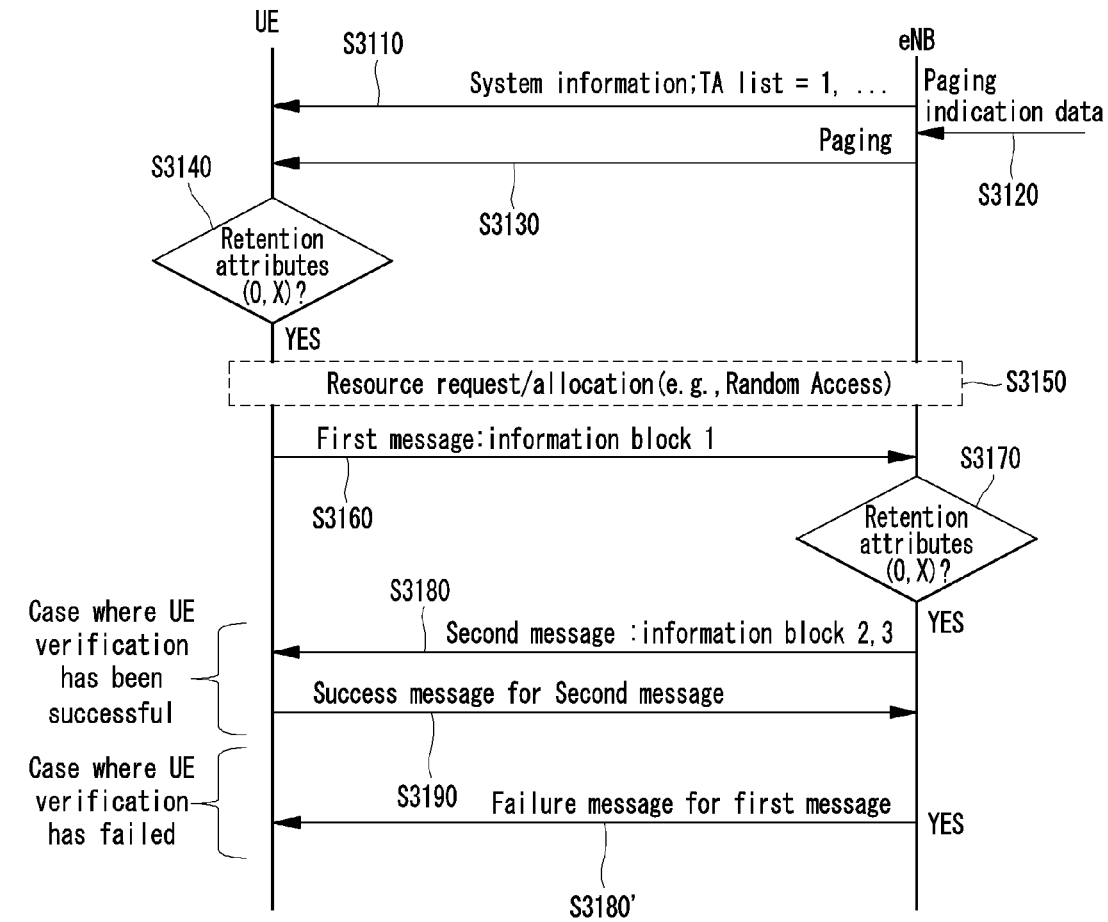
【Figure 32】
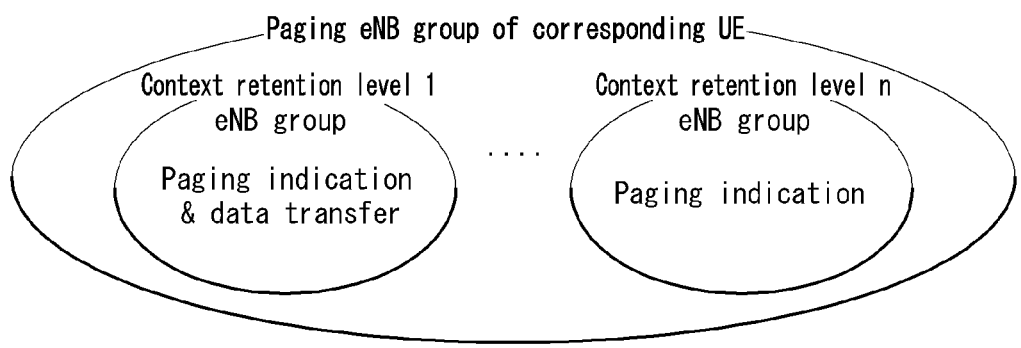

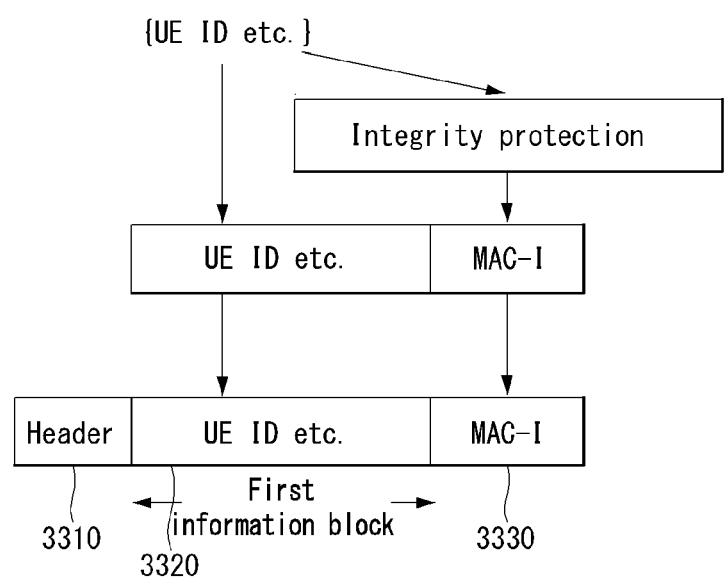
【Figure 33】

[Figure 34]
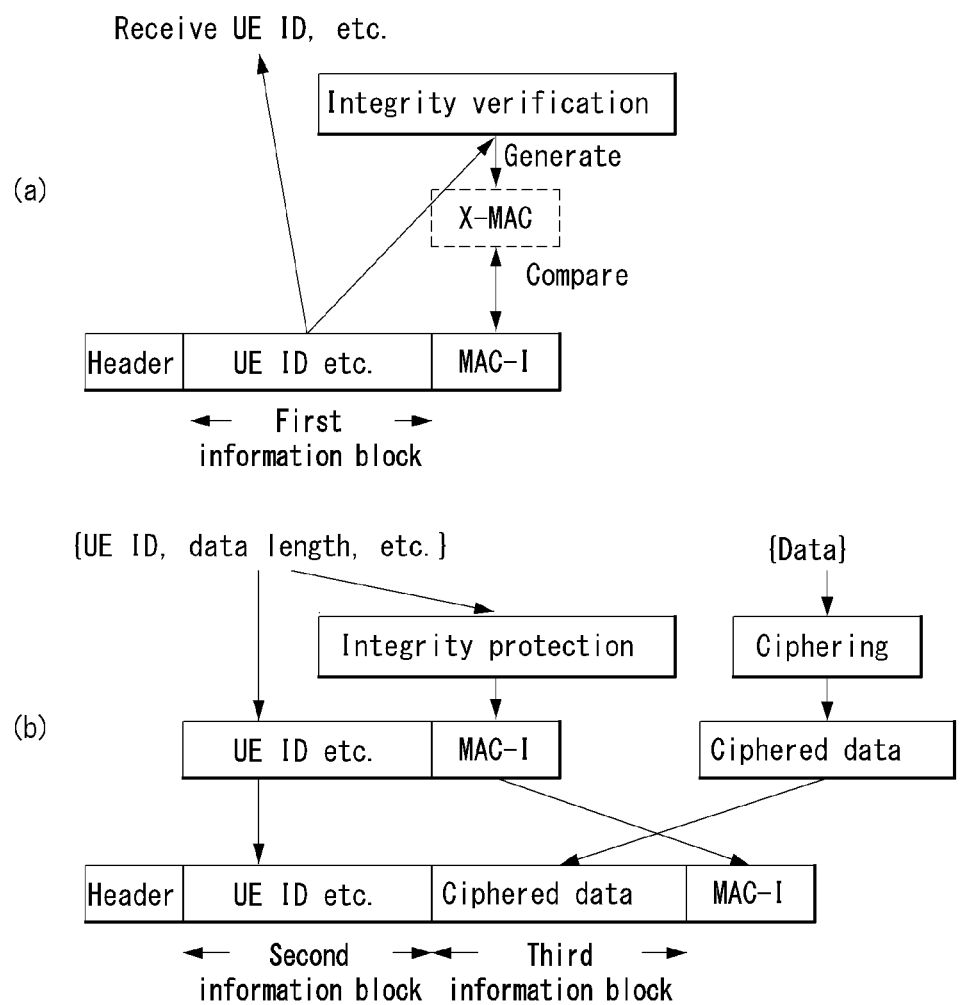

【Figure 35】
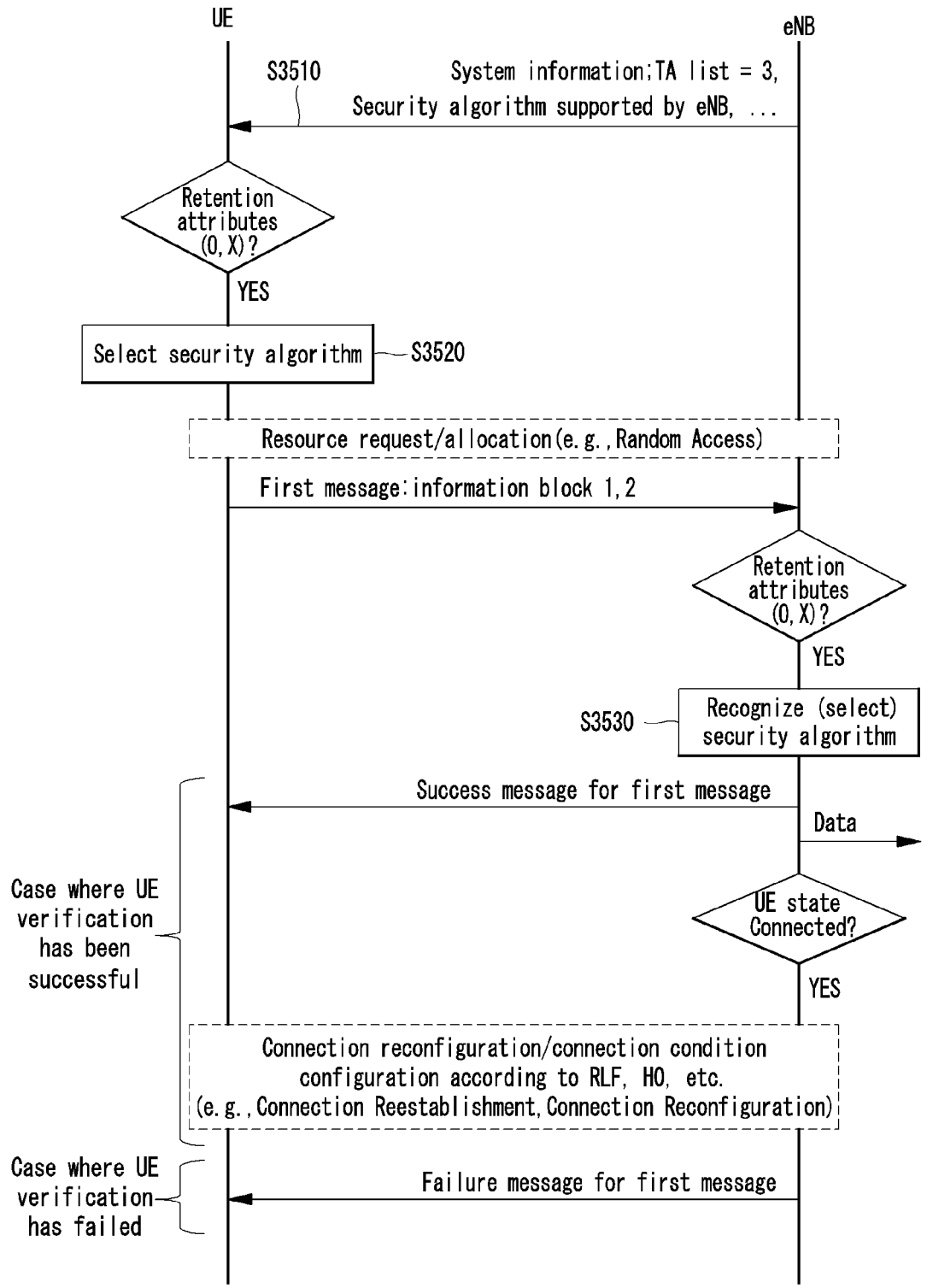

[Figure 36]
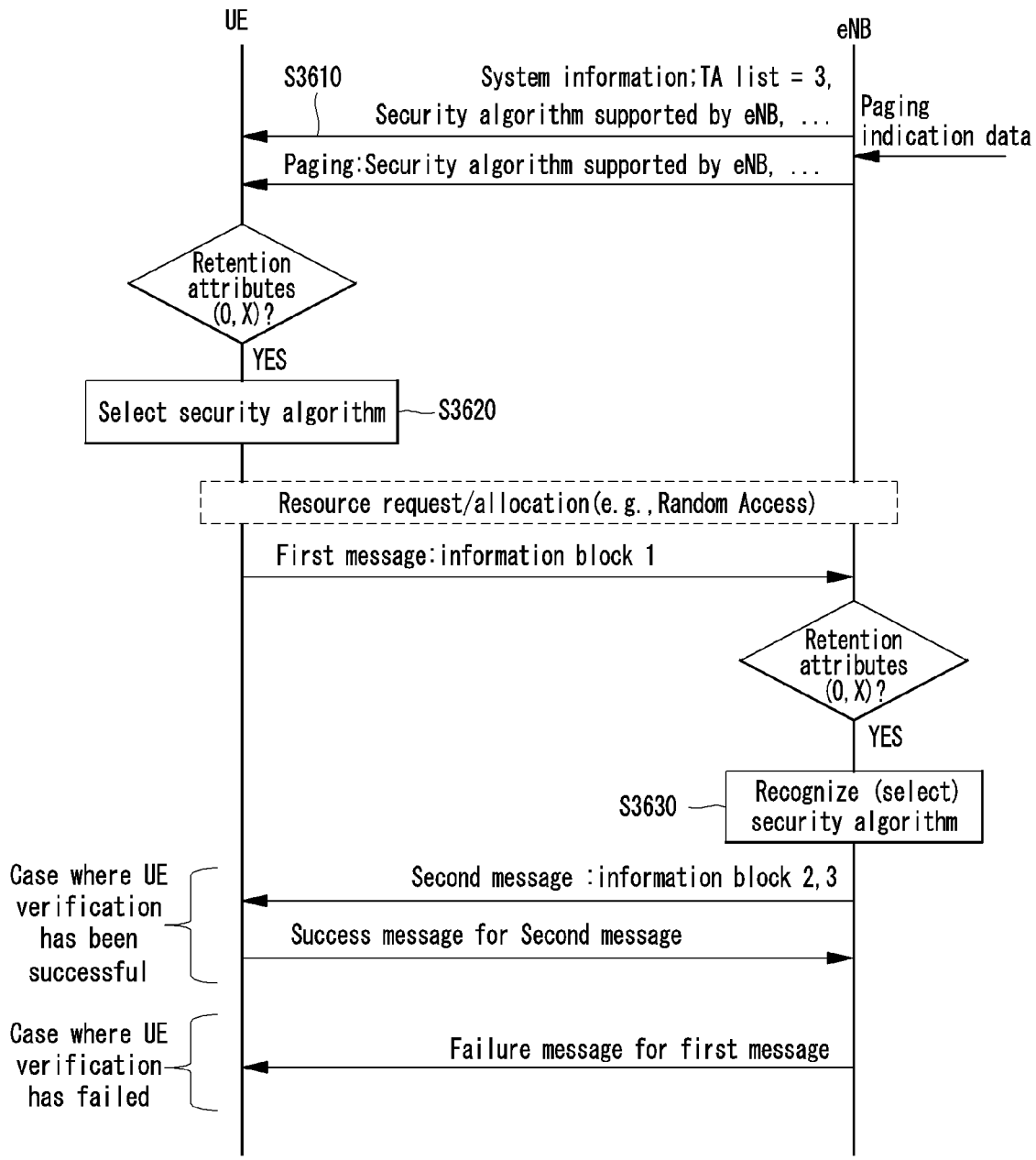

【Figure 37】
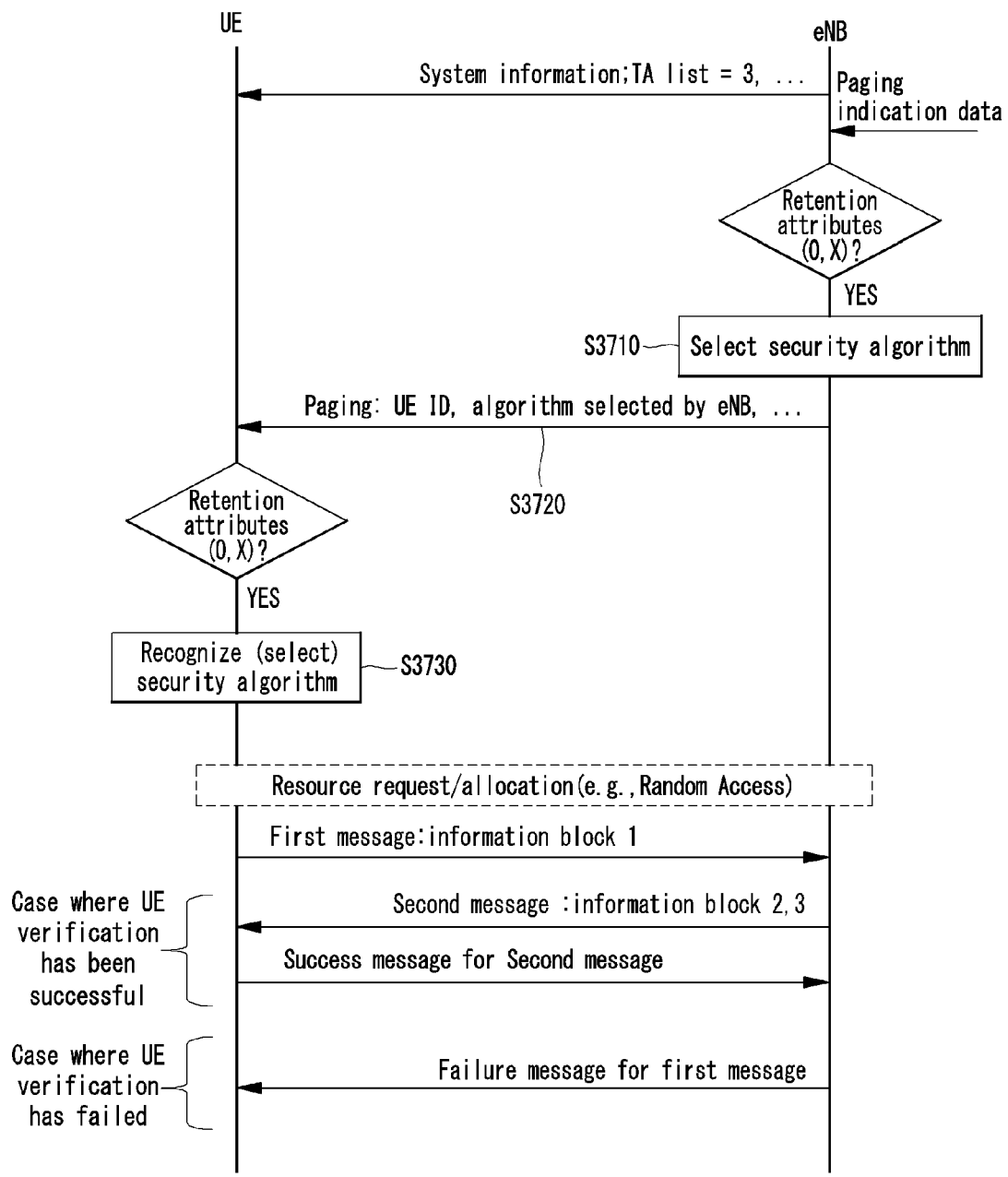

【Figure 38】
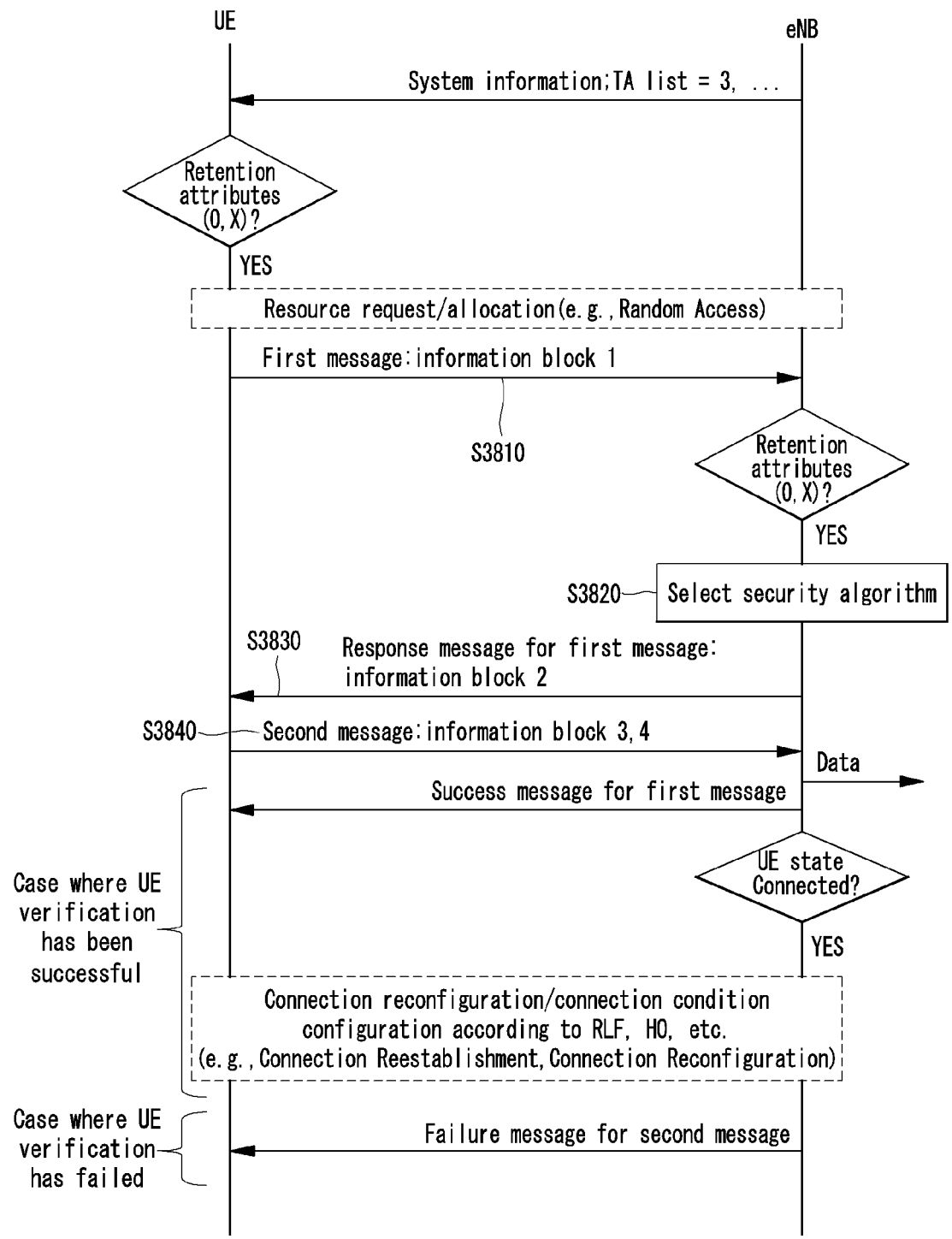

[Figure 39]
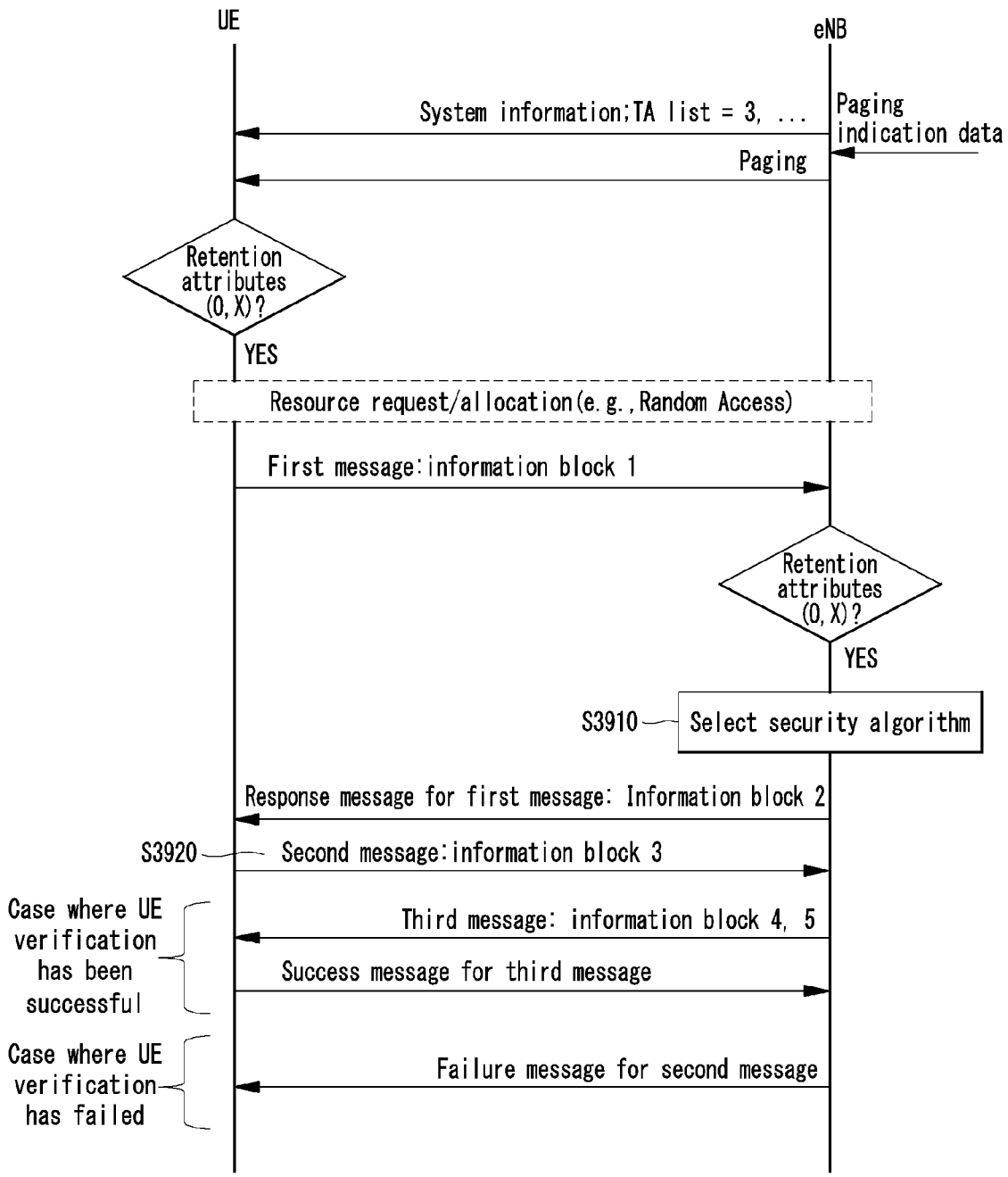

【Figure 40】
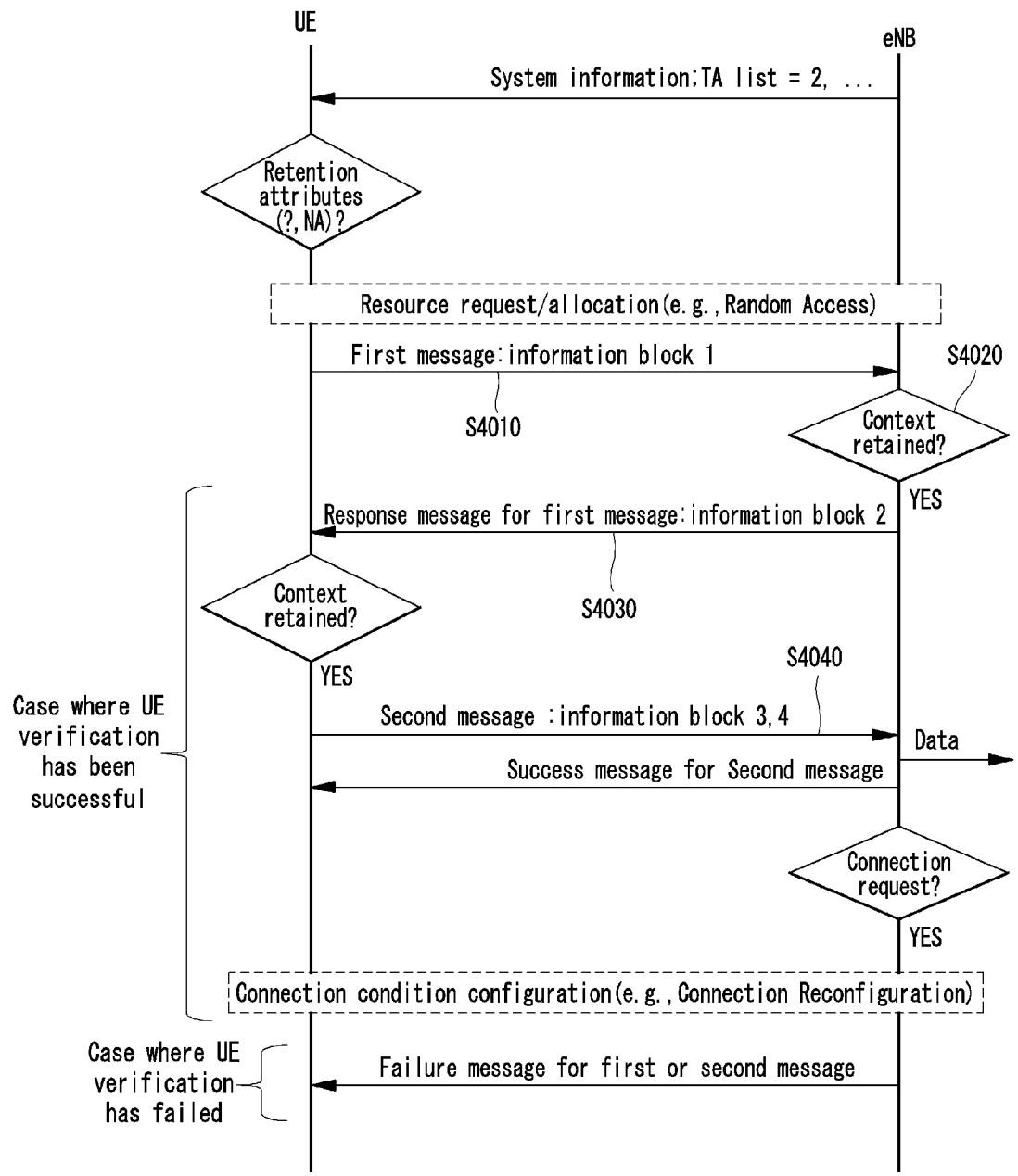

【Figure 41】
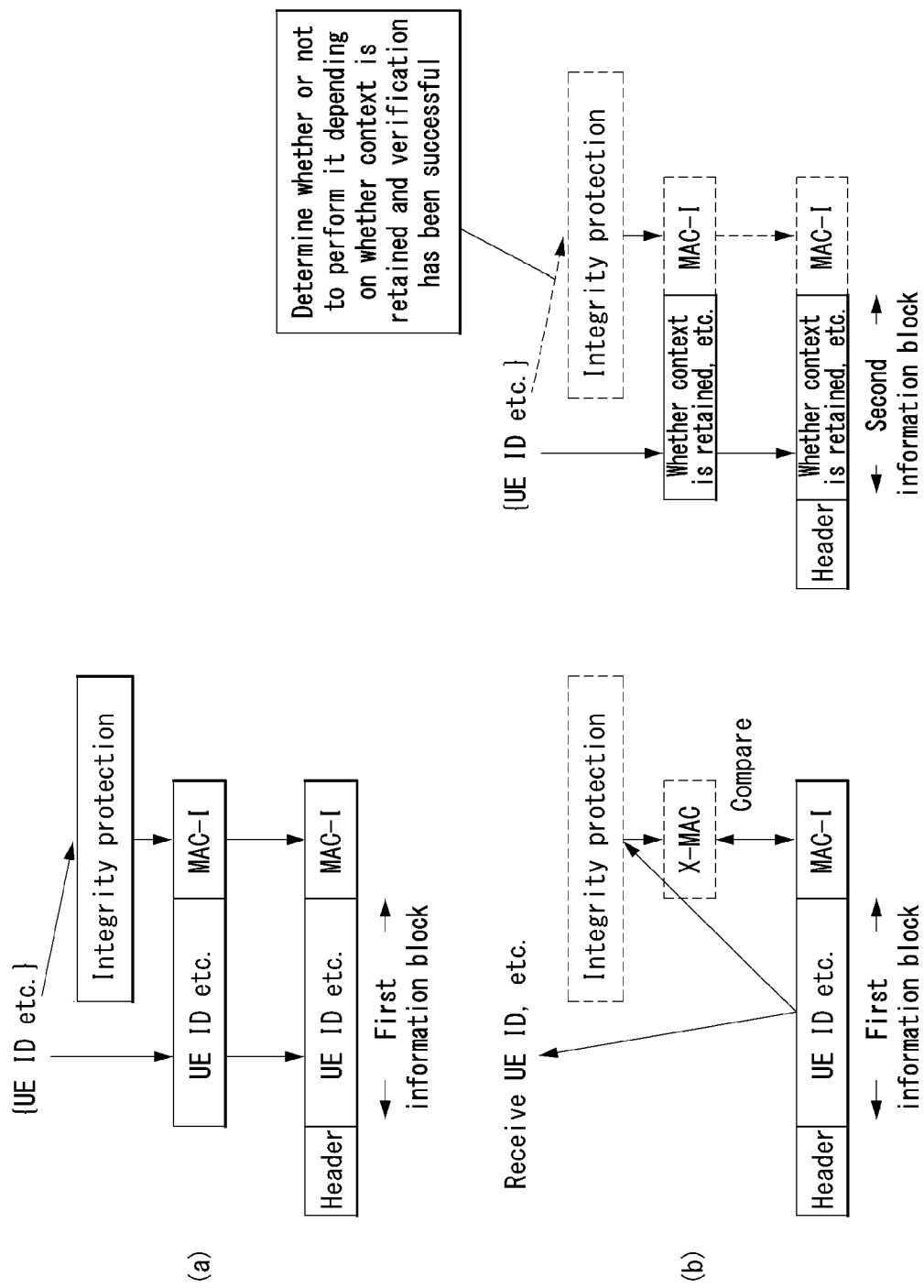

[Figure 42]
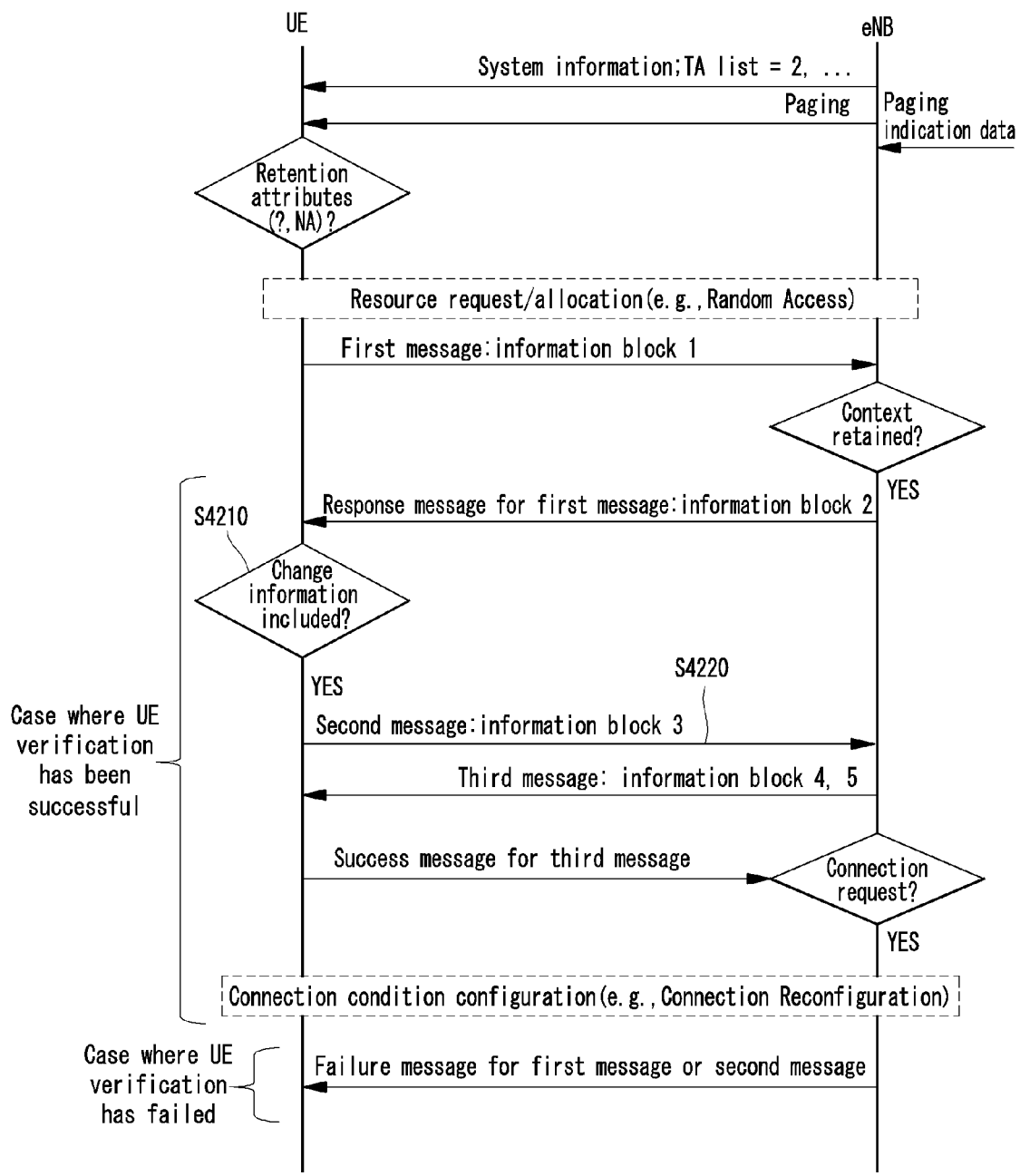

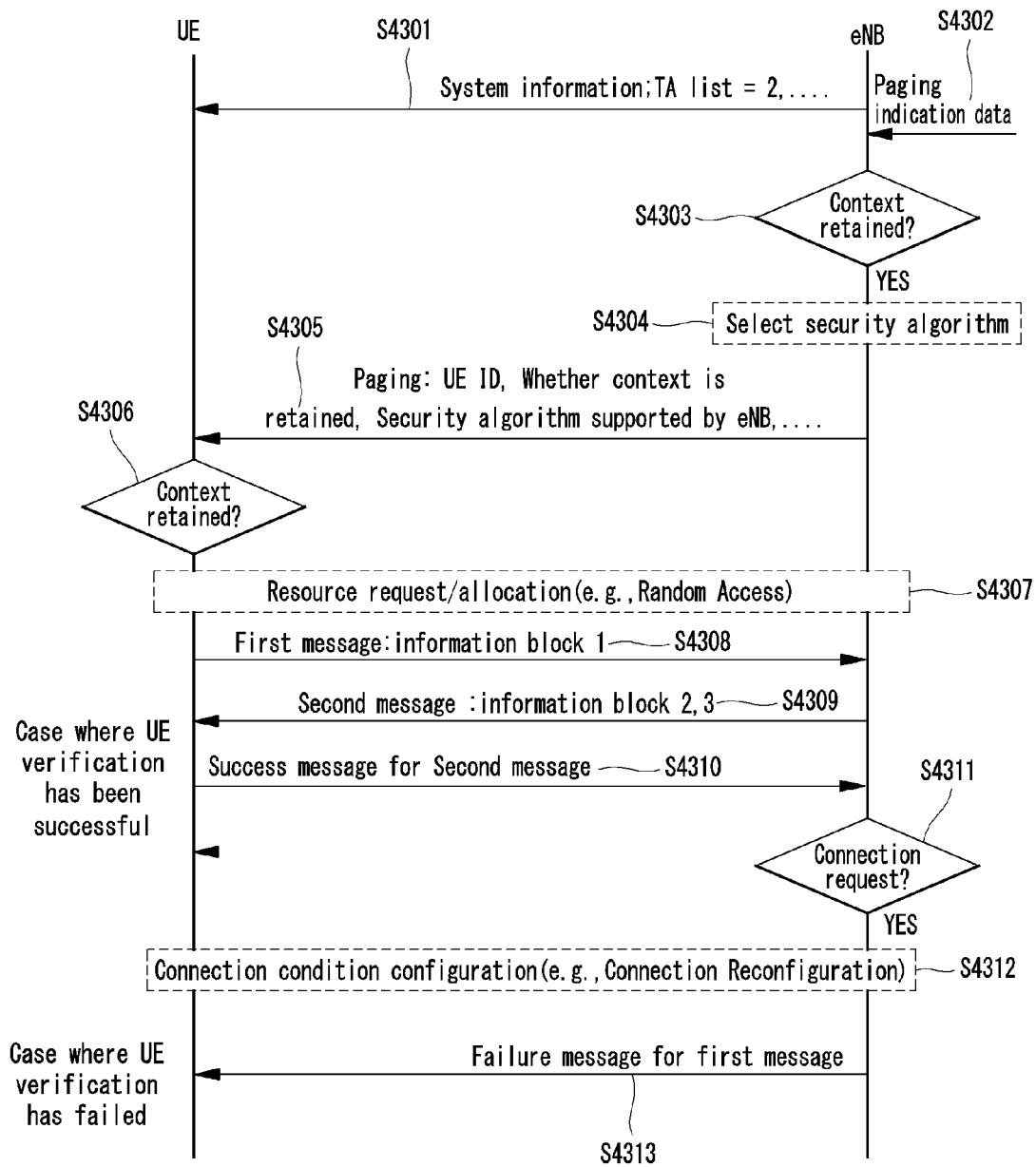
[Figure 43]

[Figure 44]
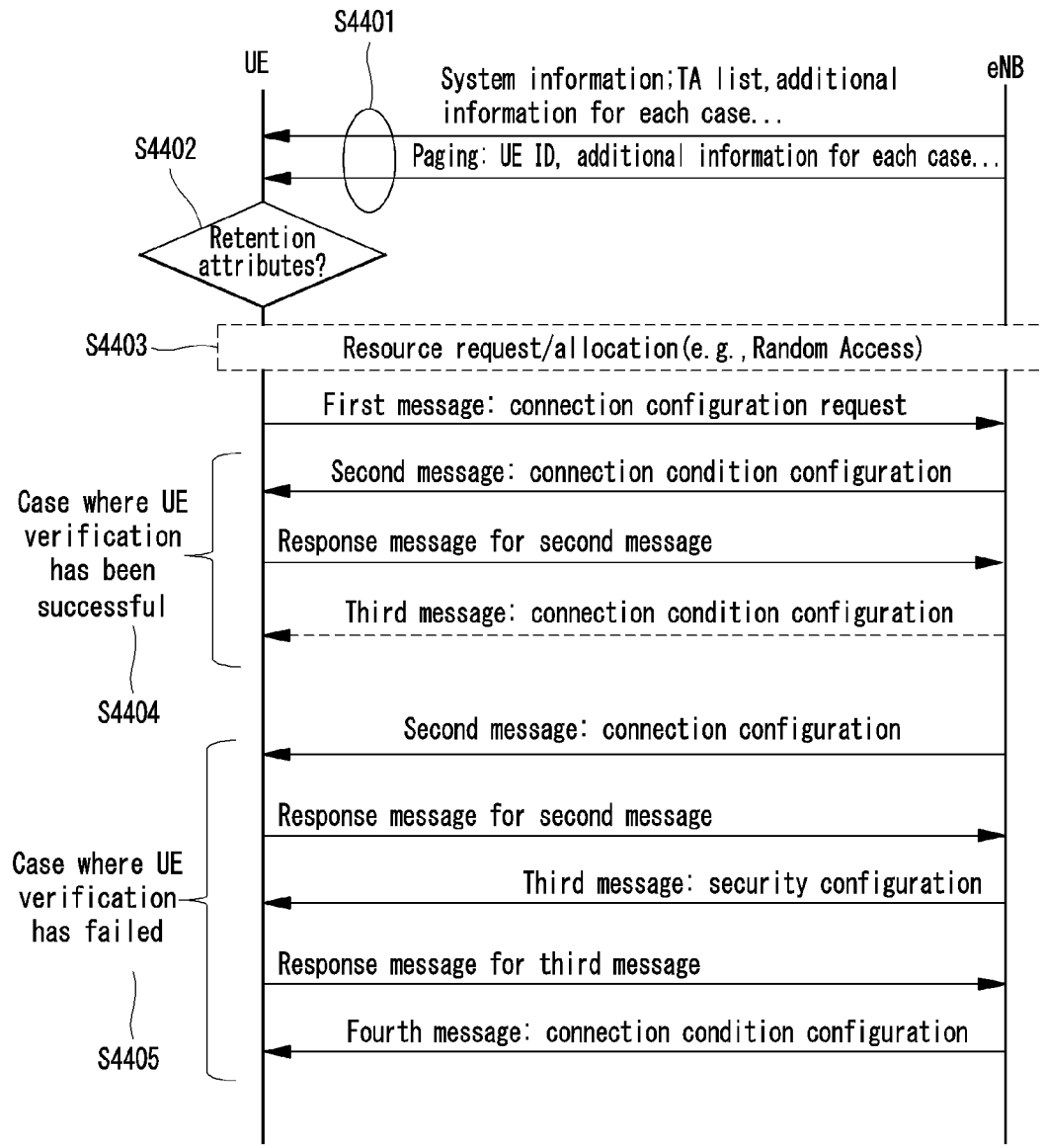

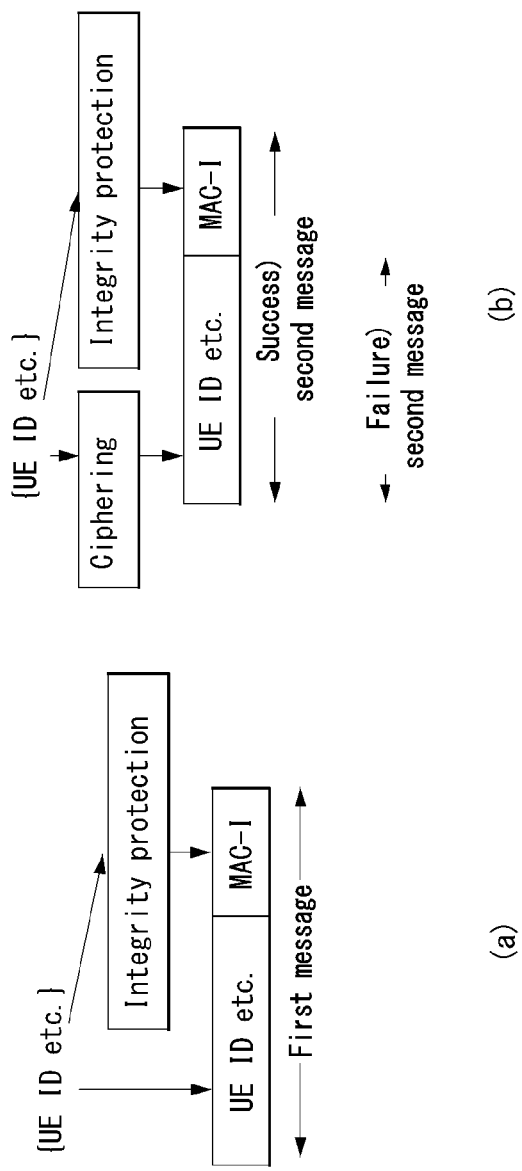
[Figure 45]

【Figure 46】
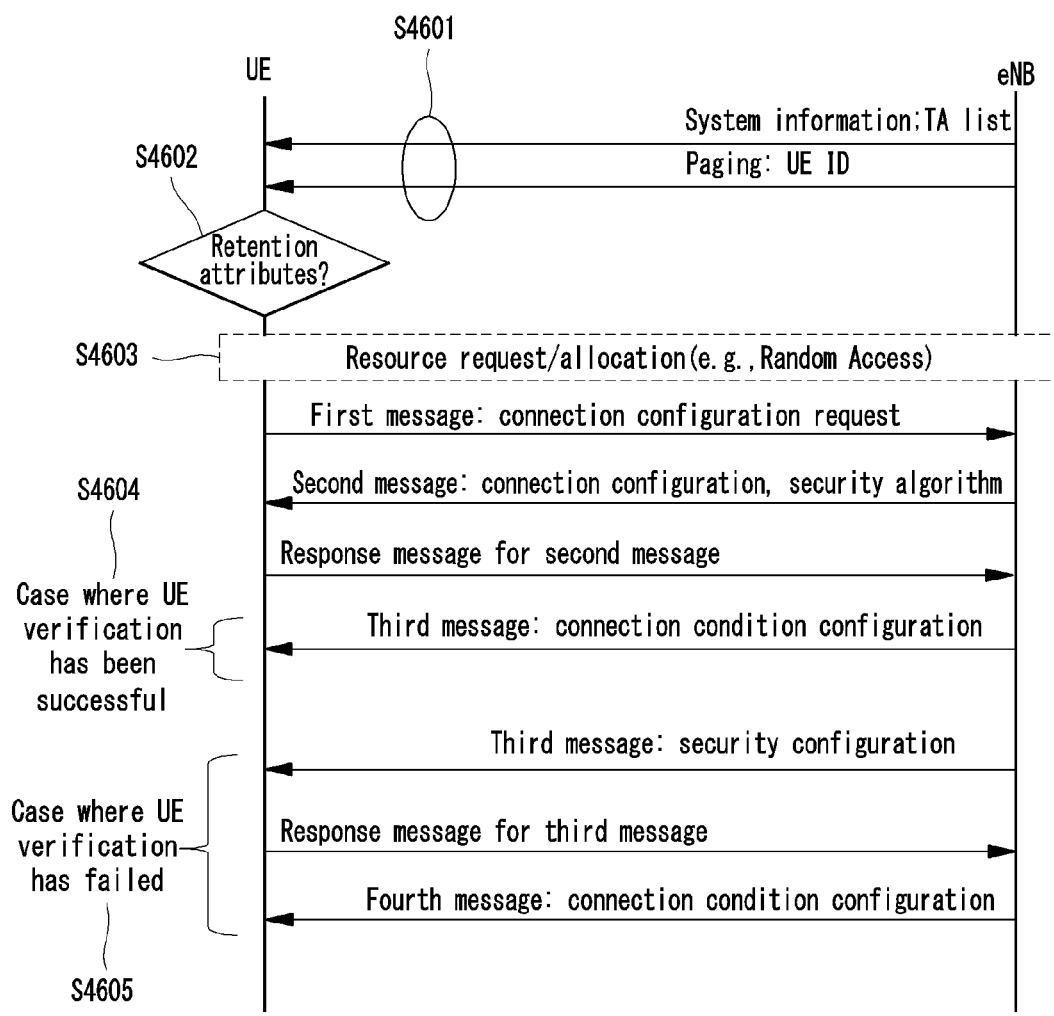

[Figure 47]
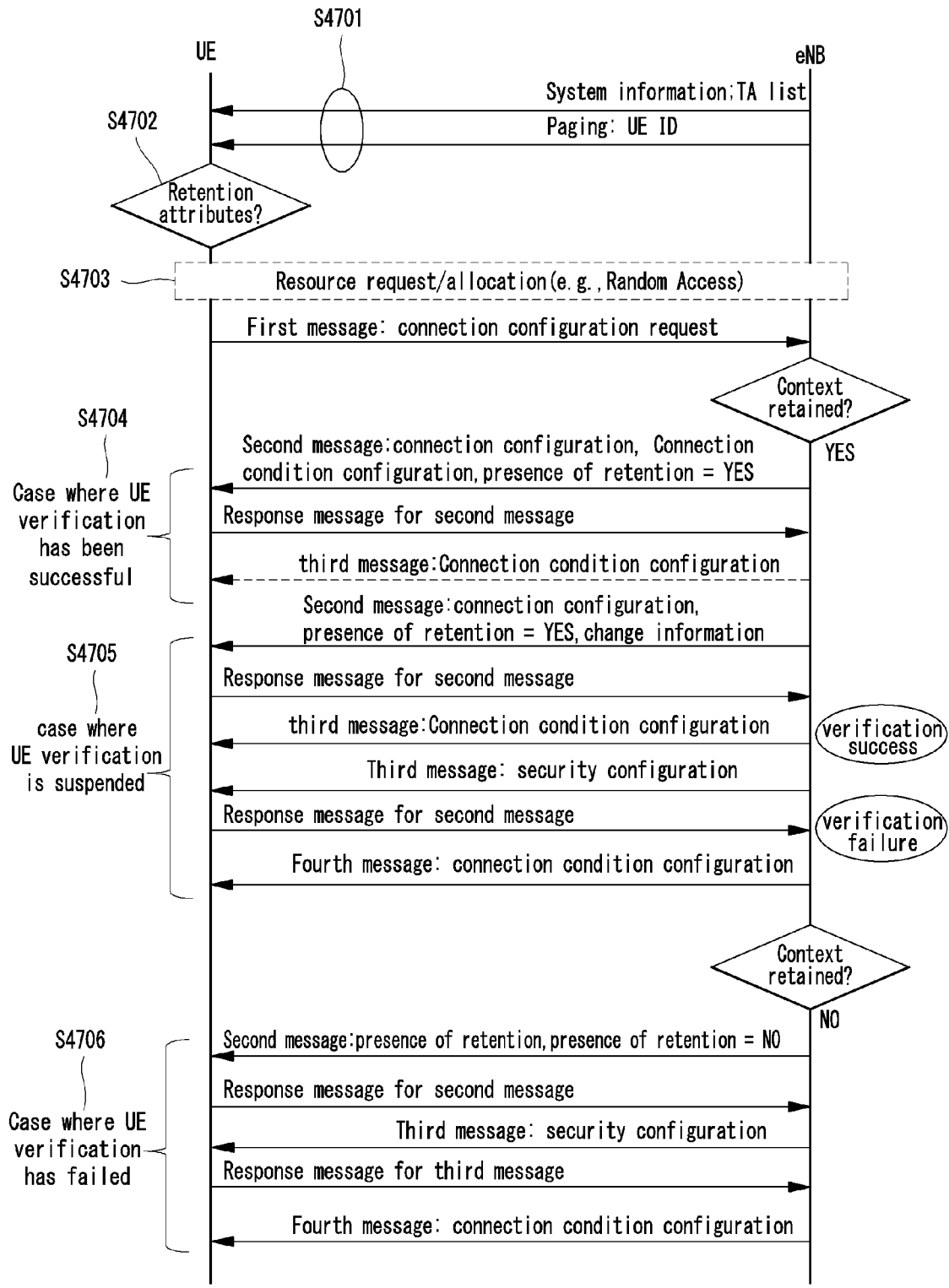

【Figure 48】
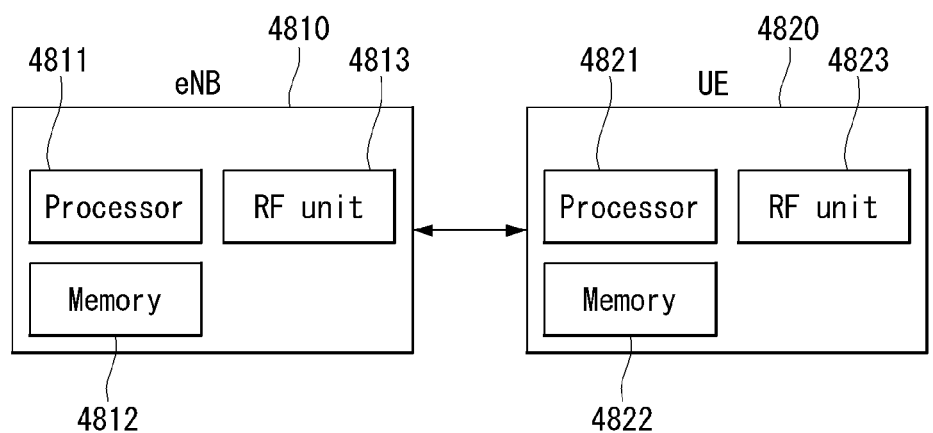

METHOD FOR TRANSMITTING/RECEIVING DATA IN WIRELESS COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2016/006595, filed on Jun. 22, 2016, which claims the benefit of U.S. Provisional Application No. 62/183,684, filed on Jun. 23, 2015, the contents of which are all hereby incorporated by reference herein in their entirety.

TECHNICAL FIELD

This specification relates to a wireless communication system and, more particularly, to a method for transmitting/receiving data between ends and an apparatus supporting the same.

BACKGROUND ART

Mobile communication systems were developed to ensure user activity and provide voice service. However, mobile communication systems have extended their range to data service as well as voice, and currently the explosive increase in traffic is causing a lack of resources and there is a users' demand for faster services, which is creating a need for advanced mobile communication systems.

The requirements for next-generation mobile communication systems largely include coping with explosive data traffic, very high data rates per user, coping with a surprisingly large number of connected devices, very low end-to-end latency, and support for high energy efficiency. To this end, research is ongoing on a variety of technologies such as dual connectivity, massive MIMO (massive multiple input multiple output), in-band full duplex, NOMA (non-orthogonal multiple access), support for super wideband, and device networking.

DISCLOSURE

Technical Problem

An object of this specification is to provide a method of grouping a UE context retention group depending on UE context retention attributes (or UE context retention level).

Furthermore, an object of this specification is to provide a method of transmitting information about a grouped UE context retention group to a UE.

Furthermore, an object of this specification is to provide a method for transmitting/receiving data between ends depending on UE context retention attributes.

Furthermore, an object of this specification is to provide a method of performing a connection configuration between ends depending on UE context retention attributes.

Technical objects to be achieved by the present invention are not limited to the aforementioned technical objects, and other technical objects not described above may be evidently understood by a person having ordinary skill in the art to which the present invention pertains from the following description.

Technical Solution

This specification provides a method of transmitting/receiving data in a wireless communication system. The method performed by a first network node includes the steps of transmitting a control message including information related to UE context retention attributes to a UE; receiving a first message including a first information block from the UE; performing the verification procedure of the UE based on the received first message; and transmitting a second message to the UE based on a result of the verification of the UE. The UE context retention attributes indicate at least one of whether UE context has been retained and whether UE context is capable of being changed.

Furthermore, the method proposed by this specification further includes the step of checking the UE context retention attributes of the UE based on the received first message.

Furthermore, in this specification, the first message further includes at least one of a header and an MAC-1 field.

Furthermore, in this specification, the step of performing the verification procedure of the UE includes the steps of detecting the UE context of the UE based on a UE identifier included in the first information block, wherein the UE context of the UE includes at least one of an integrity and ciphering key and security algorithm information; generating X-MAC for integrity verification based on the detected UE context; and comparing the generated X-MAC with the MAC-1 field included in the first message.

Furthermore, in this specification, the integrity and ciphering key is generated again according to a determined rule.

Furthermore, this specification further includes the steps of checking a state of the UE if the verification of the UE is successful; and performing a connection reconfiguration procedure with the UE if the state of the UE is a connected state.

Furthermore, in this specification, the second message includes at least one of a header, a second information block, a third information block and a MAC-1 field.

Furthermore, in this specification, the third information block includes ciphered data, and the second information block includes a UE identifier.

Furthermore, in this specification, the first network node is grouped as a specific group depending on UE context retention attributes.

Furthermore, the method proposed by this specification further includes the steps of receiving a paging indication message and downlink data from a second network node; and deleting the received downlink data if the first message is not received within a specific time.

Furthermore, this specification provides a method of grouping one or more network nodes retaining UE context in a wireless communication system. The method performed by a first network node includes the steps of determining a UE context retention group; and transmitting information related to the determined UE context retention group to a UE. The UE context retention group is classified depending on UE context retention attributes, and the UE context retention attributes indicate at least one of whether UE context is retained or not or whether a UE context change possibility is present or not.

Furthermore, in this specification, the UE context retention group is determined using at least one of a speed of the UE, a moving direction of the UE, a state of the UE, a supported security algorithm, a security update policy and network overhead.

Furthermore, in this specification, the UE context retention group is configured in a UE location update unit, an eNB unit or a cell unit.

Furthermore, in this specification, the location update unit of the UE includes a tracking area, a location area or a radio access network (RAN) level location area.

Furthermore, in this specification, the information related to the UE context retention group includes at least one of group information indicative of each group of UE context, UE context retention attribute information indicative of the UE context retention attributes, and information indicative of a grouping unit of the UE context retention group.

Furthermore, the method proposed by this specification further includes the step of receiving information indicative of a configuration of UE context from a second network node.

Furthermore, in this specification, the step of determining the UE context retention group includes the step of receiving UE context retention attribute information from at least one surrounding network node.

Furthermore, the method proposed by this specification further includes the step of updating the determined UE context retention group.

Furthermore, in this specification, the first message includes a connection configuration request message for requesting a connection configuration.

Furthermore, this specification provides an apparatus for transmitting/receiving data in a wireless communication system. The apparatus includes a radio frequency (RF) unit for transmitting/receiving a radio signal; and a processor functionally connected to the RF unit. The processor performs control so that a control message including information related to UE context retention attributes is transmitted to a UE, a first message including a first information block is received from the UE, a verification procedure of the UE is performed based on the received first message, and a second message is transmitted to the UE based on a result of the verification of the UE. The UE context retention attributes indicate at least one of whether UE context has been retained and whether UE context is capable of being changed.

Advantageous Effects

This specification has an effect in that it can reduce delay time for data transmission because a UE is notified of information about network nodes in which UE context of the corresponding UE is retained.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompanying drawings, which are included as part of the detailed description in order to help understanding regarding the present invention, provide embodiments of the present invention and describe the technical characteristics of the present invention along with the detailed description.

FIG. 1 is a diagram showing an example of an evolved packet system (EPS) related to an LTE system to which the technical characteristics of this specification may be applied.

FIG. 2 is a diagram showing a wireless communication system to which the technical characteristics of this specification may be applied.

FIG. 3 is a block diagram showing an example of functional split between an E-UTRAN and an EPC to which the technical characteristics of this specification may be applied.

FIG. 4A is a block diagram showing an example of radio protocol architecture for a user plane to which the technical characteristics of this specification may be applied.

FIG. 4B is a block diagram showing an example of radio protocol architecture a control plane to which the technical characteristics of this specification may be applied.

FIG. 5 is a diagram showing an S1 interface protocol structure in a wireless communication system to which the technical characteristics of this specification may be applied.

FIG. 6 is a diagram illustrating an EMM state and an ECM state in a wireless communication system to which the present invention may be applied.

FIG. 7 is a diagram showing an example of a dedicated bearer activation procedure.

FIG. 8 is a diagram showing an example of a dedicated bearer deactivation procedure.

FIG. 9 is a diagram illustrating a handover procedure defined in LTE(-A).

FIG. 10 is a diagram for illustrating an operating process of a UE and an eNB in a contention-based random access procedure.

FIG. 11 is a flowchart showing an UE operation in RRC idle(idle) state to which the present invention may be applied.

FIG. 12 is a flowchart showing a process of establishing an RRC connection to which the present invention may be applied.

FIG. 13 is a flowchart showing an RRC connection reconfiguration process to which the present invention may be applied.

FIG. 14 is a diagram showing an example of an RRC connection reestablishment procedure to which the present invention may be applied.

FIG. 15 is a flowchart showing an example of a method of performing measurement to which the present invention may be applied.

FIG. 16a is a flowchart showing an example of a method for an idle state UE to transmit/receive data in the 3GPP EPS system.

FIG. 16b is a flowchart showing an example of a method for the UE in the connected state to transmit/receive data in the 3GPP EPS system.

FIG. 16c is a flowchart showing an example of a method of transmitting/receiving data according to a connection reconfiguration in the 3GPP EPS system.

FIG. 17 is a diagram showing an example of the structure of a wireless communication system for supporting a next generation RAN to which methods proposed by this specification may be applied.

FIG. 18a is a diagram showing an example of a flow-based QoS structure to which methods proposed by this specification may be applied.

FIG. 18b is a diagram showing an example of a QoS structure used in a QoS framework to which methods proposed by this specification may be applied.

FIG. 19 is a flowchart showing an example of a method of grouping groups that retain UE context, which is proposed by this specification.

FIG. 20 is a diagram showing an example of a method of grouping UE context retention network nodes based on a UE location update unit, which is proposed by this specification.

FIG. 21 is a flowchart showing an example of a method of determining a UE context contention group, which is proposed by this specification.

FIG. 22 is a flowchart showing another example in which a UE context retention group is determined, which is proposed by this specification.

FIGS. 23 and 24 are flowcharts showing other examples of a method of determining a UE context contention group, which is proposed by this specification.

FIG. 25 is a flowchart showing an example of an operating method between network nodes according to the update or release of UE context, which is proposed by this specification.

FIG. 26 is a diagram showing another example of an operating method between network nodes according to the update or release of UE context, which is proposed by this specification.

FIG. 27 is a flowchart showing an example of a method of transmitting/receiving data according to UE context retention attributes, which is proposed by this specification.

FIG. 28 is a flowchart showing an example of a method of transmitting uplink data according to UE context retention attributes, which is proposed by this specification.

FIG. 29 is a diagram showing an example of an operating method of a UE in FIG. 28.

FIG. 30 is a diagram showing an example of an operating method of an eNB in FIG. 28.

FIG. 31 is a flowchart showing an example of a method of receiving downlink data according to UE context retention attributes, which is proposed by this specification.

FIG. 32 is a diagram showing an example of a paging eNB group, which is proposed by this specification.

FIGS. 33 and 34 are diagrams showing examples of an operating method of a UE and an eNB for downlink data reception according to UE context retention attributes, which is proposed by this specification.

FIG. 35 is a flowchart showing another example of a method for a UE to transmit uplink data according to UE context retention attributes, which is proposed by this specification.

FIGS. 36 and 37 are flowcharts showing yet another example of a method for a UE to receive downlink data according to UE context retention attributes, which is proposed by this specification.

FIG. 38 is a flowchart showing another example of a method for a UE to transmit uplink data according to UE context retention attributes, which is proposed by this specification.

FIG. 39 is a flowchart showing another example of a method for a UE to receive downlink data according to UE context retention attributes, which is proposed by this specification.

FIG. 40 is a flowchart showing another example of a method for a UE to transmit uplink data according to UE context retention attributes, which is proposed by this specification.

FIG. 41 is a diagram showing the operation of a UE and an eNB in FIG. 40.

FIG. 42 is a flowchart showing another example of a method for a UE to transmit downlink data according to UE context retention attributes, which is proposed by this specification.

FIG. 43 is a flowchart showing another example of a method of receiving downlink data according to UE context retention attributes, which is proposed by this specification.

FIG. 44 is a flowchart showing an example of a connection configuration procedure according to UE context retention attributes, which is proposed by this specification, and FIG. 45 is a diagram showing an example of an information block used in FIG. 44.

FIG. 46 is a flowchart showing another example of a connection configuration procedure according to UE context retention attributes, which is proposed by this specification.

FIG. 47 is a flowchart showing another example of a connection configuration procedure according to UE context retention attributes, which is proposed by this specification.

FIG. 48 illustrates a block diagram of a wireless communication apparatus to which methods proposed by this specification may be applied.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', 'MeNB (Macro eNB or Master eNB)', 'SeNB (Secondary eNB)' etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

In order to clarity the description, 3GPP LTE/LTE-A are chiefly described, but the technical characteristics of the present invention are not limited thereto and may be applied to 5G systems.

Prior to a description with reference to the drawings, in order to help understanding of the present invention, terms used in this specification are described in brief.

EPS: it is an abbreviation of an evolved packet system and means a core network supporting a long term evolution (LTE) network. The UMTS is an evolved form of a network Public data network (PDN): it is an independent network in which a server providing service is located Access point name (APN): it is the name of an access point managed in a network and provided to a UE. That is, it indicates the name (text string) of a PDN. A corresponding PDN for the transmission and reception of data is determined based on the name of an access point.

Tunnel endpoint identifier (TEID): it is the end point ID of a tunnel configured between nodes within a network and configured for each section in the bearer unit of each UE.

MME: it is an abbreviation of a mobility management entity and functions to control each entity within the EPS in order to provide session and mobility for a UE.

Session: the session is a passage for data transmission, and a unit thereof may be a PDN, bearer or IP flow unit.

A difference between units may be divided into a unit (APN or PDN unit) of the entire target network, a unit (bearer unit) classified by QoS within the network and a destination IP address unit as defined in 3GPP.

PDN connection: it indicates a connection from a UE to a PDN, that is, a connection between a UE expressed as an IP address and a PDN expressed as an APN. This means a connection between entities within a core network (UE-PDN GW) so that a session can be formed.

UE context: situation information of a UE used to manage the UE in a network, that is, situation information formed of a UE ID, mobility (current location, etc.), and attributes (QoS, priority, etc.) of a session TIN: Temporary Identity used in Next update
P-TMSI: Packet Temporary Mobile Subscriber
TAU: Tracking Area Update
GBR: Guaranteed Bit Rate
GTP: GPRS Tunneling Protocol
TEID: Tunnel Endpoint ID
GUTI: Globally Unique Temporary Identity, UE identifier known to the MME FIG. 1 is a view illustrating an Evolved Packet System which is associated with the Long Term Evolution (LTE) system to which the present invention can be applied.

The LTE system aims to provide seamless Internet Protocol (IP) connectivity between a user equipment (UE, 10) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station (20), it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 40, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE.

When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits the paging message to all base stations (i.e., eNodeBs) in its current tracking area (TA).

Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

FIG. 2 illustrates a wireless communication system to which the present invention is applied.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 3 illustrates a functional split of an E-UTRAN and an EPC to which the present invention can be applied.

Referring to the FIG. 3, the shaded blocks represents radio protocol layers, and the empty blocks represent functional entities of the control plane.

The BS performs the following functions: (1) radio resource management (RRM) function such as radio bearer (RB) control, radio admission control, connection mobility control, dynamic resource allocation to the UE; (2) IP (Internet Protocol) header compression and decryption of user data stream; (3) routing of user plane data to a serving gateway (S-GW); (4) scheduling and transmission of a paging message; (5) scheduling and transmission of broadcast information; and (6) measurement for mobility and scheduling and establishing a measurement report.

An MME performs the following functions: (1) distribution of paging messages to BSs; (2) security control; (3) idle state mobility control; (4) S bearer control; (5) ciphering and integrity protection of NAS (Non-Access Stratum) signaling.

The S-GW performs the following functions: (1) termination of a user plane packet with respect to paging; and (2) user plane switching to support UE mobility.

FIG. 4a is a diagram illustrating a radio protocol architecture for a user plane. FIG. 4b is a diagram illustrating a radio protocol architecture for a control plane.

The user plane is a protocol stack for user data transmission. The control plane is a protocol stack for control signal transmission.

Referring to FIGS. 4a and 4b, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/ de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

FIG. 5 is a diagram showing an S1 interface protocol structure in a wireless communication system to which the technical characteristics of this specification may be applied.

FIG. 5(a) illustrates a control plane protocol stack in the S1 interface, and FIG. 5(b) illustrates a user plane interface protocol structure in the S1 interface.

Referring to FIG. 5, an S1 control plane interface (S1-MME) is defined between an eNB and an MME. As in the user plane, a transport network layer is based on IP transmission. For the reliable transmission of message signaling, a stream control transmission protocol (SCTP) layer is added over the IP layer. An application layer signaling protocol is called an S1 application protocol (S1-AP).

The SCTP layer provides the guaranteed transfer of an application layer message.

For protocol data unit (PDU) signaling transmission, point-to-point transmission is used in the transport IP layer.

A pair of stream identifiers for an S1-MME common procedure is used for a single SCTP association for each S1-MME interface instance. Only some of pairs of stream identifiers are used for the S1-MME dedicated procedure. An MME communication context identifier is allocated by the MME for an S1-MME dedicated procedure, and an eNB communication context identifier is allocated by the eNB for the S1-MME dedicated procedure. The MME communication context identifier and the eNB communication context identifier are used to identify a UE-specific S1-MME signaling transmission bearer. The communication context identifier is transferred within each S1-AP message.

If an S1 signaling transmission layer has notified the S1 AP layer that a signaling connection has been disconnected, the MME changes the state of a UE that has used a corresponding signaling connection to the ECM-IDLE state. Furthermore, the eNB releases the RRC connection of the corresponding UE.

An S1 user plane interface (S1-U) is defined between the eNB and the S-GW. An S1-U interface provides the non-guaranteed transfer of a user plane PDU between the eNB and the S-GW. A transport network layer is based on IP transmission and is used by a GPRS tunneling protocol user Plane (GTP-U) layer over the UDP/IP layer in order to transfer a user plane PDU between the eNB and the S-GW.

EMM and ECM State

An EPS mobility management (EMM) state and an EPS connection management (ECM) state are described.

FIG. 6 is a diagram illustrating the EMM state and the ECM state in a wireless communication system to which the present invention may be applied.

Referring to FIG. 6, in order for the NAS layer located in the control plane of a UE and MME to manage the mobility of the UE, an EMM-REGISTERED state and an EMM-DEREGISTERED state may be defined depending on whether the UE has been attached to or detached from a network. The EMM-REGISTERED state and the EMM-DEREGISTERED state may be applied to the UE and the MME.

As in the case where a UE is first powered on, at the early stage, the UE is in the EMM-DEREGISTERED state. In order to access a network, the UE performs a process of registering it with the corresponding network through an initial attach procedure. When the attach procedure is successfully performed, the UE and the MME make transition to the EMM-REGISTERED state. Furthermore, if the UE is powered off or a radio link failure occurs (if a packet error rate exceeds a reference value in the radio link), the UE is detached from the network and makes transition to the EMM-DEREGISTERED state.

Furthermore, in order to manage a signaling connection between the UE and the network, an ECM-CONNECTED state and an ECM-IDLE state may be defined. The ECM-CONNECTED state and the ECM-IDLE state may also be applied to the UE and the MME. The ECM connection is configured as an RRC connection set between the UE and the eNB and as an S1 signaling connection set between the eNB and the MME. That is, what the ECM connection has been configured/released means that both the RRC connection and the S1 signaling connection have been configured/released.

The RRC state indicates whether the RRC layer of a UE and the RRC layer of an eNB have been logically connected. That is, if the RRC layer of the UE and the RRC layer of the eNB have been connected, the UE is in the RRC_CONNECTED. If the RRC layer of the UE and the RRC layer of the eNB have not been connected, the UE is in the RRC_IDLE state.

A network can check the presence of a UE in the ECM-CONNECTED state in a cell unit and can effectively control the UE.

In contrast, the network is unable to check the presence of a UE in the ECM-IDLE state, a core network (CN) performs management in a tracking area unit, that is, an area unit greater than a cell. When the UE is in the ECM-IDLE state, the UE performs discontinuous reception (DRX) configured by the NAS using an uniquely allocated ID in the tracking area. That is, the UE may receive the broadcasting of system information and paging information by monitoring a paging signal in a specific paging occasion every UE-specific paging DRX cycle.

Furthermore, when the UE is in the ECM-IDLE state, the network does not have context information of the UE. Accordingly, the UE in the ECM-IDLE state may perform a UE-based mobility-related procedure, such as cell selection or cell reselection, without a need to receive the command of the network. If the location of the UE in the ECM-IDLE state is different from the location known by the network, the UE may notify the network of the location of the corresponding UE through a tracking area update (TAU) procedure.

In contrast, when the UE is in the ECM-CONNECTED state, the mobility of the UE is managed by the command of the network. In the ECM-CONNECTED state, the network is aware of a cell to which the UE belongs. Accordingly, the network may transmit and/or receive data to the UE or from the UE, may control mobility such as the handover of the UE, and may perform cell measurement for a surrounding cell.

As described above, in order for the UE to receive common mobile communication service such as voice or data, it needs to shift to the ECM-CONNECTED state. As in the case where the UE is first powered on, the UE is initially in the ECM-IDLE state like the EMM state. When the UE is successfully registered with a corresponding network through an initial attach procedure, the UE and the MME make transition to the ECM-CONNECTED state. Furthermore, if the UE has been registered with the network and radio resources have not been allocated to the UE because traffic has been deactivated, the UE is in the ECM-IDLE state. When new uplink or downlink traffic is generated in the corresponding UE, the UE and the MME make transition to the ECM-CONNECTED state through a service request procedure.

FIG. 7 is a diagram showing an example of a dedicated bearer activation procedure.

FIG. 7 is a flowchart showing a dedicated bearer activation procedure for S5/S8 based on a GPRS tunneling protocol (GTP).

First, if a dynamic PCC is deployed, the PCRF transmits a PCC decision provision (QoS policy) message to the PDN GW.

Next, the PDN GW transmits a Create Bearer Request message (IMSI, PTI, EPS Bearer QoS, TFT, S5/S8 TEID, Charging Id, LBI, Protocol Configuration Options) for requesting the creation of a bearer to the Serving GW.

Next, the Serving GW transmits a Create Bearer Request (IMSI, PTI, EPS Bearer QoS, TFT, S1-TEID, PDN GW TEID (GTP-based S5/S8), LBI, Protocol Configuration Options) message to the MME.

Next, the MME transmits a Bearer Setup Request (EPS Bearer Identity, EPS Bearer QoS, Session Management Request, S1-TEID) message for requesting a bearer configuration to the eNodeB.

Next, the eNodeB transmits an RRC Connection Reconfiguration (Radio Bearer QoS, Session Management Request, EPS RB Identity) message to the UE.

Next, the UE transmits an RRC Connection Reconfiguration Complete message to an eNodeB in order to provide notification of radio bearer activation.

Next, the eNodeB transmits a Bearer Setup Response (EPS Bearer Identity, S1-TEID) message to the MME in order to provide notification of the radio bearer activation from the UE.

Next, the UE transmits a Direct Transfer (Session Management Response) message to the eNodeB.

Next, the eNodeB transmits an Uplink NAS Transport (Session Management Response) message to the MME.

Next, the MME transmits a Create Bearer Response (EPS Bearer Identity, S1-TEID, User Location Information (ECGI)) message to the Serving GW in order to notify the Serving GW of the bearer activation.

Next, the Serving GW transits a Create Bearer Response (EPS Bearer Identity, S5/S8-TEID, User Location Information (ECGI)) message to the PDN GW in order to notify the PDN GW of the bearer activation.

If a dedicated bearer activation procedure has been triggered by a PCC Decision Provision message from the PCRF, the PDN GW indicates whether a requested PCC decision (QoS policy) has been performed through the PCRF.

FIG. 8 is a diagram showing an example of a dedicated bearer deactivation procedure.

FIG. 8 is a flowchart showing a dedicated bearer deactivation procedure for S5/S8 based on a GPRS tunneling protocol (GTP).

The procedure of FIG. 8 may be used to deactivate a dedicated bearer or to deactivate all of bearers belonging to a PDN address.

If a default bearer belonging to a PDN connection is deactivated, the PDN GW deactivates all of bearers belonging to the PDN connection, and this is described in detail with reference to FIG. 8.

FIG. 9 is a diagram illustrating a handover procedure defined in LTE(-A).

FIG. 9 shows a case where the MME and the serving GW are not changed.

A detailed handover process is as follows, and reference may be made to 3GPP technical specification (TS) 36.300.

Step 0: UE context within a source eNB include a connection configuration or information about roaming constraints given upon recent TA update.

Step 1: the source eNB configures a UE measurement process based on area restriction information. Measurement provided by the source eNB may help control the connection mobility of the UE.

Step 2: the UE is triggered to transmit a measurement report according to rule set by (system information, etc.).

Step 3: the source eNB determines whether or not to perform handover on the UE based on the measurement report and radio resource management (RRM) information.

Step 4: the source eNB transmits information necessary for handover (HO) to a target eNB through a handover request message. The information necessary for the HO includes RRC context, such as a UE X2 signaling context reference, a UE S1 EPC signaling context reference, a target cell ID, and the identifier (e.g., a cell radio network temporary identifier (CRNTI)) of the UE within the source eNB.

Step 6: the target eNB prepares HO along with L1/L2 and transmits a handover request acknowledgement (Ack) message to the source eNB. The handover request Ack message includes a transparent container (RRC message) transmitted to the UE in order to perform the handover. The container includes a new C-RNTI and the security algorithm identifier of the target eNB. Furthermore, the container may further include additional parameters, such as an access parameter and a SIB.

Furthermore, in order to minimize handover delay, the target eNB may divide RA signatures into a non-contention-based RA signature set (hereinafter group 1) and a contention-based RA signature set (hereinafter group 2), may select one of the group 1, and may notify the handover UE of it.

That is, the container may further include information about a dedicated RA signature. Furthermore, the container may include information about RACH slot duration that will use the dedicated RA signature.

Step 7: the source eNB generates an RRC message (e.g., RRCConnectionReconfiguration message) having mobility control information for the UE in order to perform handover, and transmits it to the UE.

The RRCConnectionReconfiguration message includes parameters necessary for handover (e.g., a new C-RNTI, the security algorithm identifier of the target eNB, information about the dedicated RACH signature as an option, and a target eNB SIB), and instructs HO execution.

Step 8: the source eNB transfers an uplink PDCP SN reception state by transmitting a serial number (SN) STATUS TRANSFER message to the target eNB and transfers a downlink PDCP SN transmission state.

Step 9: the UE receives the RRCConnectionReconfiguration message and attempts access to a target cell using an RACH process. RACH is performed on a non-contention basis if a dedicated RACH preamble has been allocated and is performed on a contention basis if not.

Step 10: a network performs uplink allocation and timing adjustment.

Step 11: when the UE is successfully connected to a target cell, the UE confirms the handover by transmitting an RRCConnectionReconfigurationComplete message (CRNTI) and notifies the target eNB that the handover process has been completed by transmitting an uplink buffer state report. The target eNB check the C-RNTI received through a Handover Confirm message and starts to transmit data to the UE.

Step 12: the target eNB notifies the UE that the cell has been changed by transmitting a path switch message to the MME.

Step 13: the MME transmits a user plane update request message to the serving GW.

Step 14: the serving GW changes the downlink data path to the target side. The serving GW transmits an end marker packet to the source eNB through the existing path and then releases a user plane/TNL resources for the source eNB.

Step 15: the serving GW transmits a user plane update response message to the MME.

Step 16: the MME responds to the path switch message using a path switch Ack message.

Step 17: the target eNB notifies the source eNB that the HO is successful by transmitting a UE context release message, and triggers resources release.

Step 18: when the UE context release message is received, the source eNB releases radio resources and user plane-related resources associated with UE context.

FIG. 10 is a diagram for an operation process between a terminal and a base station in a contention based random access procedure.

(1) First Message Transmission

First of all, a terminal randomly selects one random access preamble from a set of random access preambles indicated by system information or a handover command. The terminal selects a PRACH (physical RACH) resource capable of carrying the random access preamble and is then able to transmit the corresponding random access preamble [S1010].

(2) Second Message Reception

A method of receiving random access response is similar to the aforesaid non-contention based random access procedure. In particular, after the terminal has transmitted the random access preamble, as shown in the step S1010, the terminal attempts a reception of its random access response on PDCCH within a random access response receiving window instructed by the system information or the handover command of a base station. The terminal then receives PDSCH via corresponding RA-RNTI information [S1020]. Through the received PDSCH, the terminal is able to receive uplink grant (UL grant), temporary cell identifier (temporary C-RNTI), time synchronization correction value (timing advance command: TAC) and the like.

(3) Third Message Transmission

If the terminal receives a random access response valid to itself, the terminal processes information contained in the random access response. In particular, the terminal applies the TAC and stores the temporary C-RNTI. The terminal also transmits data (i.e., a third message) to the base station using the UL grant [S1030]. In this case, it is preferable that the third message contains an identifier of the terminal since a base station is unable to determine which terminal performs the random access procedure in the contention based random access procedure when the third message does not contains the identifier of the terminal. Thus it is preferable to identify a terminals for a future contention resolution.

Two kinds of methods have been discussed as a method of having a terminal identifier included. In a first method, if a terminal has a valid cell identifier assigned in a corresponding cell prior to the random access procedure, the terminal transmits its cell identifier via an uplink transmission signal corresponding to the UL grant. If the valid cell identifier is not assigned prior to the random access procedure, the terminal transmits its unique identifier (e.g., S-TMSI, a random ID, etc.). The unique identifier is generally longer than the cell identifier. If the terminal transmits data corresponding to the UL grant, the terminal initiates a timer for collision solution (contention resolution timer).

(4) Fourth Message Reception

After the terminal has transmitted the data containing its identifier using the UL grant contained in the random access response, the terminal waits for an instruction of the base station for the contention resolution. In particular, the terminal attempts a reception of PDCCH to receive a specific message [S1040]. Two kinds of methods have been discussed as a method of receiving the PDCCH. As mentioned in the foregoing description, if the third message transmitted based on the UL grant is transmitted using it the cell identifier, the terminal attempts the reception of the PDCCH using its cell identifier. If the identifier is a unique identifier, the terminal is able to attempt the reception of the PDCCH using the temporary C-RNTI contained in the random access response. Thereafter, in the former case, if the terminal received the PDCCH through its cell identifier before the contention resolution timer expires, the terminal determines that the random access procedure is successfully performed. The terminal then ends the random access procedure. In the latter case, if the terminal received the PDCCH via the temporary C-RNTI before the contention resolution timer expires, the terminal checks the data carried on the PDSCH instructed by the PDCCH. If the unique identifier of the terminal is included in the content of the data, the terminal determines that the random access procedure is successfully performed. The terminal then ends the random access procedure.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled.

On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state.

When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-09) 'Radio Resource Control (RRC); Protocol specification (Release 8)', the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

In general, service provided from a network to a UE may be divided into the following three types. Furthermore, the UE differently recognizes the type of a cell depending on which service can be provided. The service types are first described and the type of cell is then described.

1) Limited service: this service provides an emergency call and disaster alarm system (earthquake and tsunami warning system (ETWS)), and may be provided by an acceptable cell.

2) Normal service: this service means a general service (public use) and may be provided by a suitable cell (or normal cell).

3 Operator service: this service means service for a communication network operator. This cell can be used only by a communication network operator and cannot be used by common users.

In relation to a service type provided by a cell, the type of cell may be divided as follows.

1) Acceptable cell: a cell in which a UE can be provided with limited service. This cell has not been barred from the viewpoint of a corresponding UE and satisfies a cell selection criterion for the UE.

2) Suitable cell: a cell in which a UE can be provided with a suitable service. This cell satisfies the conditions of an acceptable cell and also satisfies additional conditions. As the additional conditions, this cell needs to belong to a public land mobile network (PLMN) to which a corresponding UE can access and needs to be a cell on which the execution of a tracking area update procedure by a UE is not barred. If a corresponding cell is a CSG cell, it must be a cell to which a UE can access as a CSG member.

1) Barred cell: cell that broadcasts information indicating that the cell is a cell barred through system information.

2) Reserved cell: cell that broadcasts information indicating that the cell is a cell reserved through system information.

FIG. 11 is a flowchart showing an operation of the UE in RRC_IDLE state to which the present invention may be applied.

It is illustrated in FIG. 11 that a procedure of registering a PLMN through a cell selection and performing a cell reselection if needed after the UE is initially turned on.

Referring the FIG. 11, the UE selects a RAT for communicating with a PLMN from which the UE intends to be served (step S1110). Information about the PLMN and the RAT may be selected by a user of the UE. The user may use the information stored in a Universal Subscriber Identity Module (USIM).

A UE selects a highest cell among a measured BS and cells having higher quality than a predetermined value (step S1120). This procedure is referred as an initial cell reselection, and performed by a UE turned on. The cell selection procedure will be described in the following. After the cell selection, the UE periodically receives system information from the BS. The predetermined value is a value defined in a communication system for ensuring a physical signal quality in data transmission/reception. Therefore, the predetermined value may vary with a RAT to which the each predetermined value is applied.

The UE performs a network registration if needed (step S1130). The UE registers self information (i.e. IMSI) for being served by the network (i.e. paging). The UE does not register whenever the UE selects a cell. When the UE's own information about the network is different from information about the network provided from the system information, the UE performs the network registration procedure.

The UE performs cell reselection based on a service environment or the UE's environment provided from the cell (S1140). The UE, when the strength or quality value of a signal, which has been measured from the base station from which the UE is serviced, is lower that a value measured from the base station of a neighbor cell, selects one of other cells providing a better signal characteristic than the base station to which the UE is linked. This process is referred to as cell reselection as distinguished from the initial cell selection of the No. 2 process. At this time, a temporal restricting condition is assigned to prevent cells from being frequently reselected as the signal characteristics vary. The cell reselection procedure is to be described below in detail.

FIG. 12 is a flowchart showing an RRC connection establishment procedure to which the present invention can be applied.

A UE sends to a network an RRC connection request message for requesting an RRC connection (step S1210). The network sends an RRC connection setup message in response to the RRC connection request (step S1220). After receiving the RRC connection setup message, the UE enters an RRC connection mode.

The UE sends to the network an RRC connection setup complete message used to confirm successful completion of the RRC connection establishment (step S1230).

FIG. 13 is a flowchart showing an RRC connection reconfiguration procedure to which the present invention can be applied.

An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S1310). In response to the RRC connection reconfiguration, the UE sends to the network an RRC connection reconfiguration complete message used to confirm successful completion of the RRC connection reconfiguration (step S1320).

A procedure for a UE to select a cell is described in detail.

When a UE is powered on or stays in a cell, the UE selects/reselects a cell of suitable quality and performs procedures for receiving service.

A UE in the RRC-IDLE state always needs to select a cell of suitable quality and to be prepared to receive service through the cell. For example, a UE that has been just powered on needs to select a cell of suitable quality in order to be registered with a network. When the UE in the RRC-CONNECTED state enters the RRC-IDLE state, the UE needs to select a cell in the RRC-IDLE state. As described above, a process for a UE to select a cell satisfying which conditions in order to stay in a service standby state, such as the RRC-IDLE state, is called cell selection. The cell selection is performed by the UE in the state in which the UE has not determined a cell in which the UE will stay in the RRC-IDLE state. Accordingly, it is important to select a cell as soon as possible.

Accordingly, if a cell provides radio signal quality of a specific level or more, although the cell is not a cell providing the best radio signal quality to the UE, the cell may be selected in the cell selection process of the UE.

A method and procedure for a UE to select a cell in 3GPP LTE are described in detail with reference to 3GPP TS 36.304 V8.5.0 (2009-03) "User Equipment (UE) procedures in idle mode (Release 8)."

A cell selection process is basically divided into two types.

First, it is an initial cell selection process. In this process, a UE does not have prior information about a radio channel. Accordingly, the UE searches for all of radio channels in order to find a suitable cell. The UE searches for the strongest cell in each channel. Thereafter, the UE selects a corresponding cell only if it finds a suitable cell satisfying a cell selection criterion.

Next, the UE may select the cell using stored information or information broadcasted by the cell. Accordingly, cell selection may be faster than the initial cell selection process. The UE selects the corresponding cell if it finds the cell satisfying the cell selection criterion. If the UE does not find a suitable cell satisfying the cell selection criterion through the process, it performs an initial cell selection process.

After the UE selects a cell through the cell selection process, the intensity or quality of a signal between the UE and the eNB may be changed due to a change in the mobility or radio conditions of the UE. Accordingly, if quality of a selected cell is deteriorated, the UE may select another cell providing better quality. If the cell is selected again as described above, in general, the UE selects a cell providing better signal quality than a current selected cell.

Such a process is called cell reselection. The cell reselection process has an object of selecting a cell providing the best quality to a UE from the point of view of quality of a radio signal.

In addition to the point of view of quality of a radio signal, a network may determine priority for each frequency and notify the UE of the determination. The UE that has received the priority preferentially considers the priority compared to the radio signal quality criterion in the cell reselection process.

As described above, there is a method of selecting or reselecting a cell depending on the signal characteristics of a radio conditions. In selecting a cell for reselection in cell reselection, the following cell reselection methods may be present depending on the RAT and frequency characteristics of a cell.

Intra-frequency cell reselection: a UE reselects a cell having the same RAT and center frequency as a cell on which the UE camps Inter-frequency cell reselection: a UE reselects a cell having the same RAT as and different center frequency from a cell on which the UE camps Inter-RAT cell reselection: a UE reselects a cell using an RAT different from an RAT on which the UE camps The principles of the cell reselection process are as follows.

First, a UE measures quality of a serving cell and a neighboring cell for cell reselection.

Second, cell reselection is performed based on a cell reselection criterion. The cell reselection criterion has the following characteristics in relation to serving cell and neighboring cell measurement.

The intra-frequency cell reselection is basically based on ranking. The ranking is a task of defining an index value for cell reselection evaluation and ranking cells in order of the size of an index value using the index value. A cell having the best index is commonly called the best ranked cell. The cell index value is a value to which a frequency offset or cell offset has been applied, if necessary, based on a value measured by a UE with respect to a corresponding cell.

The inter-frequency cell reselection is based on frequency priority provided by a network. A UE attempts to camp on a frequency having the highest frequency priority. A network may provide frequency priority which may be applied to UEs within a cell in common through broadcast signaling, or may provide priority corresponding to each frequency for each UE through UE-specific signaling (dedicated signaling). The cell reselection priority provided through broadcasts signaling may be called common priority. The cell reselection priority configured by a network for each UE may be called dedicated priority. When a UE receives the dedicated priority, it may also receive a validity time related to the dedicated priority. When the UE receives the dedicated priority, it initiates a validity timer set as the received validity time. While the validity timer operates, the UE applies the dedicated priority in the RRC_IDLE mode. When the validity timer expires, the UE discards the dedicated priority and applies the common priority again.

For inter-frequency cell reselection, a network may provide a UE with a parameter (e.g., frequency-specific offset) used for cell reselection for each frequency.

For intra-frequency cell reselection or inter-frequency cell reselection, a network may provide a UE with a neighboring cell list (NCL) used for cell reselection. The NCL includes a parameter (e.g., a cell-specific offset) for each cell used in cell reselection.

For intra-frequency or inter-frequency cell reselection, a network may provide a UE with a cell reselection blacklist used for cell reselection. The UE does not perform cell reselection on cells included in the blacklist.

Hereinafter, radio link Monitoring (RLM) is described.

A UE monitors downlink quality based on a cell-specific reference signal in order to detect downlink radio link quality of a PCell.

The UE estimates downlink radio link quality in order to monitor the downlink radio link quality of the PCell and compares the estimated downlink radio link quality with thresholds Qout and Qin. The threshold Qout is defined as a level at which a downlink radio link cannot be stably received. This corresponds to a 10% block error rate of hypothetical PDCCH transmission by taking into consideration a PDFICH error. The threshold Qin is defined as a downlink radio link quality level at which a downlink radio link can be stably received compared to the level of Qout. This corresponds to a 2% block error rate of hypothetical PDCCH transmission by taking into consideration a PCFICH error.

A radio link failure (RLF) is described below.

A UE continues to perform measurement in order to maintain radio link quality with a serving cell from which the UE receives service. The UE determines whether communication is impossible in a current situation due to the deterioration of the radio link quality with the serving cell.

If communication is almost impossible because the quality of the serving cell is too low, the UE determines a current situation to be a radio link failure.

If the radio link failure is determined, the UE forgives the retention of communication with the current a serving cell, selects a new cell through a cell selection (or cell reselection) procedure, and attempts RRC connection re-establishment with the new cell.

When the following problems occur in a radio link, a UE may determine that an RLF has occurred.

(1) First, the UE may determine that an RLF has occurred due to a physical channel problem.

When the quality of a reference signal (RS) periodically received from an eNB in a physical channel is detected in a threshold or less, the UE may determine that out-of-sync has occurred in the physical channel. If such out-of-sync is continuously generated by a specific number (e.g., N310), the UE notifies the RRC of it. The RRC that has received the out-of-sync message from the physical layer runs a timer T310 and waits until the physical channel problem is solved while the T310 runs. If a message indicating that continuous in-sync of a specific number (e.g., N311) has occurred is received from the physical layer while the T310 runs, the RRC determines that the physical channel problem has been solved and stops the driving T310. However, if an in-sync message is not received until the T310 expires, the RRC determines that an RLF has occurred.

(2) The UE may determine that an RLF has occurred due to an MAC random access problem.

When the UE performs a random access process in the MAC layer, it performs processes of random access resource selection→random access preamble transmission→random access response reception→contention resolution. All of the processes are called a single random access process. If the UE has not successfully completed this process, the UE waits for a backoff time and performs a next random access process. However, if the UE has attempts the random access process by a specific number (e.g., preambleTransMax) but fails in the attempts, the UE notifies the RRC of the failure, and the RRC determines that an RLF has occurred.

(3) The UE may determine that an RLF has occurred due to an RLC maximum retransmission problem.

If the UE uses acknowledged mode (AM) RLC in the RLC layer, it retransmits an RLC PDU not successful in transmission.

However, if the AM RLC has retransmitted a specific AMD PDU by a specific number (e.g., maxRetxThreshold), but has not succeeded in transmission, it notifies the RRC of this, and the RRC determines that an RLF has occurred.

The RRC determines whether an RLF has occurred based on the three reasons. If an RLF has occurred as described above, the RRC performs RRC connection re-establishment, that is, a procedure for re-establishing an RRC connection with the eNB.

The RRC connection re-establishment process, that is, a process performed when an RLF has occurred, is as follows.

When the UE determines that a severe problem has occurred in the RRC connection itself, it performs an RRC connection re-establishment process in order to re-establish a connection with the eNB. The severe problem for the RRC connection may include the following five reasons, that is, (1) a radio link failure (RLF), (2) a handover failure, (3) mobility from E-UTRA, (4) a PDCP integrity check failure and (5) an RRC connection reconfiguration failure.

If one of the following problems occurs, the UE drives the timer T311 and starts an RRC connection re-establishment process. During the process, the UE accesses a new cell through cell selection and a random access procedure.

If the timer T311 runs, the UE finds a suitable cell through a cell selection procedure, the UE stops the T311 and starts a random access procedure to the corresponding cell. However, if the UE does not find a suitable cell until the T311 expires, the UE determines an RRC connection failure and shifts to the RRC_IDLE mode.

The RRC connection re-establishment procedure is described in more detail below.

FIG. 14 is a diagram showing an example of an RRC connection reestablishment procedure to which the present invention may be applied.

Referring to FIG. 14, a UE stops the use of all of configured radio bearers other than a signaling radio bearer #0 (SRB 0) and initializes various sub-layers of an access stratum (AS) (S1410). Furthermore, the UE configures each of the sublayers and the physical layer as a default configuration. During such a process, the UE maintains the RRC-CONNECTED state.

The UE performs a cell selection procedure for performing an RRC connection reestablishment procedure (S1420). The cell selection procedure of the RRC connection reestablishment procedure may be performed like a cell selection procedure performed by the UE in the RRC-IDLE state although the UE maintains the RRC-CONNECTED state.

After performing the cell selection procedure, the UE determines whether a corresponding cell is a suitable cell by checking system information of the corresponding cell (S1430). If the selected cell is determined to be a suitable E-UTRAN cell, the UE transmits an RRC connection re-establishment request message to the corresponding cell (S1440).

Meanwhile, if the cell selected through the cell selection procedure for performing the RRC connection reestablishment procedure is determined to be a cell that uses another RAT other than the E-UTRAN, the UE stops the RRC connection reestablishment procedure and enters the RRC-IDLE state (S1450).

Checking, by the UE, the suitability of a cell through the cell selection procedure and the system information reception of the selected cell may be implemented to be terminated within a limited time. To this end, the UE may run a timer when the RRC connection reestablishment procedure starts. The timer may be stopped if the UE determines that a suitable cell has been selected. When the timer expires, the UE may consider that the RRC connection reestablishment procedure has failed and enter the RRC-IDLE state. The timer is hereinafter referred to as a radio link failure timer. In LTE Spec. TS 36.331, a timer called T311 may be used as the radio link failure timer. A UE may obtain the set value of the timer from system information of a serving cell.

When an RRC connection re-establishment request message is received and a request is received from the UE, a cell may transmit an RRC connection re-establishment message to the UE.

The UE that has received the RRC connection re-establishment message from the cell reconfigures a PDCP sublayer and RLC sublayer for the SRB1. Furthermore, the UE calculates various key values related to a security configuration again and configures the PDCP sublayer responsible for security as newly calculated security key values.

Accordingly, the SRB 1 is open between the UE and the cell and RRC control messages may be exchanged between the UE and the cell. The UE completes the resumption of the SRB1 and transmits an RRC connection re-establishment complete message indicating that the RRC connection reestablishment procedure has been completed (S1460).

In contrast, if the cell has received the RRC connection re-establishment request message from the UE, but has not accepted the request, the cell transmits an RRC connection re-establishment reject message to the UE.

If the RRC connection reestablishment procedure is successfully performed, the cell and the UE perform an RRC connection reestablishment procedure. Accordingly, the UE recovers the state before it performs the RRC connection reestablishment procedure and guarantees the continuity of service to a maximum extent.

The report of the RLF is described.

In order to support mobility robustness optimization (MRO) of a network, a UE reports a failure event to a network when an RLF occurs or a handover failure occurs.

After RRC connection re-establishment, the UE may provide an RLF report to an eNB. Radio measurement included in the RLF report may be used as a potential reason of the failure in order to identify coverage problems. The information may be used to exclude such events in MRO evaluation for an intra-LTE mobility connection failure and to sent such events to other algorithms as input again.

If RRC connection re-establishment fails or the UE does not perform RRC connection re-establishment, the UE may generate a valid RLF report for the eNB after reconnection in the idle mode. For such an object, the UE may store information related to the latest RLF or handover failure, and may notify an LTE cell that the RLF report is valid every subsequent RRC connection (re)establishment and handover until the RLF report is fetched by the network or for 48 hours after the RLF or handover failure is detected.

The UE maintains the information during state transition and an RAT change, returns back to the LTE RAT and indicates that the RLF report is valid.

The validity of the RLF report in the RRC connection configuration procedure indicates that the UE has experienced hindrance, such as a connection failure, and that an RLF report due to the failure has not been transferred to the network. The RLF report from the UE includes the following information.

If the E-CGI. E-CGI of the last cell (in the case of an RLF) that has provided service to the UE or a handover target has not been known, PCI and frequency information are instead used.
  The E-CGI of a cell to which a re-establishment attempt has been made.

The E-CGI of a cell that has provided service to the UE when the last handover is initialized, for example, when a message 7 (RRC connection reconfiguration) is received by the UE.

Time that has elapsed from the initialization of the last handover to a connection failure.

Information indicating whether a connection failure is caused by an RLF or a handover failure.

Radio measurements.

Location of a failure

An eNB that has received an RLF failure from a UE may forward the report to an eNB that has provided service to the UE prior to the reported connection failure. Radio measurements included in the RLF report may be used to identify coverage issues as potential causes of the radio link failure. The information may be used to exclude such events from the MRO evaluation of an intra-LTE mobility connection failure and to send them to other algorithms as input again.

Measurement and a measurement report are described below.

In a mobile communication system, the mobility support of a UE is essential. Accordingly, the UE continues to measure quality for a serving cell that currently provides service and quality for a neighboring cell. The UE reports the measurement results thereof to a network on a suitable time, and the network provides the UE with the best mobility through handover. Measurement for such an object is commonly called radio resource management (RRM) measurement.

In order to provide information that may be helpful for an operator to manage a network in addition to the object of the mobility support, the UE may perform measurement of a specific object configured by the network and may report the measurement results thereof to the network. For example, the UE receives broadcast information of a specific cell determined by the network. The UE may report the cell identity (also called a global cell identifier) of a specific cell, location identification information (e.g., tracking area code) to which the specific cell belongs and/or other cell information (e.g., whether it is a member of a closed subscriber group (CSG) cell) to a serving cell.

When a UE while moving checks that quality of a specific area is very bad through measurement, it may report location information for cells having bad quality and the measurement results thereof to a network. The network may attempt to optimize the network based on the report of the measurement results of UEs that help the operation of the network.

In a mobile communication system whose frequency reuse factor is 1, mobility is commonly performed between different cells in the same frequency band.

Accordingly, in order to well guarantee the mobility of a UE, the UE needs to be able to well measure quality of surrounding cells having the same center frequency as the center frequency of a serving cell and cell information. As described above, measurement for a cell having the same center frequency as the center frequency of a serving cell is called intra-frequency measurement.

A UE performs intra-frequency measurement and reports the measurement results thereof to a network on a suitable time so that the object of the corresponding measurement results is achieved.

A mobile communication operator may manage a network using a plurality of frequency bands. If the service of a communication system is provided through a plurality of frequency bands, in order to guarantee the best mobility for a UE, the UE needs to be able to well measure quality of surrounding cells having a center frequency different from the center frequency of a serving cell and cell information. As described above, measurement for a cell having a center frequency different from the center frequency of a serving cell is called inter-frequency measurement. The UE needs to be able to perform inter-frequency measurement and to report the measurement results thereof to a network on a suitable time.

If a UE supports measurement for a network based on a different RAT, the UE may measure a cell of the corresponding cell based on an eNB configuration. Such measurement is called inter-radio access technology (RAT) measurement.

For example, the RAT may include a UMTS terrestrial radio access network (UTRAN) and a GSM EDGE radio access network (GERAN) according to the 3GPP standard rules and may also include CDMA 2000 system according to the 3GPP2 standard rules.

FIG. 15 is a flowchart showing an example of a method of performing measurement to which the present invention may be applied.

A UE receives measurement configuration information from a BS (S1510). A message including the measurement configuration information is called a measurement configuration message. The UE performs measurement based on the measurement configuration information (S1520). If the measurement results satisfy reporting conditions within the measurement configuration information, the UE reports the measurement results to the BS (S1530). A message including the measurement results is called a measurement report message.

The measurement configuration information may include the following information.

(1) Measurement target information: information about a target on which a UE will perform measurement. A measurement target includes at least one of an intra-frequency measurement target that is the target of measurement within a cell, an inter-frequency measurement target that is the target of measurement between cells, and an inter-RAT measurement target that is the target of inter-RAT measurement. For example, the intra-frequency measurement target may indicate a surrounding cell having the same frequency band as a serving cell. The inter-frequency measurement target may indicate a surrounding cell having a frequency band different from that of a serving cell. The inter-RAT measurement target may indicate a surrounding cell having an RAT different from the RAT of a serving cell.

(2) Reporting configuration information: information about reporting conditions and report type regarding when a UE reports the transmission of measurement results. The reporting configuration information may include a list of reporting configurations. Each reporting configuration may include a reporting criterion and a report format. The reporting criterion is a criterion that triggers the transmission of measurement results by a UE. The reporting criterion may be the cycle of a measurement report or a single event for a measurement report. The report format is information regarding that a UE will configure measurement results according to which type.

(3) Measurement identity information: information about a measurement identity that enables a UE to report which measurement target in which type when by associating the measurement target and a reporting configuration. The measurement identity information is included in a measurement report message, and may indicate that measurement results are for which measurement target and that a measurement report has been generated according to which reporting conditions.

(4) Quantity configuration information: information about a parameter for setting the filtering of a measurement unit, a report unit and/or a measurement result value.

(5) Measurement gap information: information about a measurement gap, that is, a section which may be used for a UE for only measurement by not considering data transmission with a serving cell because downlink transmission or uplink transmission has not been scheduled.

In order to perform a measurement procedure, a UE has a measurement target list, a measurement reporting configuration list and a measurement identity list.

Prior to a description of methods proposed by this specification, an operation related to a data transmission/reception method in the 3GPP EPS system is described in brief.

First, an operation for the data transmission/reception of an idle state UE is described with reference to FIG. 16a.

FIG. 16a is a flowchart showing an example of a method for an idle state UE to transmit/receive data in the 3GPP EPS system.

The UE in the idle state first performs a state transition procedure in order to transmit/receives data to/from an eNB.

The state transition procedure may be performed through (1) a random access procedure between the UE and the eNB, (2) an RRC connection configuration procedure between the UE and the eNB and (3) a service request procedure.

The service request procedure (3) is a procedure related to UE verification. In this procedure, whether the access of the MME to a network through UE verification is allowed or not is determined.

The MME obtains UE context from the HSS through the corresponding procedure.

Next, the UE performs AS security and a data bearer (DRB) configuration procedure along with the eNB.

Thereafter, the UE transmit/receives data to/from the eNB.

From FIG. 16a, it may be seen that a total of 90.5+a(ms) time is taken until the UE in the idle state transmits data, that is, a data transmission delay time, is generated.

Next, an operation for the data transmission/reception of a UE in the connected state in a handover situation by a network is described with reference to FIG. 16b.

FIG. 16b is a flowchart showing an example of a method for a UE in the connected state to transmit/receive data in the 3GPP EPS system.

In a handover situation by a network, the UE in the connected state basically transmit/receives data through a (1) handover preparation procedure and a (2) handover execution procedure.

Prior to the execution of the handover preparation procedure, a measurement report procedure is performed between the UE and a source eNB.

The handover preparation procedure may include 1) a procedure for the source eNB to determine handover and 2) a coordination procedure between eNBs, that is, a handover request and response procedure between the source eNB and a target eNB.

Next, the handover execution procedure may include 1) a handover-related configuration procedure, 2) an access procedure between the UE and the target eNB, and 3) a procedure for the UE to transmit data to the target eNB.

The handover-related configuration procedure 1) includes a procedure for the source eNB to transmit handover indication to the UE.

As shown in FIG. 16b, it can be seen that the data transmission delay time due to the handover of the UE in the connected state is 37 (ms).

Furthermore, if the UE does not receive a handover indication message from the source eNB depending on the moving speed and channel situation of the UE, a handover failure may occur.

In this case, additional delay time of 37+a(ms) in data transmission is generated due to the handover of the UE in the connected state.

Next, an operation related to the transmission/reception of the UE in the connected state in a connection reconfiguration (e.g., RRC connection re-establishment) situation is described with reference to FIG. 16c.

FIG. 16c is a flowchart showing an example of a method of transmitting/receiving data according to a connection reconfiguration in the 3GPP EPS system.

First, if a connection reconfiguration between the UE and the eNB is successful, as shown in FIG. 16c, the UE transmits data to the eNB through a random access procedure and RRC connection reconfiguration procedure with the eNB.

In this case, a data transmission delay time attributable to the connection reconfiguration of the UE in the connected state UE is 45 (ms).

If the connection reconfiguration between the UE and the eNB fails, a data transmission delay time attributable to the connection reconfiguration failure of the UE in the connected state is 110+a(ms) (a random access procedure (8.5 ms), an RRC connection reconfiguration procedure (11 ms), and a procedure for the data transmission/reception of the UE in the idle state (90.5+a(ms)) of FIG. 16c.

As described above, if the UE performs an RRC connection re-establishment procedure with the eNB due to an RLF or a handover failure, RRC connection re-establishment is successful only when the eNB instructing the RRC connection re-establishment retains the context of the UE.

If the UE fails in the RRC connection re-establishment procedure with the eNB, the UE shifts to the idle state.

Accordingly, delay is generated in the data transmission of the UE because the UE in the idle state additionally performs a transmission/reception operation in FIG. 16a.

Next, a context retention method in a conventional system (3GPP EPS system) is described in brief, and problems thereof and requirements in the 5G system are described.

In the conventional system, UE context retention may be divided depending on (1) the idle state of a UE and (2) the connected state of a UE.

First, in the case of the idle state of a UE, a target UE, that is, a UE not related to UE context retention, is a UE not having mobility. Network nodes that retain UE context corresponds to an eNB that has been previously accessed by the UE.

A UE having mobility has to transmit/receive data through several procedures (state transition, etc.), thereby generating delay in data transmission/reception.

Next, in the case of the connected state of a UE, a target UE may be 1) a UE whose handover has been determined by a source eNB (or serving eNB) or 2) an unspecific-UE.

In the case of the first, a network node that retains the UE context of a UE whose handover has been determined by a source eNB may be a handover (HO) target eNB.

Network control-based handover, such as the first, consumes long interruption time compared to UE-based handover.

If a UE misses a handover indication message (the UE misses the message or does not receive the message), the data transmission/reception of the UE with a corresponding eNB may be stopped until a connection with the eNB is recovered/configured.

In the case of the second, a network node that retains UE context for an unspecific-UE may be a surrounding eNB of an eNB (serving eNB) accessed by a corresponding UE.

In this case, the retention of UE context of the surrounding eNB may not be essentially guaranteed.

In the case of the second, the UE may request a connection reconfiguration from the eNB in the state in which the UE is unaware of whether the eNB has retained UE context.

In this case, if the corresponding eNB does not retain the UE context, the corresponding eNB rejects the connection reconfiguration request of the UE. The UE switches to the idle state, and the data transmission/reception of the UE to/from the eNB may be stopped until the UE shifts to the connected state again.

As described above, this specification provides first to third contents in order to solve the problems generated in the conventional system and also satisfy the requirements of the 5G system.

In the first, as in the conventional system, a system is designed so that UE context having characteristics, such as delay-insensitive service use/low energy needs/the support of (UE) spontaneous handover/high-speed movement, is retained in one or more network nodes without being limited to a UE (target UE) and eNB (UE context retention network node) that are applied.

In this case, the expression of a network node may be expressed as, for example, an eNB or an edge cloud (a network node adjacent to a UE).

In the second, the design is performed so that a UE can be aware that which network node retains UE context.

In the third, the design is performed so that UE context retention groups are subdivided depending on a network policy (e.g., an area/range in which UE context is retained or a security update policy).

Various embodiments proposed by this specification are described based on the above contents along with related drawings.

Furthermore, in order to apply the methods proposed by this specification, a third state may be newly defined in addition to the RRC-CONNECTED state and IDLE state of a UE.

The third state of a UE may be expressed or called a "suspended state", but this is only an example and may be expressed or called another name.

If the third state of a UE is considered to be the category of the RRC-CONNECTED state, it may be differently defined depending on the ECM-Idle or ECM-connected state.

Contents proposed by this specification include a method of transmitting a paging message from an eNB to a UE in addition to a network node (e.g., MME).

That is, the eNB may retain or store UE context and transmit the UE context to a UE anytime.

In this case, the network node may be expressed a network node, a network entity, a network node, a first entity or a CP cloud, and an eNB may also be expressed as one of network nodes.

Next, an example of the structure of a wireless communication system for supporting a next generation RAN to which methods proposed by this specification may be applied is described with reference to FIGS. 17 and 18.

FIG. 17a is a diagram showing an example of the structure of a wireless communication system for supporting a next generation RAN to which methods proposed by this specification may be applied.

A wireless communication system structure for supporting a next generation RAN may be expressed as "high-level architecture."

Next-generation may be simply expressed as "Next Gen." Next generation may collectively refer to a term that refers to the future communication generation including 5G.

For convenience of description, next generation is hereinafter expressed or called "Next Gen."

The "Next Gen" architecture to which methods proposed by this specification may be applied supports a new RAT(s), evolved LTE and non-3GPP access types, but does not support the GERAN and the UTRAN.

An example of the non-3GPP access types may be WLAN access, fixed access and so on.

Furthermore, the "Next Gen" architecture supports an unified authentication framework for other access systems and supports a simultaneous connection with a plurality of UEs through a plurality of access technologies.

Furthermore, the "Next Gen" architecture permits an independent evolution of a core network and RAN and minimizes access dependency.

Furthermore, the "Next Gen" architecture supports separation for control plane and user plane functions and supports the transmission of IP packets, non-IP PDUs and Ethernet frames.

Referring to FIG. 17a, the "Next Gen" architecture may include a NextGen UE 1710, a NextGen RAN 1720, a NextGen Core 1730 and a data network 1740.

In this case, in the wireless communication system of "Next Gen", a UE may be expressed as a "NextGen UE", a RAN defining radio protocol architecture between the UE and an eNB may be expressed as a "NextGen RAN", and a core network that performs the mobility control and IP packet flow management of a UE may be expressed as a "NextGen Core."

For example, the "NextGen RAN" may correspond to the E-UTRAN in the LTE(-A) system, the "NextGen Core" may correspond to the EPC in the LTE(-A) system, and network entities performing functions, such as the MME, S-GW and P-GW in the LTE EPC, may also be included in the NextGen Core.

AN NG1-C interface and an NG1-U interface are present between the NextGen RAN and the NextGen Core. An NG-Gi interface is present between the NextGen Core and the data network.

In this case, NG1-C indicates a reference point for a control plane between the NextGen RAN and the NextGen Core. NG1-U indicates a reference point for a user plane between the NextGen RAN and the NextGen Core.

Although not shown in FIG. 17a, NG-NAS indicates a reference point for a control plane between the NextGen UE and the NextGen Core.

Furthermore, NG-Gi indicates a reference point between the NextGen Core and the data network.

In this case, the data network may be an operator-external public network or a private data network or an intra-intra-operator data network.

FIG. 17b is a diagram showing an example of the structure of a wireless communication system for supporting a next generation RAN to which methods proposed by this specification may be applied.

In particular, FIG. 17b shows that the NextGen Core of FIG. 17a is subdivided into a control plane (CP) function and a user plane (CP) function and shows detailed interfaces between an UE/AN/AF.

A flow-based QoS handling method is described in more detail with reference to FIG. 17b.

Referring to FIG. 17b, the policy of quality of service (QoS) in a wireless communication system to which the present invention is applied may be stored in control plane (CP) functions 1731 and configured by the following reasons.

Application in user plane (UP) functions 1732

Transmission in AN (admission control) 1720 for a QoS application and a UE 1710

Hereinafter, parameters for defining a QoS framework are described.

Flow Priority Indicator (FPI): indicates a parameter that defines priority of each flow processing in the UP Functions 1732 and the AN Functions 1731. This corresponds to priority in a congested case in addition to scheduling priority.

Furthermore, the FPI indicates whether a flow requests a guaranteed flow bit rate and/or a maximum flow bit rate.

Flow Descriptor: packet filters related to specific flow processing. In the uplink, identification needs to be performed in the UE and the AN 1720, but is constrained to the layer 3 and the layer 4.

Maximum Flow Bitrate (MFB): a parameter indicative of an uplink and downlink bit rate value that may be applied for a single flow or the coupling of flows.

The parameter indicates a maximum bit rate authorized for a data flow.

Flow Priority Level (FPL): a parameter that defines the state importance of a flow for accessing the AN 1720. Additionally, the FPL indicates whether AN 1720 non-prioritized resources have been accessed. The AN non-prioritized resources must be allocated resources protected against pre-emptable or pre-emption.

Session Bit rate: a parameter indicative of a bit rate value in the uplink and downlink for establishing a user session. The session Bit rate parameter indicates a maximum bit rate permitted for a user session.

The support of the GFP from a UE depends on the QoS design of a radio interface.

As shown in FIG. 17b, the CP functions and the UP functions are functions (indicated by a dotted line) included in the NextGen CN, and may be implemented by a single physical device or may be implemented in different physical devices.

FIG. 18 is a diagram showing an example of a flow-based QoS structure to which methods proposed by this specification may be applied.

Content Requirement Awareness Function in the Core (CAF-Core)

A CAF-Core 1830 supports a mechanism for executing QoS policies related to the identified and discovered application of application sessions (e.g., video download, webpage download, music appreciation, and posting for a social media network).

The CAF-Core receives QoS policies from a Core CP. Application discovery is performed by the means of non-standardized algorithms (e.g., a user pattern, heuristics, and SNF discovery for encrypted traffic).

The CAF performs QoS enforcement in a CN based on the QoS policies received from the Core Cp.

The CAF-Core may process the QoS policies and obtain dynamic QoS targets and local enforcement actions from the CN.

Furthermore, the CAF-Core may update the QoS policies and the QoS targets and local enforcement actions in real time based on the current content requirements of user plane traffic mix, simultaneous competing flows and network state and resources use possibility within the QoS policies provided by the NG Core CP functions. As described above, the CAF-Core enforces the QoS policies within given policy constraints and may not have a deviation other than any range.

Content Requirement Awareness Function in RAN (CAF-RAN)

The CAF-RAN 1810 supports a mechanism for identifying application sessions (e.g., video download, webpage download, music appreciation, and posting for a social media network) and enforcing QoS policies.

The CAF-RAN receives the QoS policies from the Core CP. The CAF-RAN uses application discovery information provided by the Core. The application discovery information may make implicit additional specific requirements for a certain application session and also form traffic for a given session. The CAF-RAN performs QoS enforcement based on the QoS policies received from the Core CP. This includes traffic formation for the DL and UL. The DL traffic formation helps to control a flow of UL traffic.

The CAF-RAN may process the QoS policies and obtain the dynamic QoS targets and local enforcement actions from the RAN. Furthermore, the CAF-RAN may update the QoS policies and the dynamic QoS targets and local enforcement actions in real time based on the current content requirements of user plane traffic mix, simultaneous competing flows and network state and resources use possibility within the constraints of the QoS policies provided by the NG Core. As described above, the CAF-RAN enforces the QoS policies within a given policy constraints and may not have any deviation other than any range.

The RAN is constrained by charging performed by the Core and thus has not affect the charging performed by the UP functions within the Core. The amount of specific traffic charged by the Core is provided to the RAN in relation to packet marking along with application marking. The CAF-RAN enforces and retains the charged capacity in relation to bits.

Coordination Between CAF-Core and CAF-RAN

The CAF-Core may perform application discovery and provide information having a packet marking form based on policies received from the CN CP.

The traffic formation and policy execution in the CAF-RAN is constrained by packet marking indicated by polices received from the CAF-Core and CN CP. This helps the CAF-Core and the CAF-RAN to operate in a cooperation method. Furthermore, the charging is performed by an application indicated by the CAF-Core.

Next, the CN CP Functions and the CN UP Functions are described below.

The CN CP Functions and CN UP Functions may be implemented by a single physical device or may be implemented by respective physical devices.

CN CP Functions

The QoS policies are stored in the CN CP Functions. In session formation, the subscriber- and application-specific policies are transmitted to the RAN and the CAF in which the CN UP Functions are present.

CN UP Functions

In the Core, the UP Functions are responsible for traffic charging support (CDR, granted quota for on-line) based on policies in which the outcome of the CAF is taken into consideration. Furthermore, the CN UP functions marks downlink traffic transmitted to the RAN.

Policy Provisioning and Enforcement

An operator supplies specific QoS policies to the subscriber and application of an NG Core CP functions. The CP functions of the Core provide the policies to the RAN and the CN UP functions.

The execution actions are obtained from the policy points depending on the current content requirements of user plane traffic mix, simultaneous competing flows, a network status and resource availability.

Charging

The traffic charging (1820) support (CDR, granted quota for on-line) based on the policies in which the output of the CAF is taken into consideration is performed by the CN UP functions.

Multiple Levels of Policies

The following shows another configuration of UP functions and QoS policies provided by the RAN.

Intent level QoS policies showing the configuration of a flow may be identified by packet marking, an SDF descriptor, etc. within an abstract QoS target (e.g., Voice type QoS, Smoothed Bit rate QoS (limited bandwidth variation for traffic), and bulk traffic (radio conditions) are poor and a load of a cell is excessive, traffic may be discarded).

The transmission QoS level policies showing the configuration of a flow may be identified by packet marking, an SDF descriptor, etc. within explicit QoS targets (priority, delay, jitter, etc.).

The CP functions of the CAF-RAN and the CAF-Core are responsible for transport-locally map intent level QoS policies belonging to QoS level policies based on local CAF policies and local conditions (the current context of user plane traffic mix, simultaneous competing flows, network status and resource availability), and are constrained by the higher constraints of intent level QoS policies.

Parameters Necessary for QoS Framework

The following parameters are necessary to define a QoS framework.

Policy Description:

The range of definition: an application name or an application type

The definition of Intent: a high definition experience or explicit QoS target level for RT multimedia (e.g., a maximum packet delay for iMS video is 150 ms)

Maximum Flow Bit rate: an UL and DL bit rate value applied for the coupling of a single PDU session or PDU sessions for a given UE.

Allocation and Retention Priority level (ARP): a priority level that means pre-emption vulnerability for per-emption capability and given PDU sessions.

Hereinafter, in order to support a delay-sensitive service, the power saving of a UE and UE-triggered handover proposed by this specification, a method of retaining UE context in at least one network node and allowing a UE to be aware of at least one network node that retains the UE context is described below.

That is, the methods proposed by this specification allow delay generated due to the execution of a conventional network node-based handover through the execution of UE-based handover.

First, a grouping method of a UE context holding group proposed in the present specification will be described.

FIG. 19 is a flowchart showing an example of a method of grouping groups that retain UE context, which is proposed by this specification.

First, UE context retention groups may be grouped in a UE location update unit or an eNB unit or a cell unit.

The location update unit of a UE may be a tracking area, a location area or a radio access network (RAN) level location area.

In this case, it is assumed that a first network node is the subject that determines a UE context retention group.

The first network node may be a network node that additionally configures a UE (e.g., a radio configuration) or may be a network node that collects additional configurations for a UE.

This is described in more detail in the following first embodiment.

That is, the first network node determines a UE context retention group (S1910).

The first network node may receive UE context retention attribute information from at least one surrounding network node in order to determine the UE context retention group.

Furthermore, the first network node may perform update if the determined UE context retention group satisfies some conditions.

In this case, the first network node may be an eNB, an MME or a GW.

The MME, the GW, etc. may be used or expressed as another term in the 5G system in the future and thus may be changed into another term suitable for a corresponding function and may be expressed.

In this specification, in order to represent that the methods proposed by this specification can be applied to a 5G system which may be implemented in the future in addition to the 3GPP system, common terms, such as a network node, a network node and a network entity, are used with respect to the entity of a higher layer.

However, for convenience of easy understanding, the terms used in the 3GPP system are also used in the detailed embodiments.

Thereafter, the first network node transmits information related to the determined UE context retention group to the UE (S1920).

That is, the UE can be aware that which network node(s) retains UE context through the corresponding procedure.

Furthermore, the first network node may notify each of network nodes within the determined UE context retention group of the determined results.

More specifically, the UE context retention groups may be classified based on information related to UE context retention attributes.

The UE context retention attributes may indicate whether UE context is retained or not or whether UE context change possibility is present or not.

Furthermore, the UE context retention group may be determined through at least one of the speed of a UE, the moving direction of the UE, the state of the UE, a supported security algorithm, and a security update policy or network overhead.

The information related to the UE context retention group includes at least one of group information indicative of each group of UE context, UE context retention attribute information indicative of UE context retention attributes and information indicative of the grouping unit of a UE context retention group.

First Embodiment: UE-Specific Context Retention Grouping

Hereinafter, a method of grouping a network node(s) that retains UE context is described in more detail through the first embodiment.

First, in order to determine (or update) a group that retains UE context and the UE context retention attributes of each group, the following factors (1) to (6) may be taken into consideration.

That is, the following factors may be (1) a UE speed and moving direction, (2) a UE state (e.g., IDLE or CONNECTED), (3) a security algorithm supported in a UE and a network node, (4) a security update policy, (5) network overhead, (6) grouping unit, etc.

In this case, a network group that retains UE context may be configured like the UE location update group of the LTE (-A) system or may be configured as some eNBs (or cells) within a UE location update group.

In summary, a unit in which groups retaining UE context are grouped may be (1) a UE location update unit (e.g., a tracking area (3GPP 4G), a location area (3G), a RAN level location area) (option 1), (2) an eNB unit (option 2) or (3) a cell unit (option 3).

First, Option 1 (grouping in the UE location update unit) as a grouping unit of groups that retain UE context is described below.

Hereinafter, for example, a tracking area (TA) is described as the unit of UE location update, but the present invention is not limited thereto.

FIG. 20 is a diagram showing an example of a method of grouping UE context retention network nodes based on a UE location update unit, which is proposed by this specification.

As shown in FIG. 20, it may be seen that the grouping of UE context retention groups are classified in a UE location update (TA) unit, that is, TA 1, TA 2 and TA 3 groups.

In this case, grouping information related to the UE context retention groups may include group identification information (group #) indicative of each group, UE context retention attribute information indicative of the UE context retention attributes of each group, TA identification information (TA #) indicative of a UE location update unit, a validity time, a period, etc.

The UE context retention attribute information may include UE context retention presence or absence information indicating whether UE context is retained or not, UE context change (e.g., a security algorithm) possibility presence or absence information indicating whether a change possibility of UE context is present or not, etc.

A grouping information configuration related to the UE context retention group according to a TA unit may be expressed as "A", for example.

Table 1 below is a table showing an example of UE context retention attributes and TA for each group.

TABLE 1

| Group # | Context retention attributes | | TA # |
|---|---|---|---|
| | Retention presence or absence | Change (e.g., security algorithm) possibility presence or absence | |
| 1 | ○ (=guarantee retention) | X (=guarantee no-change possibility) | TA1: eNBs 1, 2 and 3 |
| 2 | ○ (= guarantee retention) | ○ (=not guarantee no-change possibility) | TA3: eNB 5 |
| 3 | ? (=flexible =not guarantee retention) | N/A | TA2: eNB 4 |
| 4 | X | N/A | others |

Referring to FIG. 20 and Table 1, groups may be classified depending on UE context retention attributes. It may be seen that the eNB 1, the eNB 2 and the eNB 3 are included in the TA 1, the eNB 5 is included in the TA 3, and the eNB 4 is included in the TA 2.

Next, a method of grouping network nodes that retain UE context according to an eNB unit proposed by this specification is described below.

Grouping related to a UE context retention group may be performed according to the eNB unit. A group 1 may include the eNB 1, group 2 may include the eNB 2, the eNB 3 and the eNB 5, and a group 3 may include the eNB 4.

In this case, the grouping information may include group identification information (group #), UE context retention attribute information, UE context change/application information, eNB identification information (eNB #), information related to a validity time/period, etc.

In this case, the grouping information configuration according to the eNB unit may be expressed as "B", for example.

Table 2 is a table showing UE context retention attributes for each group and the classification of eNBs thereof.

TABLE 2

| Group # | Retention presence or absence | Change (e.g., security algorithm) possibility presence or absence | Change/ application information | eNB # |
|---|---|---|---|---|
| 1 | ○ (=guarantee retention) | X (=guarantee no-change possibility) | NA | eNB 1 |
| 2 | ○ (=guarantee retention) | ○ (=not guarantee no-change possibility) | eNB 2 = security algorithm 1 eNB 3 = security algorithm 2 eNB 5 = security algorithm 3 | eNBs 2, 3 and 5 |
| 3 | ? (=flexible =not guarantee retention) | NA | NA | eNB 4 |
| 4 | X | NA | NA | others |

Next, methods of managing UE context (operation between network nodes) for determining (or updating) a UE context retention group, which are proposed by this specification, are described with reference to a related drawing.

UE context may also include the state of UE (e.g., IDLE, CONNECTED or SUSPENDED) information in addition to information additionally configured depending on a radio configuration, for example.

A method of determining a UE context retention group based on the initial transmission subject of UE context is described below.

A first method (method 1) is a method for a network node that additionally configures a UE (e.g., radio configuration) to determine a UE context retention group, and is described with reference to FIGS. 21 and 22.

FIG. 21 is a flowchart showing an example of a method of determining a UE context contention group, which is proposed by this specification.

FIG. 21 is a method for a network node that additionally configures a UE to directly determine a UE context retention group and to notify each UE context retention target network node of a corresponding fact.

Referring to FIG. 21, a network node 1 transmits UE initial context information, including action type information ("configuration") and UE context, to a network node 2 (S2110).

In this case, if the action type information is "configuration", it indicates information that the network node 1 (e.g., MME) instructs the configuration of UE context to the network node 2 (e.g., eNB).

That is, the network node 2 configures UE context through the action type information ("configuration") received from the network node 1.

Thereafter, the network node 2 determines a UE context retention group (S2120), and notifies corresponding network nodes (networks node 3, 4 and 5) of the determined retention of UE context through UE context information (S2130).

The UE context information may include action type information ("retention"), UE context retention attribute information, UE context change/application presence or absence information, and UE context (including UE context additionally configured by the network node 2).

That is, FIG. 21 shows a method of determining a UE context retention group, wherein the network node 2 determines even UE context retention attribute information of surrounding network nodes.

Next, a method of first receiving information from a surrounding network node(s) and determining a UE context retention group based on the received information is described below.

FIG. 22 is a flowchart showing another example in which a UE context retention group is determined, which is proposed by this specification.

That is, FIG. 22 is a method of determining a UE context retention group, wherein the network node 2 requests a surrounding network node(s) to retain specific UE context and receives UE context retention attribute information from the requested surrounding network node(s).

Referring to FIG. 22, the network node 1 transmits UE initial context information, including action type="configuration" and UE context, to the network node 2 (S2210).

In this case, the action type "configuration" means information indicating that the network node 1 (e.g., MME) instructs the network node 2 (e.g., eNB) to configure UE context.

Thereafter, the network node 2 transmits UE context information for requesting a surrounding network node(s) (network nodes 3, 4 and 5) to retain specific UE context (S2220).

The UE context information may include action type="retention" UE context (including UE context additionally configured by the network node 2), etc.

Thereafter, the network node 2 receives UE context information, including UE context retention attribute information of each network node and UE context change/application information, from the surrounding network node(s) (S2230).

Thereafter, the network node 2 determines a group that retains UE context based on the UE context information received from the surrounding network node(s) (S2240).

The second method (method 2) is a method in which a network node that collects information about UEs, such as an additional configuration, determines a UE context retention group, and is described with reference to FIGS. 23 and 24.

FIGS. 23 and 24 are flowcharts showing other examples of a method of determining a UE context contention group, which is proposed by this specification.

FIG. 23 shows a method in which a network node that collects information about UEs, such as an additional configuration, determines a UE context retention group and notifies each UE context retention target network node of the determined UE context retention group.

Referring to FIG. 23, a network node 1 transmits UE initial context information, including action type information ("configuration") and UE context, to a network node 2 (S2310).

In this case, the action type "configuration" indicates information indicating that the network node 1 (e.g., MME) instructs the network node 2 (e.g., an eNB) to configure UE context.

Thereafter, the network node 1 transmits UE context information, including UE context (=context additionally configured by the network node 2), group determination and an update consideration factor value, to the network node 2 (S2320).

Thereafter, the network node 1 determines a UE context retention group (S2330).

Thereafter, the network node 1 transmits UE context information, including action type information ("retention") and UE context (including UE context additionally configured by the network node 2), to a surrounding network node(s) (network nodes 3, 4 and 5) (S2340).

FIG. 24 shows a method in which a network node that collects information about UEs, such as an additional configuration, receives information about a surrounding network node(s) and determines a UE context retention group based on the corresponding information.

Steps S2410 and S2420 of FIG. 24 are the same as steps S2310 and S2320 of FIG. 23, and reference is made to FIG. 23.

After step S2420, the network node 1 transmits UE context information, including action type information ("retention") and UE context (including UE context additionally configured by the network node 2), to a surrounding network node(s) (network nodes 3, 4 and 5) (S2430).

Thereafter, the network node 1 transmits UE context information, including UE context retention attribute information and UE context change/application information, to the surrounding network node(s) (S2440).

Thereafter, the network node 1 determines a UE context retention group (S2450).

An operating method between network nodes according to the transmission subject of the update or release of UE context, which is proposed by this specification, is described with reference to FIGS. 25 and 26.

FIG. 25 is a flowchart showing an example of an operating method between network nodes according to the update or release of UE context, which is proposed by this specification.

FIG. 25 is a method in which a specific network node that additionally configures UE context determines the update or release of a UE context group and UE context retention information (e.g., retention attributes and UE context).

In the case of FIG. 25, the specific network node has been illustrated being a network node 2.

The specific network node may transmit UE context to additional UE context retention target network nodes according to UE context update using the same method as that of UE context information of FIGS. 22 and 24.

1) Specifically, the network node 2 may receive UE context information, including information related to UE context Modify of a network node, from UE context retention groups (network nodes 3, 4, 5 and 6) (S2510).

The information related to the UE context Modify may mean information related to the modification of UE context retention attributes or UE context change/application information.

Thereafter, the network node 2 determines the update or release of a UE context group and/or UE context information (S2520).

Thereafter, the network node 2 notifies network node(s) related to the update or release of the determined update or release (S2530).

As shown in FIG. 25, the network node 2 transmits UE context information, including modified UE context information, to the network nodes 5 and 6.

The modified UE context information may be UE context retention attributes, UE context including context additionally configured by the network node 2, etc.

Furthermore, the network node 2 transmits UE context information related to UE identifier delete to the network node 4, and transmits UE context information, including action type information ("retention"), UE context retention attribute information, and UE context including context additionally configured by the network node 2, to the network node 3.

FIG. 26 is a diagram showing another example of an operating method between network nodes according to the update or release of UE context, which is proposed by this specification.

That is, FIG. 26 is a method in which a specific network node that collects information about UEs, such as a UE context additional configuration, from surrounding network nodes determines the update or release of a UE context retention group and information (e.g., retention attributes and UE context).

As in FIG. 26, the specific network node may transmit UE context to an additional retention target network node according to update using the same method as that of UE context information of FIGS. 22 and 24.

Specifically, a network node 1 receives UE context information, including information related to modify, from a network node 2 (S2620).

The information related to modify includes UE context, UE context retention group determination and an update consideration factor value.

Furthermore, the network node 1 receives UE context information, including information related to UE context Modify, from a network node(s) (network nodes 3, 4, 5 and 6) (S2610).

The information related to UE context Modify may include UE context retention attributes and UE context change/application information.

Thereafter, the network node 1 determines a UE context retention group or updates information (S2630).

Thereafter, the network node 1 notifies a network node(s) related to update or release of the determined UE context retention group or updated information (S2640).

As shown in FIG. 26, the network node 1 transmits UE context information, including the modified UE context information, to the network node 3 and 4.

The modified UE context information may be UE context retention attributes, UE context, action type (=retention) information, etc.

Furthermore, the network node 2 transmits UE context information related to identifier delete to the network node 5, and transmits UE context information, including action type information ("retention"), UE context retention attributes and UE context including context additionally configured by the network node 2, to the network node 6.

As described above, information related to a UE context retention group may be transmitted from a radio network node or a core network node to a UE.

First, if a radio network node transmits context retention group information to a UE, a message including the context retention group information may be an RRC connection setup, RRC connection reconfiguration or RRC connection release message.

In this case, a radio network node may mean an eNB or an edge cloud (a network node adjacent to a UE), for example.

Next, if a core network node transmits context retention group information to a UE, a message including the context retention group information may be an Attach accept or TAU accept message.

In this case, the core network node may mean the MME in LTE, for example.

The context retention group information may be a grouping information configuration for an Add list, a grouping information configuration related to a Modify list, a group related to a delete list, and so on.

A data transmission/reception method and connection configuration method according to UE context, proposed by this specification, are described in detail in connection with a second embodiment and a third embodiment.

Second Embodiment

The second embodiment is a data transmission/reception method according to UE context retention attributes.

As described above, UE context retention attributes may include whether UE context is retained or not, whether UE context change possibility is present or not.

A UE context retention level of a cell/eNB according to UE context retention attributes may be listed as in Table 3.

TABLE 3

| Context retention attributes | | | |
|---|---|---|---|
| Retention presence or absence | Change possibility presence or absence | | UE Context retention level of cell/eNB |
| O | X | 1 | A cell/eNB uses context retained by a UE without any change. |
| O | O | 2 | A cell/eNB may differently use context unlike context retained by a UE |
| ? | NA | 3 | A cell/eNB may not have context retained by a UE |
| X | NA | 4 | A cell/eNB does not have context retained by a UE |

In Table 3, "?" means that whether UE context is retained or not is not clear.

FIG. 27 is a flowchart showing an example of a method of transmitting/receiving data according to UE context retention attributes, which is proposed by this specification.

Referring to FIG. 27, a selected or reselected eNB (or cell) checks UE context retention attributes.

That is, the selected or reselected eNB (or cell) checks that the UE context retention attributes shown in Table 3 correspond to which one of (O,X), (O,O), (?, N/A) and (X,N/A) and performs an operation according to a corresponding UE context retention level.

In this case, the eNB or cell may perform a procedure of sequentially checking the UE context retention attributes in order of (O,X), (O,O), (?, N/A) and (X,N/A).

In the parentheses, a first factor indicates whether UE context is retained or not. If UE context is retained, the first factor indicates "O." If UE context is not retained, the first factor indicates "X."

Furthermore, in the parentheses, a second factor indicates whether UE context change possibility is present or not. If a change possibility of UE context is present, the second factor indicates "O." If a change possibility of UE context is not present, the second factor indicates "X."

For example, if the UE context retention attributes indicate (X, N/A) as a result of check, data transmission/reception between a UE and an eNB may be performed as in the existing 3GPP system.

Hereinafter, it is assumed that a cell deployment, such as FIG. 20, and a UE context retention group have been configured as in Table 4 below before a data transmission/reception method according to UE context retention attributes is described in more detail.

TABLE 4

| Group # | Tracking area (TA)# | Context retention attributes | |
|---|---|---|---|
| | | Retention presence or absence | Change possibility presence or absence |
| 1 | TA1: eNBs 1, 2 and 3 | O | X |
| 2 | TA3: eNB 5 | O | O |
| 3 | TA2: eNB 4 | ? | NA |
| 4 | others | X | NA |

In Table 4, "?" means that whether UE context is retained or not is not clear.

A data transmission/reception procedure between a UE and an eNB according to UE context retention attributes is described in detail.

First, three cases (case #1, case #2 and case #3) are classified and a data transmission/reception method according to UE context retention attributes is described below.

In the first, Case #1 is a case where a corresponding cell/eNB uses UE context retained by a UE without any change.

In this case, the UE transmits a security-processed first message to the eNB using the UE context retained by the UE without any change.

Furthermore, the eNB performs a different operation depending on UE verification results (success or failure).

That is, if UE verification is successful, the eNB transmits a security-processed second message to the UE. If UE verification fails, the eNB transmits a security not-processed second message to the UE.

In the second, Case #2 is a case where a corresponding cell/eNB may use UE context unlike UE context retained by a UE.

In this case, the UE transmits a security-processed first message to the eNB using context retained by the UE and selected/indicated change information (e.g., security algorithm).

The eNB operation of Case #2 is the same as the eNB operation of Case #1.

In the third, Case #3 is a case where a corresponding cell/eNB does not retain UE context retained by a UE.

In this case, a (re)selected cell/eNB transmits a security-processed first message to an eNB using context retained by a UE and indicated change information (e.g., security algorithm) only when UE context of the UE is retained.

The eNB operation of Case #3 is the same as the eNB operation of Case #1.

The aforementioned cases may be listed as in Table 5.

TABLE 5

| Case | UE operation | eNB operation |
|---|---|---|
| #1 | Transmit a security-processed first message using context retained by a UE without any change | Perform an operation according to UE verification results |
| #2 | Transmit a security-processed first message using context retained by a UE and selected/indicated change information (e.g., security algorithm) | Success: transmit a security-processed second message Failure: transmit a security not-processed second message |
| #3 | Transmit a security-processed first message using context retained by a UE and indicated change information (e.g., security algorithm) only when a (re)selected cell/eNB retains its own context | |

A data transmission/reception procedure according to UE context retention attributes may be basically divided into two steps of a first step and a second step.

The first step is the step of a cell/eNB to which a UE has (re)selected or moved checks retention attributes of UE context related to the cell/eNB.

For example, a UE may check that a corresponding cell/eNB is a cell/eNB belonging to which TA through a message (e.g., system information) transmitted by t the corresponding cell/eNB.

Accordingly, the UE can recognize the UE Context retention group index of the corresponding cell/eNB and the UE context retention attributes of the corresponding eNB for the UE.

A field checked by the UE may be different depending on the grouping unit (e.g., a location update area: a TA List, an eNB: an eNB ID, and a cell: a cell ID) of the aforementioned UE context retention group.

Next, in the second step, a corresponding operation is performed according to the UE context retention level of a cell/eNB corresponding to UE context retention attributes.

That is, if a (re)selected or moved cell/eNB uses UE context retained by a UE without any change, it performs the operation of Case #1 in Table 5.

Furthermore, if a corresponding cell/eNB differently uses UE context differently from UE context retained by a UE, it performs the operation of Case #2 in Table 5.

If a UE has previously obtained change/application information for UE context, in the operation of Case #2, context retained by the UE is not used without any change, but an operation corresponding to Case #1 is performed using the change/application information.

Furthermore, if a corresponding cell/eNB does not have UE context retained by a UE, it performs the operation of Case #3 of Table 5.

Furthermore, if a corresponding cell/eNB does not have UE context retained by a UE, it performs a conventional (3GPP system) operation.

A data transmission/reception method between a UE and an eNB according to each of the aforementioned cases is described below.

Case #1

The case #1 is a data transmission/reception method for a (re)selected or moved cell/eNB uses UE context retained by a UE without any change.

First, uplink data transmission is described below.

FIG. 28 is a flowchart showing an example of a method of transmitting uplink data according to UE context retention attributes, which is proposed by this specification.

One or more messages used in the procedure of FIG. 28 may be included in a random access procedure or may be transmitted/received separately from a random access procedure.

If an eNB receives a first message from a UE in the connected state to which the eNB does not provide service, it may perform a connection reconfiguration procedure or connection condition configuration procedure along with the UE.

In FIG. 28, an RLF indicates a radio link failure, and HO indicates handover.

In FIG. 28, a first information block (or information block 1) and a second information block (or information block 2) included in the first message may have the configuration and security processing as those of Table 6 below.

TABLE 6

| Information block | element example | security processing |
|---|---|---|
| First information block | UE identifier<br>UE radio identification resources<br>Access purpose (uplink data transmission/downlink data reception)<br>Data length<br>Data path identifier<br>Data quality identifier | No or integrity protection possible |
| Second information block | Data | Ciphering possible |

Referring to FIG. 28, a UE receives system information including a tracking area (TA) list from an eNB (S2810).

The TA list may be expressed in an index form, such as 1, 2, . . . .

Thereafter, the UE checks UE context retention attribute information of the eNB through the system information (S2820).

If, as a result of the check, the UE context retention attribute information is (O, X) of Table 3, the UE requests resources from the eNB and receives resources allocated by the eNB (S2830).

An example of the resource request and resource allocation procedure may be a random access procedure.

Thereafter, the UE transmits the first message, including the information block 1 and the information block 2, to the eNB (S2840).

Thereafter, the eNB checks UE context retention attribute information of the UE (S2850). If, as a result of the check, the UE context retention attribute information of the UE is (O,X), the eNB transmits a success message, indicating that the reception of the first message has been successful, to the UE (S2860).

In this case, the success message for the first message may be transmitted when the verification of the UE is successful.

Thereafter, the eNB checks the state of the UE (S2870). If the state of the corresponding UE is the connected state, it may perform a connection reconfiguration procedure and connection condition configuration procedure according to an RLF, HO, etc. along with the UE (S2880).

The connection reconfiguration procedure may be an RRC connection reconfiguration procedure, and the connection condition configuration procedure may be an RRC connection re-establishment procedure.

If the verification of the UE has failed, the eNB transmits a failure message for the first message to the UE (S2860').

A detailed operating method of the UE in the uplink data transmission of Case #1 is described below.

FIG. 29 is a diagram showing an example of an operating method of a UE in FIG. 28.

A UE processes one or more information blocks (e.g., a first information block and a second information block) as in FIG. 29 and directly transmits them to an eNB regardless of its own current state because the eNB (or cell) uses UE context retained by the UE without any change.

As shown in FIG. 29, the one or more information blocks transmitted from the UE to the eNB may include a header 2910, a first information block 2920, a second information block 2930, and a MAC-1 field 2940.

In this case, the first information block may include information about a UE identifier, and the second information block may include ciphered data.

The MAC-1 field may be a field generated by integrity-protecting a data length, etc. included in the second information block.

FIG. 30 is a diagram showing an example of an operating method of an eNB in FIG. 28.

When an eNB receives uplink data according to UE context retention attributes from a UE, it may process received information blocks in the following sequence.

First, the eNB receives a message, including a header 3010, a first information block 3020, a second information block 3030, and a MAC-1 field 3040, from the UE.

Thereafter, the eNB extracts UE context (e.g., an integrity and ciphering key and a security algorithm) of the UE according to a UE identifier, etc.

In this case, the eNB may notify a layer on which integrity and decoding will be performed according to a protocol design of the corresponding context and information, such as a data length.

In this case, an integrity and decoding (or ciphering) key to be used may have been generated by a specific rule again.

Thereafter, the eNB generates X-MAC for integrity verification through information included in the first information block.

Thereafter, the eNB performs integrity check by comparing the MAC-1 field received from the UE and the generated X-MAC.

Thereafter, if the X-MAC and the MAC-I are the same and the decoding of data is success, the eNB uploads data onto a higher layer.

If the X-MAC and the MAC-I are not the same and the decoding fails, the eNB notifies a higher layer of the failure fact.

Thereafter, if the state of the UE on which UE verification has been successfully performed is the connected state, the eNB may perform a radio connection reconfiguration procedure and data path switching procedure, etc. along with the UE.

A method of receiving downlink data for Case #1 is described below.

FIG. 31 is a flowchart showing an example of a method of receiving downlink data according to UE context retention attributes, which is proposed by this specification.

One or more messages used in the procedure of FIG. 31 may be included in a random access procedure or may be transmitted/received separately from a random access procedure.

As shown in FIG. 32, the paging eNB group of a UE may be classified according to a UE context retention level.

That is, FIG. 32 is a diagram showing an example of a paging eNB group, which is proposed by this specification.

An eNB group according to each UE context retention level transfers paging indication and/or data to a UE.

Referring to FIG. 31, eNBs belonging to a UE context-related paging group may transfer downlink data, together with paging indication, to a UE depending on that each eNB has which UE context retention attributes.

If the eNB(s) does not receive a response message (e.g., a first message) for a paging message from a UE within a predetermined time (or period), the eNB(s) delete the downlink data.

Table 7 is a table showing an example of a configuration for the information blocks 1, 2 and 3 of FIG. 31.

TABLE 7

| Information block | Element example | Security processing |
|---|---|---|
| First information block | UE identifier<br>UE radio identification resources<br>Access purpose (uplink data transmission/downlink data reception) | No or integrity protection possible |
| Second information block | UE identifier<br>UE radio identification resources<br>Data length<br>Data path identifier<br>Data quality identifier | Integrity protection possible |
| Third information block | Data | Ciphering possible |

Steps S3110, S3140 to S3150, and S3170 of FIG. 31 are the same as steps S2810 to S2830 and S2850 of FIG. 28, and thus detailed contents are omitted and only a difference is described.

After step S3110, the eNB receives a paging indication message and/or downlink data from another network node (S3120).

The eNB transmits a paging message to the UE (S3130).

If, as a result of the check at step S3140, a UE context retention attribute value of the corresponding eNB is (O,X), the UE performs step S3150 along with the eNB.

Thereafter, the UE transmits a first message, including the information block 1, to the eNB (S3160).

Thereafter, the eNB performs step S3170. If, as a result of the check, the UE context retention attribute value is (O,X), the eNB transmits a second message, including the information block 2 and the information block 3, to the UE (S3180).

In this case, the second message is transmitted if UE verification is successful.

Thereafter, the UE transmits a success message for the second message to the eNB (S3190).

If the UE verification has failed, the eNB transmits a failure message for the first message to the UE (S3180').

Hereinafter, a detailed operating method of a UE and an eNB related to downlink data reception in the case of Case #1 is described with reference to FIGS. 33 and 34.

FIGS. 33 and 34 are diagrams showing examples of an operating method of a UE and an eNB for downlink data reception according to UE context retention attributes, which is proposed by this specification.

First, a UE operation is described with reference to FIG. 33.

In the case of Case #1, an eNB (or cell) uses UE context retained by a UE without any change. The UE may process a header 3310, a first information block 3320, and a MAC-1 field 3330 as in FIG. 33, and transmits them to the eNB.

The first information block includes information related to a UE identifier. The MAC-1 field includes integrity-protected information of the UE identifier.

Next, an eNB operation method for the downlink data reception of Case #1 is described with reference to FIG. 34.

FIG. 34a shows the processing operation of a first message, and FIG. 34b shows the processing operation of a second message.

Referring to FIG. 34a, an eNB receives the first message, including a header, a first information block and a MAC-1 field, from a UE.

Thereafter, the eNB extracts context (e.g., an integrity key and a security algorithm) of the UE according to the received first information block.

In this case, the eNB may notify a layer that will perform integrity and ciphering according to a protocol design of information, such as corresponding context.

Furthermore, an integrity and ciphering key to be used may have been generated by a specific rule again.

Thereafter, the eNB generates X-MAC for integrity verification and compares the generated X-MAC with the received MAC-1 field value.

Thereafter, if the X-MAC and the MAC-I are the same, the eNB transmits downlink data to the UE.

If the X-MAC and the MAC-I are not the same, the eNB notifies a network node that integrity has failed.

Referring to FIG. 34b, if the X-MAC and the MAC-I are the same, the eNB transmits downlink data, including a header, a second information block, a third information block and a MAC-1 field, to the UE.

As shown in FIG. 34b, the second information block includes information about a UE identifier, and the third information block includes ciphered data.

Case #2

The case #2 may be basically divided into (1) Method 1 and (2) Method 2.

The method 1 and method 2 may be divided depending on that information (e.g., a security algorithm) of UE context to be changed will be made to be recognized prior to access or will be made to be recognized after access/during access.

(Method 1)

First, Method 2 is a method of designing information (e.g., a security algorithm) of UE context to be changed so that the information is recognized prior to access if an eNB can use UE context differently from UE context retained by a UE.

The method 1 may be divided into (1) Option 1 and (2) Option 2.

First, Option 1 is a method of obtaining, by a UE, information (e.g., a security algorithm supported by an eNB) of UE context to be changed through a message (e.g., system information or a paging message) transmitted by the eNB (or cell) and transmitting, by the UE, one or more information blocks applied using the following methods (a UE selection method and a selection method according to a determined rule) to the eNB regardless of its own current state.

UE selection method

In this method, a UE selects one of ciphering algorithms (e.g., eea0, eea1, eea2 and eea3-v1130) and one of integrity guarantee algorithms (e.g., eia0-v920, eia1, eia2 and eia3-v1130) supported by an eNB.

In this case, the UE explicitly notifies the eNB of the selected algorithms.

Selection method according to determined rule

Both an eNB and a UE select ciphering and integrity guarantee algorithms according to a predetermined identical rule.

In this case, the UE does not need to explicitly notify the eNB of its selected algorithm.

The reason for this is that the eNB is aware that the UE will select which algorithm according to the predetermined rule.

For example, a rule in which an algorithm that belongs to algorithms supported by the eNB and the UE and that has the greatest value may be defined as the determined rule.

For example, if a ciphering algorithm type is enumerated and defined to have a value of eea0=1, eea1=2, eea2=3, eea3-v1130=4 and the eNB supports eea1, eea2 and eea3-v1130 and the UE supports eea1 and eea3-v1130, a selected ciphering algorithm is eea3-v1130.

Hereinafter, an uplink data transmission procedure (of a UE) according to Option 1 is described in detail with reference to FIG. 35 and Table 8.

FIG. 35 is a flowchart showing another example of a method for a UE to transmit uplink data according to UE context retention attributes, which is proposed by this specification.

One or more messages used in the procedure of FIG. 35 may be included in a random access procedure or may be transmitted/received separately from or a random access procedure.

In this case, if an eNB receives the first message of FIG. 35 from a UE in the connected state to which the eNB does not provide service, the eNB may perform a connection reconfiguration procedure and connection condition configuration procedure along with the UE.

Table 8 is a table showing an example of the elements of an information block 1 and information block 2 used in FIG. 35.

TABLE 8

| Information block | Element example | Security processing |
|---|---|---|
| First information block | UE identifier<br>UE radio identification resources<br>Access purpose (uplink data transmission/downlink data reception)<br>Data length<br>Data path identifier<br>Data quality identifier<br>Security algorithm | No or integrity protection possible |
| Second information block | data | Ciphering possible |

Since the procedures of FIG. 35 are almost the same as the procedures of FIG. 28 of Case #1, only a difference is chiefly described in detail and reference is made to the description of FIG. 28 with respect to the same part.

At step S3510, system information may further include information about a security algorithm supported by an eNB.

Accordingly, after the UE checks UE context retention attribute information, it selects one of security algorithms included in the system information (S3520) and notifies the eNB of the selected security algorithm.

Thereafter, after the eNB checks the context retention attribute information of the UE, it recognizes or selects a security algorithm to be applied through the security algorithm received from the UE (S3530).

Furthermore, in FIG. 29 described in the UE operation and eNB operation related to uplink data transmission, in the case of Option 1 of Case #2, the first information block transmitted from the UE to the eNB includes a UE identifier, a data length and security algorithm information.

Furthermore, the security algorithm information included in the first information block is used to generate a MAC-1 field for integrity protection.

Reference is made to FIG. 28 because the remaining procedures are the same as the steps of FIG. 28.

Next, a downlink data reception procedure (of a UE) according to Option 1 is described in detail with reference to FIG. 36 and Table 9.

FIG. 36 is a flowchart showing an example of a method for a UE to receive downlink data according to UE context retention attributes, which is proposed by this specification.

One or more messages used in the procedure of FIG. 36 may be included in a random access procedure or may be transmitted/received separately from a random access procedure.

Table 9 is a table showing an example of the elements of an information block 1, an information block 2 and an information block 3 used in FIG. 36.

TABLE 9

| Information block | Element example | Security processing |
|---|---|---|
| First information block | UE identifier<br>Radio identification resources<br>Access purpose (uplink data transmission/downlink data reception)<br>Security algorithm | No or integrity protection possible |
| Second information block | UE identifier<br>UE radio identification resources<br>Data length<br>Data path identifier<br>Data quality identifier | Integrity protection possible |
| Third information block | Data | Ciphering possible |

Since the procedures of FIG. 36 are almost the same as the procedures of FIG. 31 of Case #1, only a difference is chiefly described in detail.

At step S3610, system information may further include information about a security algorithm supported by an eNB.

Alternatively, a paging message may include information about the security algorithm supported by the eNB.

Accordingly, after the UE checks UE context retention attribute information, it selects one security algorithm that belongs to security algorithms included in the system information or paging message and that is to be applied (S3620) and notifies the eNB of the selected algorithm.

Thereafter, after the eNB checks the UE context retention attributes of the UE, it recognizes or selects a security algorithm to be applied through the security algorithm received from the UE (S3630).

Furthermore, in FIG. 33 in the UE operation and eNB operation related to downlink data reception, in the case of Option 1 of Case #2, the first information block transmitting from the UE to the eNB includes a UE identifier and security algorithm information.

Furthermore, security algorithm information included in the first information block is used to generate a MAC-1 field for integrity protection.

Reference is made to FIG. 31 because the remaining procedures are the same as the steps of FIG. 31.

Next, Option 2 of Case #2 is described below.

The option 2 is a method for an eNB to directly select information (e.g., a security algorithm supported by the eNB) of UE context to be changed and transferring the changed information to a UE through a paging message so that the UE recognizes the information to be changed.

A procedure for downlink data reception is described with reference to FIG. 37. After the eNB checks UE context retention attribute information, it selects information (security algorithm) of UE context to be changed (S3710), and transmits the selected information to be changed to the UE through the paging message (S3720).

Thereafter, the UE recognizes the security algorithm selected by the eNB through the UE context retention attributes of the eNB (S3730).

Subsequent procedures are the same as those of FIG. 36, and the configuration of a first information block, a second information block and a third information block are listed in Table 10 below.

TABLE 10

| Information block | Element example | Security processing |
|---|---|---|
| First information block | UE identifier<br>UE radio identification resources<br>Access purpose (uplink data transmission/downlink data reception) | No or integrity protection possible |
| Second information block | UE identifier<br>UE radio identification resources<br>Data length<br>Data path identifier<br>Data quality identifier | Integrity protection possible |
| Third information block | Data | Ciphering possible |

Next, Method 2 of Case #2 is described in detail using a related drawing and table.

The method 2 is a method of allowing a UE to recognize information (e.g., a security algorithm) of UE context to be changed/applied after a connection with the UE or during a connection with the UE if an eNB (or cell) can use UE context differently from UE context retained by the UE.

First, a method of transmitting uplink data (of a UE) in Method 2 is described below.

FIG. 38 is a flowchart showing another example of a method for a UE to transmit uplink data according to UE context retention attributes, which is proposed by this specification.

One or more messages used in the procedure of FIG. 38 may be included in a random access procedure or may be transmitted/received separately from a random access procedure.

In this case, if an eNB receives a second message of FIG. 38 from a UE in the connected state to which the eNB does not provide service, the eNB may perform a connection reconfiguration procedure and connection condition configuration procedure along with the UE.

Table 11 is a table showing an example of the elements of information blocks 1, 2, 3 and 4 used in FIG. 38.

TABLE 11

| Information block | Element example | Security processing |
|---|---|---|
| First information block | UE identifier<br>UE radio identification resources<br>Access purpose (uplink data transmission/downlink data reception) | No or integrity protection possible |
| Second information Block | Information to be changed/applied (e.g., a security algorithm) | Integrity protection possible |

TABLE 11-continued

| Information block | Element example | Security processing |
|---|---|---|
| Third information block | UE identifier<br>Radio identification resources<br>Data length<br>Data path identifier<br>Data quality identifier | Integrity protection possible |
| Fourth information block | Data | Ciphering possible |

The procedures of FIG. 38 are almost the same as those of FIG. 28 of Case #1, and thus only a difference is described in detail.

In FIG. 38, it is assumed that UE context retention attribute information is (O,O).

After a UE performs resources request/allocation procedures along with an eNB, the UE transmits a first message, including the first information block, to the eNB (S3810).

Thereafter, after the eNB checks UE context retention attribute information, it selects a security algorithm to be changed/applied (S3820), includes the security algorithm in the information block 2, and transmits the information block 2 to the UE (S3830).

The information block 2 may be included in a response message for the first message.

Thereafter, the UE transmits a second message, including the information block 3 and the information block 4, to the eNB (S3840).

Reference is made to Table 11 for elements included in the information block 3 and the information block 4.

Reference is made to the steps of FIG. 28 because the remaining procedures are the same as the steps of FIG. 28.

A UE operation and an eNB operation related to FIG. 38 are described below.

The UE transmits a first message, including a header and an information block (first information block), to the eNB regardless of its own state.

The first information block may include a UE identifier, etc.

Furthermore, the eNB may process information blocks received from the UE in the following sequence and transmit the information blocks to the UE.

First, the eNB receives the first message from the UE, and extracts UE context of the corresponding UE according to the UE identifier, etc. from the received first message.

In this case, the eNB may notify a layer that will perform integrity according to a protocol design of information, such as the corresponding context and a security algorithm selected by the eNB.

Furthermore, an integrity key may have been generated again by a specific rule.

The eNB may transmit the second information block, including a security algorithm, to the UE along with the header and the MAC-1 field.

In this case, the MAC-1 field may be generated through the security algorithm for integrity protection.

Furthermore, the UE may configure a message including the third information block and the fourth information block, and transmit the message to the eNB.

That is, the UE may transmit one or more information blocks to the eNB using its retained UE context and UE context information (e.g., a security algorithm) to be changed/applied, received from the eNB.

In this case, the eNB may process the information blocks received from the UE through the aforementioned sequence.

For a detailed description thereof, reference is made to the aforementioned information block reception processing process of the eNB.

Next, a downlink data reception procedure (of a UE) according to Method 2 of Case #2 is described in detail with reference to FIG. 39 and Table 12.

FIG. 39 is a flowchart showing another example of a method for a UE to receive downlink data according to UE context retention attributes, which is proposed by this specification.

One or more messages used in the procedure of FIG. 39 may be included in a random access procedure or may be transmitted/received separately from a random access procedure.

Table 12 is a table showing an example of the elements of the information block 1 to the information block 5 used in FIG. 39.

TABLE 12

| Information block | Element example | Security processing |
|---|---|---|
| First information block | UE identifier<br>UE radio identification resources<br>Access purpose (uplink data transmission/downlink data reception)<br>Security algorithm | No |
| Second information block | Information to be changed/applied (e.g., a security algorithm) | Integrity protection possible |
| Third information block | UE identifier<br>UE radio identification resources | Integrity protection possible |
| Fourth information block | UE identifier<br>UE radio identification resources<br>Data length<br>Data path identifier<br>Data quality identifier | Integrity protection possible |
| Fifth information block | Data | Ciphering possible |

Since the procedures of FIG. 39 are similar to those of FIG. 31 of Case #1, only a difference between FIG. 39 and FIG. 31 is described in detail.

In FIG. 39, it is assumed that UE context retention attributes are (O,O).

After an eNB checks context retention attributes of a UE, it selects a security algorithm of UE context to be changed/applied (S3910).

Thereafter, the UE transmits a second message, including the information block 3 of Table 12, to the eNB (S3920).

Thereafter, if UE verification of the UE is successful, the eNB transmits a third message, including the information block 4 and the information block 5, to the UE as a response to the second message.

Thereafter, the UE transmits a success message for the third message to the eNB.

If the verification of the UE fails, the eNB transmits a failure message for the second message to the UE.

Reference is made to the steps of FIG. 31 because the remaining procedures are the same as or similar to the steps of FIG. 31.

Case #3

In the case of Case #3, that is, if a (re)selected or moved eNB (or cell) cannot convince whether UE context is retained or not, a data transmission/reception method with a UE is described below.

FIG. 40 is a flowchart showing another example of a method for a UE to transmit uplink data according to UE context retention attributes, which is proposed by this specification.

One or more messages used in the procedure of FIG. 40 may be included in a random access procedure or may be transmitted/received separately from a random access procedure.

In FIG. 40, if a first message received from a UE is a connection configuration request message, an eNB may perform a connection condition configuration procedure along with the UE only when the verification of the first message or a second message is successful.

Table 13 is a table showing an example of the elements of information blocks 1 to 4 used in FIG. 40.

TABLE 13

| Information block | element example | Security processing |
|---|---|---|
| First information block | UE identifier<br>UE radio identification resources<br>Access purpose (uplink data transmission/downlink data reception) | Integrity protection possible |
| Second information block | Whether retention is present or not = YES/NO<br>Information to be changed/applied (e.g., a security algorithm) | Integrity protection possible (only when retention is present) |
| Third information block | UE identifier<br>UE radio identification resources<br>Data length<br>Data path identifier<br>Data quality identifier | Integrity protection possible |
| Fourth information block | Data | Ciphering possible |

The procedures of FIG. 40 are similar to those of FIG. 28 of Case #1, and thus only a difference is described in detail.

A UE transmits a first message, including the first information block, to an eNB (S4010).

Thereafter, after the eNB checks whether UE context is retained (S4020), if the UE context is retained, the eNB selects a security algorithm to be changed/applied and transmits the selected security algorithm, including the information block 2, to the UE (S4030).

The information block 2 may be included in a response message for the first message.

Thereafter, the UE transmits a second message, including the information block 3 and the information block 4, to the eNB (S4040).

Reference is made to Table 13 regarding elements included in the information block 3 and the information block 4.

Reference is made to the steps of FIG. 28 because the remaining procedures are the same as the steps of FIG. 28.

FIG. 41 is a diagram showing the operation of the UE and the eNB in FIG. 40.

In particular, FIG. 41a shows the operation of a UE, and FIG. 41b shows the operation of an eNB.

In Case #3, the operation of the UE related to uplink data transmission is described with reference to FIG. 41.

The UE cannot convince whether a corresponding cell/eNB has UE context retained by the UE, but transmits a first message, including a header and an information block, to the eNB as shown in FIG. 41a.

The information block may include a UE identifier, etc.

Furthermore, the eNB may process the information blocks received from the UE in the following sequence as in FIG. 41b, and may transmit them to the UE.

First, the eNB receives the first message from the UE, and checks whether UE context of the corresponding UE according to the UE identifier, etc. is retained in the received first message.

In this case, if the eNB has retained the UE context of the UE, it may notify a layer that will perform integrity according to a protocol design of information, such as the corresponding context and a security algorithm selected by the eNB.

Furthermore, an integrity key to be used may have been generated again by a specific rule.

As in FIG. 41*b*, the eNB may transmit the second information block, including information indicating whether the UE context of the UE is retained or not, to the UE along with a header and a MAC-1 field.

In this case, the MAC-1 field may be generated through a security algorithm for integrity protection.

Next, a method for a UE to receive downlink data according to Case #3 is described below.

The method for a UE to receive downlink data according to Case #3 may be divided into Method 1 and Method 2 depending on a method of allowing the UE to recognize information about whether UE context is retained or not after a connection (or during the connection) or before the connection.

Method 1 is a method of designing information about whether UE context is retained or not so that a UE recognizes the information after a connection with an eNB or during the connection.

FIG. 42 is a flowchart showing another example of a method for a UE to transmit downlink data according to UE context retention attributes, which is proposed by this specification.

In FIG. 42, if UE context information to be changed/applied is not included in a response message for a first message, a UE waits for downlink data reception from an eNB.

Table 14 is a table showing an example of the elements of information blocks used in FIG. 42.

TABLE 14

| Information block | Element example | Security processing |
|---|---|---|
| First information block | UE identifier<br>UE radio identification resources<br>Access purpose (uplink data transmission/downlink data reception) | Integrity protection possible |
| Second information block | Whether retention is present = YES/NO<br>Information to be changed/applied (e.g., a security algorithm) | Integrity protection possible (only when retention is present) |
| Third information block | UE identifier<br>UE radio identification resources<br>Data length<br>Data path identifier<br>Data quality identifier | Integrity protection possible |
| Fourth information block | UE identifier<br>UE radio identification resources<br>Data length<br>Data path identifier<br>Data quality identifier | Integrity protection possible |
| Fifth information block | Data | Ciphering possible |

The procedures of FIG. 42 are similar to those of FIG. 28 of Case #1, and thus only a difference is described in detail. In the case of FIG. 42, it is assumed that UE context retention attributes are (?,NA).

A UE checks whether change information of UE context is included or not (S4210).

If, as a result of the check, the change information of the UE context is included, the UE transmits a second message, including the information block 3 of Table 14, to an eNB (S4220).

Thereafter, if the verification of the UE is successful, the eNB transmits a third message, including the information blocks 4 and 5, to the UE.

Thereafter, the UE transmits a success message for the third message to the eNB.

In this case, if the eNB has failed in the verification of the UE, it transmits a failure message for the first message or the second message to the UE.

Next, Method 2 of Case #3 is described with reference to FIG. 43 and Table 15.

Method 2 is a method of designing information about whether an eNB retains UE context or not so that a UE recognizes the information prior to a connection with the UE.

In this case, the eNB checks whether UE context is retained or not and whether information (e.g., a security algorithm) to be changed/applied is present. If the information to be changed/applied is present, the eNB transmits a paging message, including the corresponding information, to the UE.

Table 15 is a table showing an example of the elements of information blocks used in Method 2 of Case #3.

TABLE 15

| Information block | Element example | Security processing |
|---|---|---|
| First information block | UE identifier<br>UE radio identification resources<br>Access purpose (uplink data transmission/downlink data reception) | Integrity protection possible |
| Second information block | UE identifier<br>UE radio identification resources<br>Data length<br>Data path identifier<br>Data quality identifier | Integrity protection possible |
| Third information block | Data | Ciphering possible |

FIG. 43 is a flowchart showing another example of a method of receiving downlink data according to UE context retention attributes, which is proposed by this specification.

One or more messages used in the procedure of FIG. 43 may be included in a random access procedure or may be transmitted/received separately from a random access procedure.

Steps S4301, S4302 and S4307 to S4312 of FIG. 43 are the same as steps S3110, S3120 S3150 to S3180' of FIG. 31, and thus detailed contents are omitted and only a difference is described.

An eNB receives a paging indication message and/or downlink data from another network node (S4302).

Thereafter, the eNB checks whether UE context of a corresponding UE is retained or not (S4303).

Thereafter, if the UE context of the UE is retained, the eNB selects information (e.g., a security algorithm) of the UE context to be changed/applied. (S4304).

In this case, the following procedure may be omitted if the information to be changed/applied is not present.

Thereafter, the eNB transmits a paging message, including at least one of a UE identifier, information indicating whether context is retained or not, and the security algorithm selected by the eNB, the UE (S4305).

Thereafter, the UE checks whether UE context is retained or not (S4306). If the UE context is retained, the UE performs steps S4307 to S4313.

Third Embodiment

The third embodiment shows a connection configuration procedure between a UE and an eNB according to UE context retention attributes.

Contents for each of the cases Case #1, Case #2 and Case #3 may be likewise applied to a connection configuration procedure according to UE context retention attributes in addition to the data transmission/reception method according to UE context retention attributes.

Accordingly, a method of performing a connection configuration procedure according to UE context retention attributes is described below.

The third embodiment may be divided into Situation 1 and Situation 2 depending on a method of allowing a UE to recognize whether UE context is retained or not, whether UE context change information is present or not and UE context change information prior to a connection or after a connection.

That is, Situation 1 is a method of allowing a UE to recognize whether UE context is retained or not, whether UE context change information is present or not and UE context change information prior to a connection. Situation 2 is a method of allowing a UE to recognize whether UE context is retained or not, whether UE context change information is present or not and UE context change information after a connection (or during the connection).

In this case, the contents described in Case #1 to Case #3 may be applied to Situation 1 and Situation 2.

In Situation 1, as in Table 16 below, operating methods of a UE and an eNB for each case may be defined.

The paging message may be omitted, if necessary.

The system information or the paging message may include addition information on which the UE and the eNB operate for each case.

Thereafter, the UE checks UE context retention attribute information of the corresponding eNB (S4402).

Thereafter, the UE performs a resource request and resource allocation procedure through a procedure, such as random access, along with the eNB (S4403).

Thereafter, the UE performs a connection configuration procedure and a connection condition configuration procedure along with the eNB.

The corresponding procedure may be classified as follows depending on a case where the verification of the UE is successful (S4404) and a case where the verification of the UE fails (S4405).

First, if the verification of the UE is successful, the following procedure may be performed.

After step S4403, the UE transmits a first message for making a connection configuration request to the eNB.

Thereafter, the eNB transmits a second message, including information related to a connection configuration and a connection condition configuration, to the UE.

Thereafter, the UE transmits a response message for the second message to the eNB.

Thereafter, the eNB transmits a third message, including information related to the connection condition configuration, to the UE.

The case where the verification of the UE fails is described below.

After the UE transmits the first message to the eNB, the eNB transmits a second message, including information related to a connection configuration, to the UE.

Thereafter, the UE transmits a response message for the second message to the eNB.

TABLE 16

| Situation | Case | UE operation | eNB operation |
| --- | --- | --- | --- |
| #1) Design whether UE context is retained, whether change information is present or not, and change information so that a UE recognizes them prior to a connection | #1 | Transmit security-processed first message using context retained by a UE without any change | Perform another operation based on a result of UE verification<br>Success: transmit a security-processed second message<br>Failure: transmit a security not-processed second message |
| #1) Design whether UE context is retained, whether change information is present or not, and change information so that a UE recognizes them prior to a connection | #2 | Transmit security-processed first message using context retained by UE and selected/indicated change information (e.g., security algorithm) | Perform another operation based on a result of UE verification<br>Success: Transmit a security-processed second message<br>Failure: Transmit a security not-processed second message |
| #1) Design whether UE context is retained, whether change information is present or not, and change information so that a UE recognizes them prior to a connection | #3 | Transmit security-processed first message using context retained by a UE and indicated change information (e.g., security algorithm) only when a (re)selected cell/eNB retains its own context | Perform another operation based on a result of UE verification<br>Success: transmit a security-processed second message<br>Failure: transmit a security not-processed second message |

FIG. 44 is a flowchart showing an example of a connection configuration procedure according to UE context retention attributes, which is proposed by this specification.

Referring to FIG. 44, an eNB transmits system information and/or a paging message to a UE (S4401).

Thereafter, the eNB transmits a third message, including information related to a security configuration, to the UE.

Thereafter, the UE transmits a response message for the third message to the eNB.

Thereafter, the eNB transmits a fourth message related to a connection condition configuration to the UE.

FIG. 45 is a diagram showing an example of the information block used in FIG. 44.

As shown in FIG. 45, a first message includes an information block, including a UE identifier, and a MAC-1 field generated for integrity protection.

Furthermore, a second message transmitted to a UE if UE verification is successful includes an information block, including a ciphered UE identifier, and a MAC-1 field generated for integrity protection. A second message transmitted to a UE if UE verification fails includes only an information block including a ciphered UE identifier.

UE and eNB operation methods for each case according to Situation 2 are described below.

The operations of a UE and eNB of Case #2 according to Situation 2 may be defined as in Table 17 and FIG. 46.

TABLE 17

| Situation | Case | eNB operation | UE operation |
| --- | --- | --- | --- |
| #2) Design whether UE context is retained, whether change information is present or not, and change information so that a UE recognizes them after a connection/ connection process | #2 | If retention attributes for a UE that has transmitted a first message are (○, ○), transmit a security-processed second message including change information Transmit security-processed third message transmission including different contents based on a result of UE verification | Transmit a response message for security-processed second message using context retained by UE and indicated change information (e.g., security algorithm) |

FIG. 46 is a flowchart showing another example of a connection configuration procedure according to UE context retention attributes, which is proposed by this specification.

Referring to FIG. 46, an eNB transmits system information and/or a paging message to a UE (S4601).

The paging message may be omitted, if necessary.

Thereafter, the UE checks UE context retention attribute information of the corresponding eNB (S4602).

Thereafter, the UE performs a resource request and resource allocation procedure through a procedure, such as random access, along with the eNB (S4603).

Thereafter, the UE performs a connection configuration procedure and a connection condition configuration procedure along with the eNB.

The corresponding procedure may be divided as follows depending on a case where the verification of the UE is successful (S4604) and a case where the verification of the UE fails (S4605).

First, if the verification of the UE is successful, the following procedure may be performed.

After step S4603, the UE transmits a first message for a connection configuration request to the eNB.

Thereafter, the eNB transmits a second message, including information related to a connection configuration and a security algorithm, to the UE.

Thereafter, the UE transmits a response message for the second message to the eNB.

Thereafter, the eNB transmits a third message, including information related to a connection condition configuration, to the UE.

Next, the case where the verification of the UE fails is described below.

After the UE transmits a response message for the second message to the eNB, the eNB transmits a third message, including information related to a security configuration, to the UE.

Thereafter, the UE transmits a response message for the third message to the eNB.

Thereafter, the eNB transmits a fourth message, including information related to a connection condition configuration, to the UE.

Furthermore, the operations of the UE and the eNB of Case #3 according to Situation 2 may be defined as in Table 18 and FIG. 47.

TABLE 18

| Situation: | Case | UE operation | eNB operation |
| --- | --- | --- | --- |
| #2) Design whether UE context is retained, whether change information is present or not, and change information so that a UE recognizes them after a connection/ connection process | #3 | Transmit a security-processed first message using context retained by UE without any change | Perform another operation depending on whether UE context is retained and a result of UE verification Success: same as Option #1 Pending: transmit a security-processed second message including change information Failure: transmit a security not-processed second message |

FIG. 47 is a flowchart showing another example of a connection configuration procedure according to UE context retention attributes, which is proposed by this specification.

Referring to FIG. 47, an eNB transmits system information and/or a paging message to a UE (S4701).

The paging message may be omitted, if necessary.

Thereafter, the UE checks UE context retention attribute information of the corresponding eNB (S4702).

Thereafter, the UE performs a resource request and resource allocation procedure through a procedure, such as random access, along with the eNB (S4703).

Thereafter, the UE performs a connection configuration procedure and a connection condition configuration procedure along with the eNB.

The corresponding procedure may be divided as follow depending on a case where the verification of the UE is successful (S4704), a case where the verification of the UE is suspended (S4705), and a case where the verification of the UE fails (S4706).

First, if the verification of the UE is successful, the following procedure may be performed.

After step S4703, the UE transmits a first message for a connection configuration request to the eNB.

Thereafter, the eNB checks whether UE context is retained or not.

If, as a result of the check, the UE context is retained, the eNB transmits a second message, including information related to a connection configuration and a connection condition configuration and information indicative of UE context retention, to the UE.

Thereafter, the UE transmits a response message for the second message to the eNB.

Thereafter, the eNB transmits a third message, including information related to a connection condition configuration, to the UE.

Next, the case where the verification of the UE has been suspended is described below.

If the eNB retains UE context, the eNB transmits a second message, including information related to a connection configuration and a connection condition configuration and information indicative of UE context retention, to the UE.

Thereafter, the UE transmits a response message for the second message to the eNB.

When the eNB receives the response message for the second message, if the verification of the UE is successful, the eNB transmits a third message, including information related to a connection condition configuration, to the UE.

In contrast, when the eNB receives the response message for the second message, if the verification of the UE has failed, the eNB transmits a third message, including information related to a security configuration, to the UE.

Thereafter, the UE transmits a response message for the third message to the eNB.

Thereafter, the eNB transmits a fourth message, including information related to a connection condition configuration, to the UE.

Next, the case where the verification of the UE has failed is described below.

After the UE transmits a first message to the eNB, if the eNB does not retain UE context, the eNB transmits a second message, including information related to a connection configuration and information indicating that UE context is not retained, to the UE.

Thereafter, the UE transmits a response message for the second message to the eNB.

Thereafter, the eNB transmits a third message, including information related to a security configuration, to the UE.

Thereafter, the UE transmits a response message for the third message to the eNB.

Thereafter, the eNB transmits a fourth message, including information related to a connection condition configuration, to the UE.

General Apparatus to which the Present Invention May be Applied

FIG. 48 illustrates a block diagram of a wireless communication apparatus to which the methods proposed by this specification may be applied.

Referring to FIG. 48, the wireless communication system includes an eNB 4810 and a plurality of UEs 4820 located within the coverage of the eNB 4810.

The eNB 4810 includes a processor 4811, memory 4812 and a radio frequency (RF) unit 4813. The processor 4811 implements the functions, processes and/or methods proposed in FIGS. 1 to 47. The layers of a radio interface protocol may be implemented by the processor 4811. The memory 4812 is connected to the processor 4811 and stores various types of information for driving the processor 4811. The RF unit 4813 is connected to the processor 4811 and transmits and/or receives a radio signal.

The UE 4820 includes a processor 4821, memory 4822 and an RF unit 4823. The processor 4821 implements the functions, processes and/or methods proposed in FIGS. 1 to 47. The layers of a radio interface protocol may be implemented by the processor 4821. The memory 4822 is connected to the processor 4821 and stores various types of information for driving the processor 4821. The RF unit 4823 is connected to the processor 4821 and transmits and/or receives a radio signal.

The memory 4812, 4822 may be located inside or outside the processor 4811, 4821 and may be connected to the processor 4811, 4821 by various well-known means.

Furthermore, the eNB 4810 and/or the UE 4820 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method for transmitting/receiving data in a wireless communication system of the present invention and the method for grouping a UE context retention group have been described based on the examples in which the methods are applied to the 3GPP LTE/LTE-A systems, but may be applied to various wireless communication systems, such as a 5G system, in addition to the 3GPP LTE/LTE-A systems.

The invention claimed is:

1. A method for transmitting and receiving, by a first network node, data in a wireless communication system, the method comprising:
    transmitting, to a user equipment (UE), a control message comprising information related to UE context retention attributes;
    receiving, from the UE, a first message comprising a first information block;
    performing a verification procedure of the UE based on the first message; and
    transmitting, to the UE, a second message based on a result of the verification of the UE,
    wherein the UE context retention attributes indicate at least one of whether UE context has been retained and whether UE context is capable of being changed,
    wherein the first message further comprises a header and a medium access control (MAC)-1 field,
    wherein the performing a verification procedure of the UE comprises:
    detecting the UE context of the UE based on a UE identifier included in the first information block, wherein the UE context of the UE comprises at least one of an integrity and ciphering key and security algorithm information;
    generating X-MAC for integrity verification based on the detected UE context; and
    comparing the generated X-MAC with the MAC-1 field included in the first message,
    wherein when the verification of the UE is successful, the second message includes a second information block including a ciphered UE identifier and the MAC-1 field, and
    wherein when the verification of the UE is unsuccessful, the second message consists of the ciphered UE identifier.

2. The method of claim 1, further comprising:
    checking the UE context retention attributes of the UE based on the received first message.

3. The method of claim 1, wherein the integrity and ciphering key is generated again according to a determined rule.

4. The method of claim 1, wherein the first network node is grouped as a specific group depending on UE context retention attributes.

5. The method of claim 1, further comprising:
    receiving a paging indication message and downlink data from a second network node; and
    deleting the received downlink data if the first message is not received within a specific time.

6. An apparatus for transmitting and receiving data in a wireless communication system, the apparatus comprising:
    a transceiver for transmitting and receiving a radio signal; and
    a processor functionally connected to the RF unit transceiver, wherein the processor is configured to:
    transmit, to a user equipment (UE), a control message comprising information related to UE context retention attributes;
    receive, from the UE, a first message comprising a first information block;
    perform a verification procedure of the UE based on the first message; and
    transmit, to the UE, a second message based on a result of the verification of the UE,
    wherein the UE context retention attributes indicate at least one of whether UE context has been retained and whether UE context is capable of being changed,
    wherein the first message further comprises a header and a medium access control (MAC)-1 field,
    wherein to perform a verification procedure of the UE, the processor is further configured to:
    detect the UE context of the UE based on a UE identifier included in the first information block, wherein the UE context of the UE comprises at least one of an integrity and ciphering key and security algorithm information;
    generate X-MAC for integrity verification based on the detected UE context; and
    compare the generated X-MAC with the MAC-1 field included in the first message,
    wherein when the verification of the UE is successful, the second message includes a second information block including a ciphered UE identifier and the MAC-1 field, and
    wherein when the verification of the UE is unsuccessful, the second message consists of the ciphered UE identifier.

* * * * *